(12) United States Patent
Brodskyy et al.

(10) Patent No.: US 12,384,691 B2
(45) Date of Patent: Aug. 12, 2025

(54) METHOD FOR INTEGRATED PROCESSING OF TITANIUM-CONTAINING FEEDSTOCK TO OBTAIN HIGH VALUE-ADDED PRODUCTS BASED ON TITANIUM, IRON, CALCIUM AND NITROGEN

(71) Applicants: Velta Holdings US Inc., Wilmington, DE (US); RD Titan Group, TOV, Solonka (UA)

(72) Inventors: Andriy Brodskyy, Dnipro (UA); Viktor Troshchylo, Dnipro (UA); Andrii Gonchar, Solonka (UA); Oleksandr Chukhmanov, Zaporizhia (UA); Roman Hnatenko, Sokilnyky (UA); Olha Kuzmych, Dnipro (UA); Nadiia Bezukh, Dnipro (UA); Anna Ihumentseva, Dnipro (UA); Svitlana Troshchylo, Dnipro (UA)

(73) Assignees: Velta Holdings US Inc., Wilmington, DE (US); RD Titan Group, TOV, Solonka (UA)

( * ) Notice: Subject to any disclaimer, the term of this patent is extended or adjusted under 35 U.S.C. 154(b) by 847 days.

(21) Appl. No.: 17/511,047

(22) Filed: Oct. 26, 2021

(65) Prior Publication Data
US 2023/0132549 A1 May 4, 2023

(51) Int. Cl.
*C01G 23/053* (2006.01)
*C01G 23/08* (2006.01)
(Continued)

(52) U.S. Cl.
CPC .......... *C01G 23/053* (2013.01); *C01G 23/08* (2013.01); *C09C 1/0084* (2013.01); *C09C 1/363* (2013.01);
(Continued)

(58) Field of Classification Search
CPC .... C01G 23/053; C01G 23/056; C01G 23/08; C01G 49/02; C01G 49/08; C01F 11/02; C01C 1/242; C22B 34/1209
See application file for complete search history.

(56) References Cited

U.S. PATENT DOCUMENTS 3,903,239 A * 9/1975 Berkovich ......... C01G 23/0538
423/493
2003/0150818 A1 * 8/2003 Carter ................ C22B 34/1209
210/722

OTHER PUBLICATIONS

Panigrahi, M. et al., "An Overview of Production of Titanium and an Attempt to Titanium Production with Ferro-Titanium", vol. 29, Nos. 5-6, 2010, pp. 495-513.

* cited by examiner

*Primary Examiner* — Michael Forrest
*Assistant Examiner* — Logan Edward LaClair
(74) *Attorney, Agent, or Firm* — Warner Norcross + Judd LLP

(57) ABSTRACT

The present invention relates to the processing of natural titanium-containing feedstock, mainly ilmenite concentrate, including ilmenite ores with a low $TiO_2$ content, into products with high added value without generating any liquid or solid waste. The method according to the invention comprises the following stages: digesting ilmenite concentrate, processing the solid residue following ilmenite concentrate digestion, hydrolysis of titanium oxychloride, washing titanium oxides/hydroxides precipitate from impurities, calcination of titanium oxides/hydroxides precipitate, precipitation of iron hydroxides to obtain black, red and yellow iron oxide pigments, processing the mother liquor containing calcium chloride, regeneration of hydrogen chloride from ammonium chloride solution, obtaining ammonium sulfate and ammonium sulfate crystallization, obtaining crystalline ammonium chloride. The resulting products are pigments,
(Continued)

pigment fillers, mineral fertilizers, construction materials, raw materials for the production of metals, and other products; they are used in various fields of application such as paint and coatings industry, pulp and paper industry, in the production of plastics, in metallurgy, in agricultural, construction industries and others.

45 Claims, 18 Drawing Sheets

(51) Int. Cl.
 *C09C 1/00* (2006.01)
 *C09C 1/36* (2006.01)
(52) U.S. Cl.
 CPC ........ *C09C 1/3669* (2013.01); *C01P 2004/61* (2013.01); *C01P 2004/62* (2013.01); *C01P 2004/64* (2013.01)

METHOD FOR INTEGRATED PROCESSING OF TITANIUM-CONTAINING FEEDSTOCK TO OBTAIN HIGH VALUE-ADDED PRODUCTS BASED ON TITANIUM, IRON, CALCIUM AND NITROGEN

The present invention relates to the processing of natural titanium-containing feedstock, mainly ilmenite concentrate, including ilmenite ores with a low $TiO_2$ content, into products with high added value without generating any liquid or solid waste. The resulting products are pigments, pigment fillers, mineral fertilizers, construction materials, raw materials for the production of metals, and other products; they are used in various fields of application such as paint and coatings industry, pulp and paper industry, in the production of plastics, in metallurgy, in agricultural, construction industries and others.

BACKGROUND OF THE INVENTION

Currently, there are several methods for processing ilmenite concentrate, which provide titanium-containing products and some by-products; these methods are described below.

The sulfate method for the manufacture of titanium dioxide involves digestion of ilmenite concentrate or specially produced titanium slag using sulfuric acid and obtaining a solution of titanyl sulfate and ferrous sulfates, separating part of ferrous sulfates from the resulting solution in the form of ferrous sulfate heptahydrate when using ilmenite concentrate (this stage is omitted when using titanium slag), hydrolysis of titanium oxysulfate solutions to obtain metatitanic acid, separating the resulting metatitanic acid from the mother liquor containing 15-30% sulfuric acid, washing the resulting metatitanic acid from impurities of iron, chromium, vanadium and other elements, calcining metatitanic acid under controlled conditions to obtain titanium dioxide with anatase or rutile crystal structure.

The drawbacks of the sulfate method are generation of large amounts of ferrous sulfate heptahydrate when using ilmenite concentrate (this stage is omitted when using titanium slag), mother liquor after hydrolysis containing 15-30% $H_2SO_4$ (hydrolysis acid, weak acid) and acidic wastewater as a result of washing metatitanic acid from impurities of iron, chromium, vanadium and other elements. Also, when using titanium slag produced from ilmenite, additional steps are required for making the slag, which have their disadvantages, for example, increased production costs.

Chloride titanium dioxide production mainly uses natural rutile, synthetic rutile, slag or ilmenite concentrate (preferably with a high $TiO_2$ content to reduce waste) as feedstock. The principle of the chloride technology consists in the reaction of titanium-containing feedstock with chlorine and carbon, resulting in titanium tetrachloride and chlorides of metals, which were contained in the feedstock.

Further, after condensation, solid metal chlorides such as $FeCl_2$, $MnCl_2$, $CaCl_2$ and $MgCl_2$ are separated from the resulting liquid, and titanium tetrachloride undergoes further removal of $VOCl_3$ and then highly-controlled distillation to remove other chlorides, for example, $SnCl_4$, $SiCl_4$, $AsCl_3$, $FeCl_3$, etc.

The purified titanium tetrachloride is further fed into the oxidation stage, where, under controlled conditions, it is oxidized with oxygen to form titanium dioxide (mainly with rutile crystal structure).

The resulting titanium tetrachloride can also be used either in the production of titanium metal using the so-called Kroll process (see U.S. Pat. No. 2,205,854A) or the Hunter process (see An Overview of Production of Titanium and an Attempt to Titanium Production with Ferro-Titanium, Mrutyunjay Panigrahi, Raja Kishore Paramguru, Rakesh Chandra Gupta, Etsuro Shibata, and Takashi Nakamura, High Temperature Materials and Processes, Vol. 29, Nos. 5-6, 2010).

The drawbacks of the chloride method are high requirements for process safety due to the use of chlorine, which is extremely dangerous and toxic to human health, and the formation of iron chlorides waste, its amount depending on the iron content of the feedstock (especially large amounts of waste are generated when using ilmenite). Also, if slag or synthetic rutile made from ilmenite is used, additional steps are required to make slag or synthetic rutile, said additional steps having disadvantages such as waste formation or increased production costs.

Ilmenite ores can also be converted into a $TiO_2$-rich product—the so-called 'synthetic rutile' containing 85-96% of $TiO_2$ by weight, using processes consisting in the reduction of iron oxide and 'leaching' with mineral acids. There are a number of methods proposed for commercialization or commercialized methods for the production of 'synthetic rutile', the most famous of them are the Becher process and the Benilite process.

The Becher process exploits the reduction of iron in ilmenite almost entirely to its metal form in a rotary kiln with a carbon source (typically coke) at a temperature of about 1200° C. The reduced ilmenite is processed using a sieve and magnetic separation to remove char, which is returned to the furnace. It is then leached in $NH_4Cl$ solution under aeration to oxidize and precipitate iron as oxide/hydroxide in the form of fine particles, which are separated from the coarser synthetic rutile by hydrocyclones, resulting in synthetic rutile rich in $TiO_2$.

In the Benilite process, the iron content of ilmenite is reduced to the divalent state with heavy oil fractions in a rotary kiln at a temperature of 850-1100° C. The reduced ore is leached in digesters with hydrochloric acid containing 18-20% HCl at 145° C. The leached material is then washed and calcined to produce synthetic rutile. The leach acid is recovered and the iron oxide is separated as a by-product.

The drawbacks of the Becher and the Benilite processes are formation of large amounts of waste iron oxide, as well as increase in the cost of the resulting 'synthetic rutile' for further use in chloride technology.

U.S. Pat. No. 4,288,417A (Joseph A. Rahm, Donald G. Cole) describes a process for the manufacture of titanium dioxide pigment in which excess ilmenite ore is reacted with dilute sulfuric acid having a concentration of between about 25% to about 60% by weight in the presence of an iron reductant, and in preferably at least two stages. The disadvantage of this method lies in the formation of ferrous sulfate, which requires further disposal.

U.S. Pat. No. 3,457,037A (Mauro M. Aramendia, David L. Armant) describes a method for producing titanium dioxide concentrate from ilmenite ores, which involves the dissolution of iron contained in ilmenite using 5-10% hydrochloric acid or 5-25% waste sulfuric acid to obtain 95% $TiO_2$ with residual iron less than 1.5% and MgO no higher than 1.0% for use as feedstock for chlorination in $TiCl_4$ production. U.S. Pat. No. 3,787,139A (F. Oster) describes a process for the preparation of titanium concentrates from iron-containing titanium ores, with $TiO_2$ content of 90-97%. The drawbacks of the known methods are low titanium content in the products obtained and unavailability of information on what happens next with iron chloride or iron sulfate, which remain without further processing.

U.S. Pat. No. 3,903,239A (Serge A. Berkovich) describes a method for titanium dioxide recovery from ores, in which the ore is leached with concentrated hydrochloric acid at room temperature to dissolve at least 80% of the titanium and iron of the ore and to leave gangue material undissolved. As a result of the method, waste iron oxide is formed, and additional processing steps are required to obtain the product that meets the existing product quality specifications.

U.S. Ser. No. 10/480,047B1 (Eric Larochelle et al.) describes a process operating at super-atmospheric pressure for leaching a titanium containing ore with HCl and producing titanium dioxide with integrated steps of solvent extraction for removing iron from the leached ore and solvent extraction of the resulting titanium enriched raffinate to produce particles suitable for finishing into pigment grade $TiO_2$. The drawbacks of this method are consumption of large amounts of water, reagents (inorganic reagents, organic substances for extraction), formation of waste and need to regenerate the reagents.

In the light of the above, alternative methods are required for economically feasible recovery of titanium from titanium-containing ores or concentrates.

The object of the invention is to create a highly efficient and waste-free method for integrated processing of titanium-containing minerals, to improve the efficiency of the method by increasing the degree of titanium extraction while maintaining high purity of titanium dioxide obtained and the possibility to produce titanium dioxide with different particle sizes.

Another object of the invention is also to improve the environmental friendliness of the method.

SUMMARY OF THE INVENTION

The invention aims to overcome the shortcomings of the prior art by providing a method for producing high value-added products based on titanium, iron, calcium and nitrogen avoiding generation of solid and liquid wastes from titanium-containing feedstock; the invention is expected to solve the problem of consuming large amounts of high cost materials; the method also implements the possibility of re-using by-products.

The advantages of the proposed process are production of a wide range of high value-added products, which significantly reduces the cost of ilmenite processing, and zero liquid and solid waste generation, which further reduces the cost of the process and makes it exceptionally friendly to the environment.

The present invention generally provides a method for integrated processing of titanium-containing feedstock to obtain high value-added products based on titanium, iron, calcium and nitrogen, which comprises the following stages:
a) digesting ilmenite concentrate, namely, decomposing the milled ilmenite concentrate with hydrochloric acid in two or more stages in a countercurrent system using a reducing agent, to obtain a solid residue and a solution of titanium oxychloride, which is sent to Stage c);
b) processing the solid residue obtained in Stage a) which comprises:
  neutralization of the solid residue with ammonia water containing 3-25% $NH_4OH$,
  filtration of the mother liquor, washing the precipitate, drying the precipitate at a temperature of 100-200° C. and calcining it for 1-8 hours at a temperature of 300-1050° C.,
  obtaining a product with a titanium dioxide content of more than 50% and the mother liquor, which is sent to Stage i);
c) hydrolysis of titanium oxychloride $TiOCl_2$ from Stage a) to obtain a precipitate of titanium oxides/hydroxides with a specified particle size distribution, whereby the HCl vapor released during hydrolysis is captured and returned to Stage a) in the form of an aqueous solution of hydrogen chloride;
d) washing the precipitate of titanium oxides/hydroxides, during which the slurry of titanium oxides/hydroxides obtained in Stage c) is filtered and washed with purified water, then the cake of titanium oxides/hydroxides is sent to calcination stage e), whereby the mother liquor is sent to iron hydroxides precipitation stage f);
e) calcination of titanium oxides/hydroxides precipitate at a temperature of 250-1000° C. for 0.5-10.0 hours, followed by cooling and milling of the resulting titanium dioxide;
f) precipitation of iron hydroxides to obtain black iron oxide pigments, during which the mother liquor from Stage d) containing iron chlorides and free hydrochloric acid is mixed with milk of lime slurry with $Ca(OH)_2$ content in the range between 5% and 35%, then hydrochloric acid and iron chloride are neutralized, iron hydroxide is oxidized with ambient oxygen for 5-40 hours, the slurry is cooled and filtered, the precipitate is washed and dried at a temperature of 30-80° C., after which the resulting pigment is subjected to milling, while at the same time an oxidizing agent is introduced into the mother liquor from the stage of precipitate washing and the solution is neutralized to pH=7-12 with $Ca(OH)_2$, and the resulting slurry is filtered to separate the precipitated iron hydroxide from the mother liquor, then the iron hydroxide cake is dissolved using hydrochloric acid solution, thus obtaining a solution of iron chloride $FeCl_3$, with pH in the range of 0.5-2.0, after which $FeCl_3$ is reduced to $FeCl_2$ using iron and the resulting solution of iron (II) chloride is sent for mixing with solutions coming from Stage d), and the mother liquor is sent to Stage i) for processing;
g) precipitation of iron hydroxides to obtain red iron oxide pigments, during which the mother liquor from Stage d) containing iron chlorides and free hydrochloric acid is mixed with milk of lime slurry with $Ca(OH)2$ content in the range between 5% and 35%, then hydrochloric acid and iron chloride are neutralized, iron hydroxide is oxidized with ambient oxygen for 5-40 hours, the slurry is cooled and filtered, the precipitate is washed and calcined at a temperature of 350 to 1000° C. for 1-10 hours, the pigment resulting from calcination is cooled and subjected to milling, while at the same time an oxidizing agent is introduced into the mother liquor from the stage of precipitate washing and the solution is neutralized to pH=7-12 with $Ca(OH)_2$, and the resulting slurry is filtered to separate the precipitated iron hydroxide from the mother liquor, then the iron hydroxide cake is dissolved using hydrochloric acid solution, thus obtaining a solution of iron chloride $FeCl_3$, with pH in the range of 0.5-2.0, after which $FeCl_3$ is reduced to $FeCl_2$ using iron and the resulting solution of iron (II) chloride is sent for mixing with solutions supplied from Stage d), and the mother liquor is sent to Stage i) for processing;

h) precipitation of iron hydroxides to obtain yellow iron oxide pigments, during which, for the production of nuclei, part of the mother liquor from Stage d) containing iron chlorides and free hydrochloric acid is mixed with milk of lime slurry having $Ca(OH)_2$ content in the range between 5% and 35%, hydrochloric acid and iron chloride are neutralized and the resulting slurry is held for 0.1-2 hours with continuous circulation provided, then iron hydroxide is oxidized with ambient oxygen for 5-40 hours, followed by the addition of the rest of the mother liquor from Stage d), free hydrochloric acid and iron chloride are neutralized and iron hydroxide is oxidized with ambient oxygen for 5-40 hours, the slurry is cooled and filtered, the precipitate is washed and dried at a temperature of 30-80° C., after which the resulting pigment is subjected to milling, while at the same time an oxidizing agent is introduced into the mother liquor from the stage of precipitate washing and the solution is neutralized to pH=7-12 with $Ca(OH)_2$, and the resulting slurry is filtered to separate the precipitated iron hydroxide from the mother liquor, then the iron hydroxide cake is dissolved using hydrochloric acid solution, thus obtaining a solution of iron chloride $FeCl_3$, with pH in the range of 0.5-2.0, after which $FeCl_3$ is reduced to $FeCl_2$ using iron and the resulting solution of iron (II) chloride is sent for mixing with solutions supplied from Stage d), and the mother liquor is sent to Stage i) for processing;

i) processing the mother liquor containing calcium chloride, during which the mother liquor from Stages f), g), h) is used, calcium carbonate is precipitated using ammonia or ammonium compounds and carbon oxide or carbonates, the precipitate is washed, filtered and dried at a temperature of 100-200° C., while the mother liquor from the washing stage is sent to Stage j);

j) regeneration of hydrogen chloride from ammonium chloride solution, during which the mother liquor from Stage i) is evaporated to a concentration of $NH_4Cl \leq 773$ $g/dm^3$, then, with thorough stirring, 95-100% sulfuric acid is fed in the amount of $NH_4Cl:H_2SO_4$ 1:1.75÷2.05, then the reaction mass is heated to a temperature of 100-220° C. at an absolute pressure in the range of 0.15-1 bar, hydrochloric acid released as a result of the reaction and having an HCl content of 10-35% is condensed and returned to Stage a) of titanium-containing feedstock digestion, and the reaction mass containing ammonium hydrogen sulfate $NH_4HSO_4$ is sent to Stage k);

k) obtaining ammonium sulfate and ammonium sulfate crystallization, during which the reaction mass obtained in Stage j) and containing ammonium hydrogen sulfate is dissolved with water until crystals of ammonium hydrogen sulfate are completely dissolved, and simultaneously heated, the resulting solution of ammonium hydrogen sulfate with an $NH_4HSO_4$ content of 45-70% is mixed with a stream of ammonia gas, then the resulting ammonium sulfate solution is evaporated at an absolute pressure of 0.05-1 bar and crystallized, and the resulting slurry containing ammonium sulfate crystals with a solid $(NH_4)_2SO_4$ content in the range between 5 and 50% is processed to separate the mother liquor using filtration or centrifugation, the separated ammonium sulfate crystals are washed and dried to remove free moisture at a temperature of 50-150° C., while the mother liquor is returned to the process.

Preferably, the average particle size of the milled ilmenite concentrate of Stage a) is between 0.05 and 45 μm, more preferably between 0.05 and 10 μm, even more preferably between 0.05 and 5 μm.

Preferably, in one of digestions steps of Stage a), a portion of the mother liquor from Stages f), g), h) is additionally used, the mother liquor being obtained before the introduction of an oxidizing agent and containing calcium chloride.

Preferably, in one of digestions steps of Stage a), the mother liquor containing ammonium chloride and recovered from Stage i) is additionally used.

Preferably, Stage a) uses metallic iron as a reducing agent to the extent ensuring the presence of $Ti^{3+}$ ions in an amount of 1.1-3 $g/dm^3$ in the solution during the entire digestion stage.

Further, in Stage b) the solid precipitate is washed with dilute filtrates containing $NH_4Cl$: first, with more concentrated filtrates containing more than 10% but less than 20% $NH_4Cl$, then with less concentrated filtrates containing more than 5% but less than 10% $NH_4Cl$, then with even less concentrated filtrates containing less than 5% $NH_4Cl$ and at the end the solid precipitate is washed with demineralized water with a specific conductivity of 10-50 S/cm to remove $NH_4Cl$ from the solid precipitate to less than 0.05% by weight of the solid precipitate.

In addition, in Stage b) following neutralization and washing, a solution of chloride or sulfate of an alkali metal selected from Group 1 of the Periodic Table is added to the solid precipitate in an amount of 0.1-5% by weight of the solid precipitate and stirred, then the precipitate is dried at a temperature of 100-200° C.

Furthermore, the dried precipitate is additionally calcined for 1-8 hours at a temperature of 300-1050° C. and milled.

Preferably, Stage c) uses a solution of titanium oxychloride $TiOCl_2$ with $TiO_2$ concentration of 50-400 $g/dm^3$ and a temperature of 10-60° C.

Furthermore, a precipitate of titanium oxides/hydroxides with a particle size of 0.2 to 50 μm is obtained.

Furthermore, prior to Stage c) titanium nuclei are prepared.

Preferably, a solution of titanium oxychloride ($TiOCl_2$) with a $TiO_2$ concentration of 50-400 $g/dm^3$ and a temperature of 20-30° C. is used for the preparation of titanium nuclei.

Furthermore, titanium nuclei are added to the titanium oxychloride solution during heating (when it reaches a temperature of 30-95° C.) in an amount of 1.5-5% of the nuclei expressed as $TiO_2$ by the amount of $TiO_2$ contained in the titanium oxychloride solution.

Furthermore, a precipitate of titanium oxides/hydroxides with a particle size of 100-350 nm is obtained.

Furthermore, a precipitate of titanium oxides/hydroxides with a particle size of 350-1500 nm is obtained.

Furthermore, the obtained titanium oxides/hydroxides are used as nuclei for the hydrolysis of titanium oxychloride solution.

Preferably, titanium nuclei in an amount of 3-100%, more preferably 5-90%, even more preferably 10-70% by weight of $TiO_2$ in the titanium oxychloride solution are added to titanium oxychloride solution with a $TiO_2$ concentration of 50-400 $g/dm^3$ and a temperature of 10-60° C.

Preferably, a precipitate of titanium oxides/hydroxides with a particle size of 50-250 μm is obtained.

Stage d) of the method further comprises the salt treatment stage during which the cake of titanium oxides/hydroxides is repulped in demineralized water or in the mother liquor to reach a $TiO_2$ concentration of 200-500 $g/dm^3$, upon which a solution of a compound of a metal or a mixture of compounds of metals from Group 1 of the Periodic Table is added to the slurry, the compounds of metals including but not limited to halides, sulfates, hydroxides, phosphates, carbonates, for example, LiCl, NaCl, KCl, $Li_2SO_4$, $Na_2SO_4$, $K_2SO_4$, LiOH, NaOH, KOH, $Li_3PO_4$, $Na_3PO_4$, $K_3PO_4$, $Li_2CO_3$, $Na_2CO_3$, $K_2CO_3$.

Stage d) of the method further comprises the reduction stage during which the cake of titanium oxides/hydroxides is repulped in water, a solution of hydrochloric acid is added to the slurry bringing the pH to less than 2, more preferably to less than 1.5, even more preferably to less than 0.5, the reaction mass is heated up to 50-90° C., then a reducing agent is introduced into the slurry and the reduction is carried out to reach a $Ti^{3+}$ content equal to or more than 0.3 $g/dm^3$.

Furthermore, the reducing agent is selected from metals of Groups 1, 2, 4, 12, 13 of the Periodic Table, including but not limited to, for example, Na, Mg, Ti, Zn, Al.

Preferably, organic reducing agents including but not limited to 4-methylaminophenol sulfate, benzene-1,4-diol, 2,4-diaminophenol dihydrochloride, as well as hydroxymethanesulfonates such as sodium hydroxymethanesulfonate, potassium hydroxymethanesulphonate, hydroxymethanesulfonic acid can be used as a reducing agent.

In the method, following the reduction stage, the titanium oxides/hydroxides slurry is cooled down to 20-70° C. and subjected to re-filtration.

Furthermore, the salt treatment stage follows re-filtration of the titanium oxides/hydroxides slurry.

Furthermore, Stage e) produces titanium dioxide with particle sizes in the range of 0.2-50 μm.

Furthermore, Stage e) produces titanium dioxide with particle sizes in the range of 50-250 μm.

Furthermore, Stage e) produces titanium dioxide with particle sizes in the range of 100-350 nm.

Furthermore, Stage e) produces titanium dioxide with particle sizes in the range of 350-1500 nm.

In the method, in Stage f), hydrochloric acid and iron chloride are neutralized to pH 2.5-7.0, more preferably to pH 3.0-6.5, even more preferably to pH 3.5-5.5, and the neutralization time is 0.5-5 hours.

In the method, in Stage f), following the precipitate drying stage, the resulting pigment is surface treated with organic additives in an amount of 0.1 to 3% by weight of the pigment.

Preferably, the organic additives include, but are not limited to polyatomic alcohols such as trimethylopropane, trimethylolethane, pentaerythritol, triethanolamine and others.

Preferably, the organic additives include, but are not limited to polydimethylsiloxanes, stearic acid, silanes, for example, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyltriethoxysilane, phosphonic acids such as n-octyl phosphonic acid and others.

In the method, in Stage g) hydrochloric acid and iron chloride are neutralized to pH 2.5-7.0, more preferably to pH 3.0-6.5, even more preferably to pH 3.5-5.5, while the neutralization time is 0.5-5 hours.

In the method, in Stage g), following the precipitate drying stage, the resulting pigment is surface treated with organic additives in an amount of 0.1 to 3% by weight of the pigment.

Preferably, the organic additives include, but are not limited to polyatomic alcohols such as trimethylopropane, trimethylolethane, pentaerythritol, triethanolamine and others.

Preferably, the organic additives include, but are not limited to polydimethylsiloxanes, stearic acid, silanes, for example, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyltriethoxysilane, phosphonic acids such as n-octyl phosphonic acid and others.

In the method, in Stage h), to obtain nuclei, the iron chloride is neutralized until 5-35%, more preferably 10-30%, even more preferably 15-20% of iron hydroxide is precipitated, and the neutralization time is 0.1-2 hours.

In the method, in Stage h), following the addition of iron chloride solution to the slurry of iron hydroxide nuclei, free hydrochloric acid is neutralized to pH 2.5-6.0, more preferably to pH 3.0-5.5, even more preferably to pH 3.5-5.0.

In the method, in Stage h), following the precipitate drying stage, the resulting pigment is surface treated with organic additives in an amount of 0.1 to 3% by weight of the pigment.

Preferably, the organic additives include, but are not limited to polyatomic alcohols such as trimethylopropane, trimethylolethane, pentaerythritol, triethanolamine and others.

Preferably, the organic additives include, but are not limited to polydimethylsiloxanes, stearic acid, silanes, for example, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyltriethoxysilane, phosphonic acids such as n-octyl phosphonic acid and others.

Preferably, in Stage i), the mother liquor is mixed with a gas stream containing $CO_2$ and gaseous ammonia to precipitate calcium carbonate.

Preferably, in Stage i), an ammonium carbonate solution is used to precipitate calcium carbonate from the mother liquor.

Stage i) of the method further comprises the stage of precipitated calcium carbonate nuclei preparation.

The method further comprises Stage 1) of ammonium chloride crystallization, during which the mother liquor from Stage i) is evaporated at an absolute pressure of 0.05-1 bar and crystallized, the resulting slurry containing ammonium chloride crystals with a solid $NH_4Cl$ content in the range between 5 and 50% is processed to separate the mother liquor using filtration or centrifugation, the obtained ammonium chloride is dried, and the mother liquor, following the separation of ammonium chloride crystals, is mixed with new portions of the mother liquor and concentrated ammonium chloride filtrates coming from the mother liquor processing stage i), the mother liquor containing calcium chloride and the resulting mixture is sent for evaporation to obtain ammonium chloride crystals.

BRIEF DESCRIPTION OF DRAWINGS

The proposed invention will now be described in relation to the accompanying drawings, in which.

DETAILED DESCRIPTION OF THE INVENTION

Figure 1:
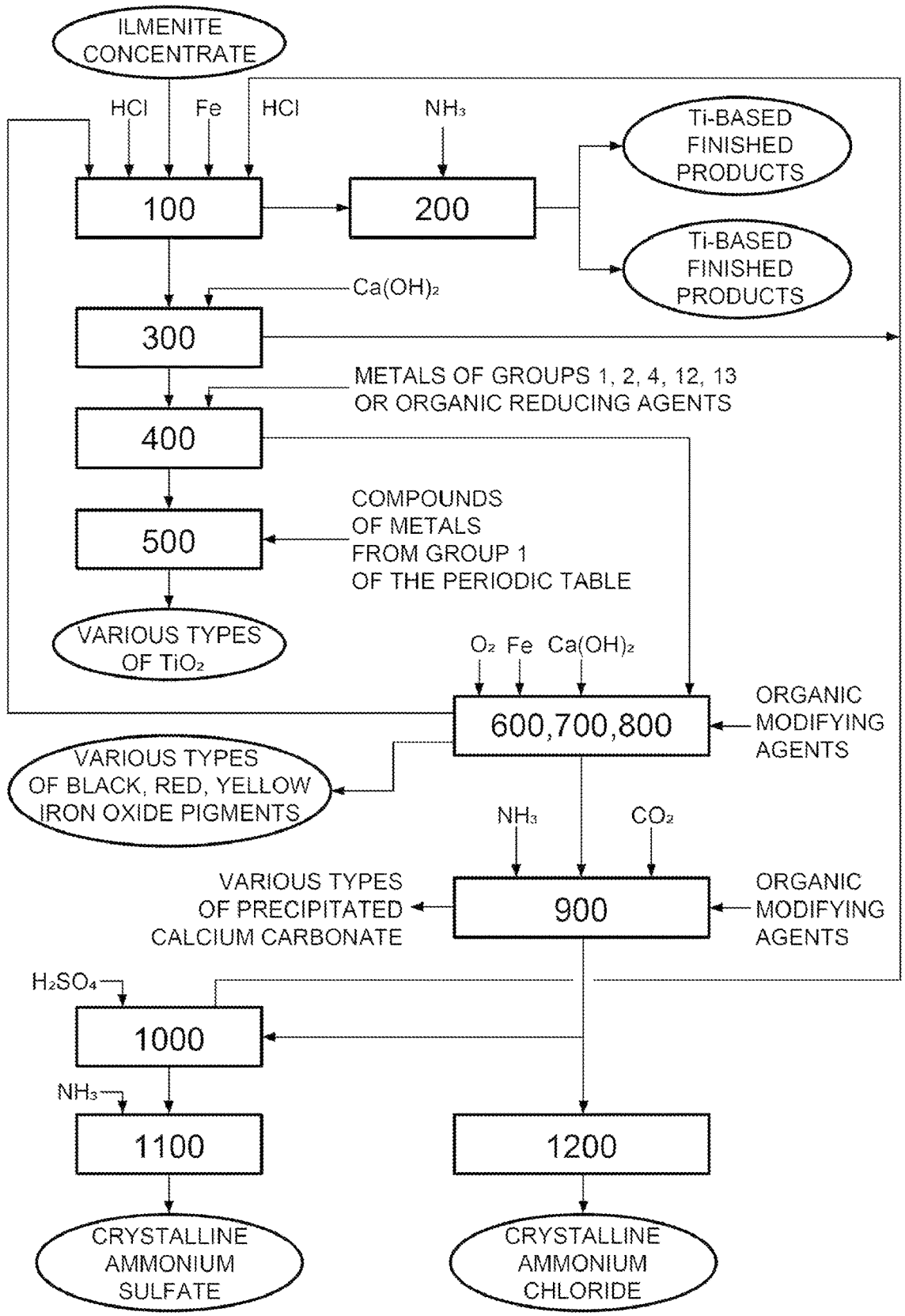
FIG. 1 is a flow diagram of the proposed method.

Hereinafter, embodiments of the present invention, the main stages of which are illustrated in the drawings, will be described in detail. Each step is given by way of explaining the present invention, but not limiting the present invention. In fact, those skilled in the art will understand that various modifications and variations of this invention can be made within the scope or concept of the invention. This invention is believed to cover such modifications and variations as falling within the scope of the appended claims and their equivalents.

The method according to the invention for processing titanium-containing feedstock to obtain high value-added products based on titanium, iron, calcium and nitrogen is shown in FIG. 1 and comprises the following general stages:
a)—digesting ilmenite concentrate (Stage 100).
b)—processing the solid residue following ilmenite concentrate digestion (Stage 200).
c)—hydrolysis of titanium oxychloride (Stage 300).
d)—washing titanium oxides/hydroxides precipitate from impurities (Stage 400).
e)—calcination of titanium oxides/hydroxides precipitate (Stage 500).
f)—precipitation of iron hydroxides to obtain black iron oxide pigments (Stage 600).
g)—precipitation of iron hydroxides to obtain red iron oxide pigments (Stage 700).
h)—precipitation of iron hydroxides to obtain yellow iron oxide pigments (Stage 800).
i)—processing the mother liquor containing calcium chloride (Stage 900).
j)—regeneration of hydrogen chloride from ammonium chloride solution (Stage 1000).
k)—obtaining ammonium sulfate and ammonium sulfate crystallization (Stage 1100).
l)—obtaining crystalline ammonium chloride (Stage 1200).

Figure 2:
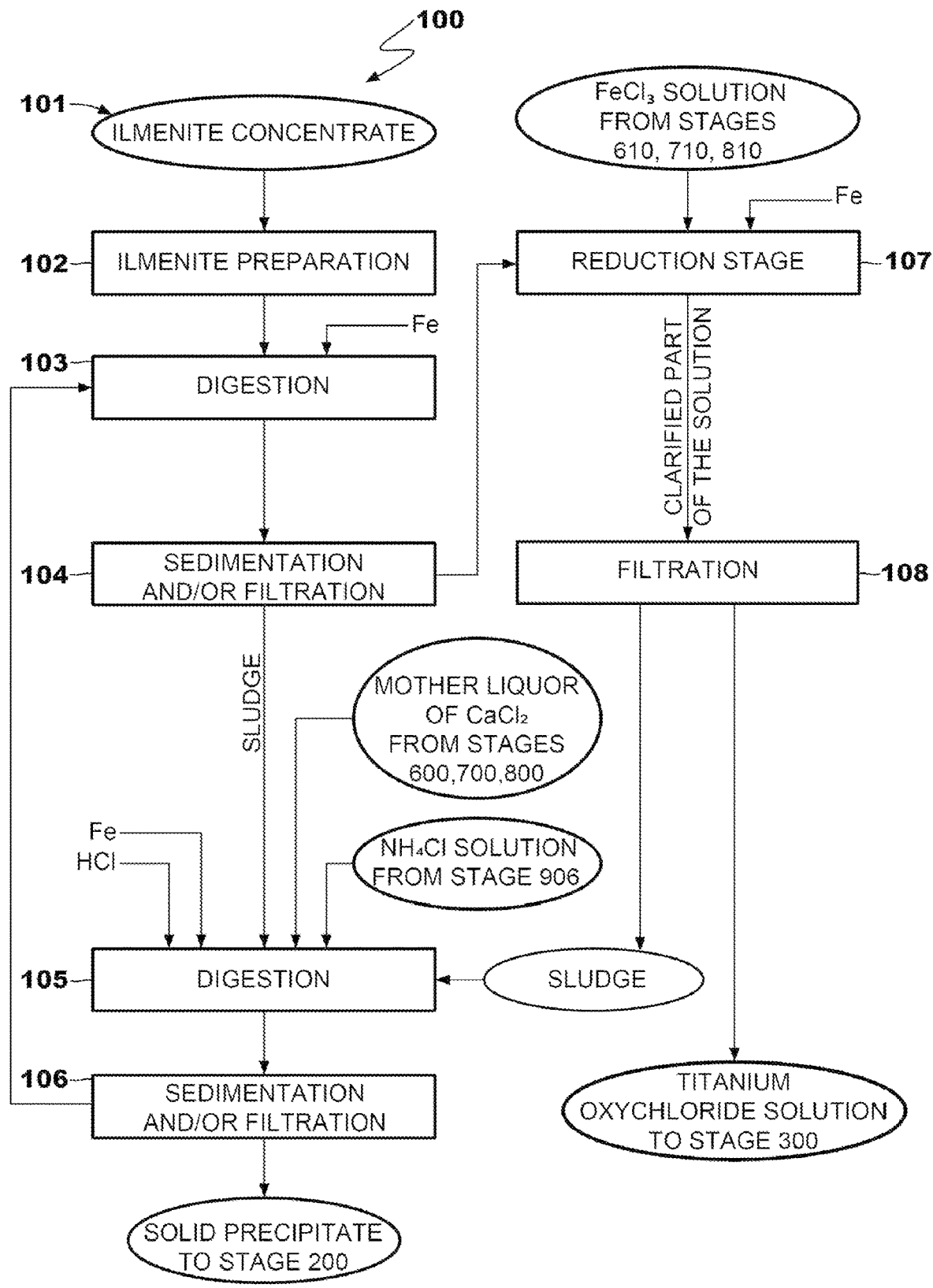
FIG. 2 is a flow diagram of ilmenite concentrate digestion stage.

Particular stages will now be described in more detail.
The first stage of the method is the digestion of ilmenite concentrate 100, which is shown in FIG. 2.
Ilmenite concentrate feedstock 101 with a $TiO_2$ content of 25-70% and a total iron content of 25-75% expressed as $Fe_2O_3$ is mechanically activated (Stage 102) using high-energy milling to increase the specific surface area and reach a particle size distribution in the range from 0.05 to 45 μm, more preferably from 0.05 to 10 μm, even more preferably from 0.05 to 5 μm.

The following equipment can be used as the milling equipment: a drum ball mill with milling bodies made of steel, cast iron, zirconium oxide and other suitable materials, or a centrifugal mill with rotation velocity of the impeller at the maximum distance from the shaft reaching at least 100 m/s, more preferably at least 125 m/s, even more preferably at least 150 m/s, or a jet mill using jets of air or steam, or a planetary mill.

Also, to achieve greater efficiency and high degree of milling, successive milling in several types of mills can be used, for example, first, milling in a drum ball mill and then in a centrifugal mill, or, first, in a centrifugal mill, then in a jet mill, or, first, in a planetary a mill, then in a jet mill, or, first, in a ball mill, next in a centrifugal mill, and then in a jet mill, but without being limited to these sequences and combinations.

Next, the mechanically activated milled ilmenite concentrate passes to Stage 103 for digestion. The digestion is carried out in two Stages in a countercurrent system. Stage 105 uses hydrochloric acid recovered from hydrolysis Stage 300 and/or from the step of hydrogen chloride regeneration from ammonium chloride solution 1000, and the unreacted solid part from Stage 104; Stage 103 uses the solution from Stage 106 containing titanium oxychloride and iron chlorides, and mechanically activated ilmenite concentrate.

In Stage 103, a solution containing titanium oxychloride, iron chloride and free hydrochloric acid is loaded into the digestion reactor while stirring; a mechanically activated ilmenite concentrate is added to the solution, the resulting mixture is heated to a temperature of 40-60° C. and the digestion reaction is carried out for 2-8 hours. The process is carried out in such a way that the pH of the solution resulting from digestion is less than 1.5 and more than 0.5. The amount of ilmenite concentrate relative to hydrogen chloride is 5-100% in excess of the stoichiometric requirement according to the reaction equation:

$$FeTiO_3 + 4HCl = FeCl_2 + TiOCl_2 + 2H_2O \qquad (1)$$

Following the procedure of Stage 103, the unreacted solid part is separated from the rest of the solution by settling and/or filtration, the resulting solution is sent to the reduction Stage 107, and the unreacted solid part is sent to the digestion Stage 105.

In reduction Stage 107 the solution undergoes reduction with metallic iron in an amount that ensures the presence of $Ti^{3+}$ ions in the solution in an amount of 0.2-3 g/dm$^3$, with the reaction proceeding as follows:

$$2Ti^{4+}+Fe^0=2Ti^{3+}+Fe^{2+} \quad (2)$$

Next, the clarified solution passes to filtration Stage 108, after which the solid part is sent to digestion Stage 105.

In Stage 105, a hydrochloric acid solution with an HCl content of 15-35% is loaded into the digestion reactor while stirring, followed by the addition of the unreacted solid part from Stage 104; the resulting mixture is heated to a temperature of 40-60° C. and the digestion reaction is carried out for 4-16 hours. The amount of hydrogen chloride relative to the unreacted solid part is 15-500% more than the amount of the unreacted part.

Following the procedure 105 of the digestion stage the remaining unreacted solid residue is separated from the rest of the solution by settling and/or filtration 106, the resulting solution is sent to the digestion Stage 103, and the solid residue passes to the stage of solid residue processing 200 following ilmenite concentrate digestion 100.

The TiO$_2$ yield after two-stage digestion is 75-90%.

The authors experimentally observed that when introducing metallic iron in Stages 105 and 103 as a reducing agent to the extent ensuring the presence of Ti$^{3+}$ ions in the solution during the entire digestion process in an amount of 0.1-0.3 g/dm$^3$, more preferably 0.4-1.0 g/dm$^3$, even more preferably 1.1-3 g/dm$^3$, the TiO$_2$ yield after two-stage digestion increases by 3-7% compared to the yield for which no iron was used, and is 80-95%.

The authors also noticed that if using the mother liquor containing calcium chloride obtained in Stages 600, 700, 800 of iron hydroxides precipitation to obtain iron oxide color pigments (black, red, yellow), in Stage 105 to prepare the slurry of the solid unreacted part obtained in Stage 104, so that the CaCl$_2$ content in the solution is 50-250 g/dm$^3$, the TiO$_2$ yield after two-stage digestion increases by 5-7% compared to the yield for which the specified mother liquor was not used, and is 80-95%. At the same time, the use of the specified mother liquor in the digestion stage makes it possible to reduce the amount of fresh water used for the process, and to reduce the formation of liquid waste that requires processing, thereby increasing the economic efficiency of the process and friendliness to the environment.

The authors also noticed that if using the mother liquor containing ammonium chloride obtained in Stage 900 of mother liquor processing, in Stage 105 to prepare the slurry of the solid unreacted part obtained in Stage 104, so that the NH$_4$Cl content in the hydrochloric acid is 50-250 g/dm$^3$, the TiO$_2$ yield after two-stage digestion increases by 5-7% compared to the yield for which the specified mother liquor was not used, and is 80-95%. At the same time, the use of the specified mother liquor in the digestion stage makes it possible to reduce the amount of fresh water used for the process, and to reduce the formation of liquid waste that requires processing, thereby increasing the economic efficiency of the process and friendliness to the environment.

The completed Stage 100 results in a solid precipitate which is sent to Stage 200, and a titanium oxychloride solution, which is sent to Stage 300.

Figure 3:
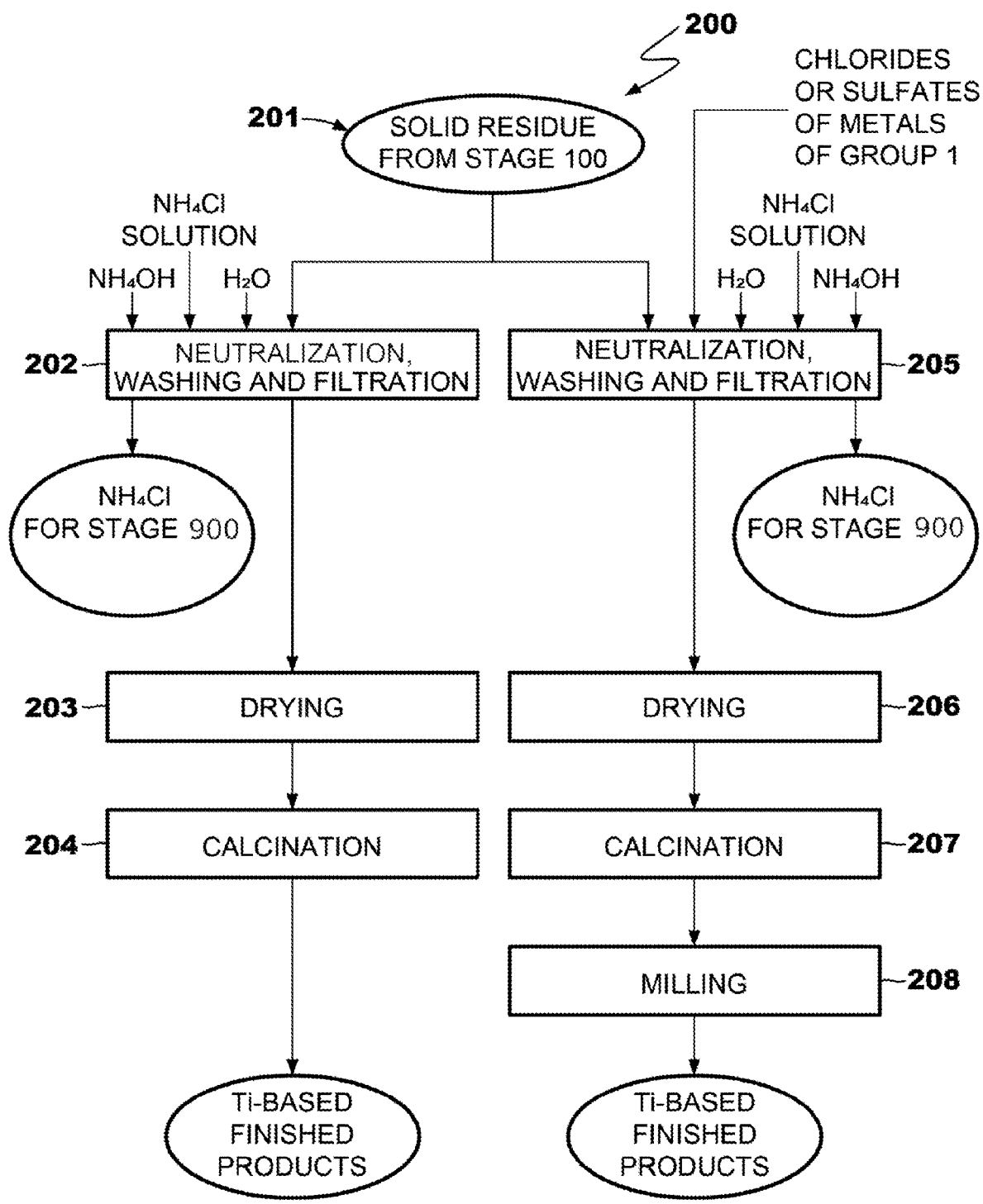
FIG. 3 is a flow diagram illustrating the stage of the solid residue processing following ilmenite concentrate digestion.

FIG. 3 shows a flow diagram illustrating the Stage 200 of the solid residue processing following ilmenite concentrate digestion.

The solid residue 201 after the Stage 105 of ilmenite concentrate digestion (Stage 100) is neutralized 202 using ammonia water with an NH$_4$OH content of 3-25%, with the reaction proceeding as follows:

$$NH_4OH+HCl=NH_4Cl+H_2O \quad (3)$$

Following neutralization, the mother liquor containing NH$_4$Cl is separated from the solid precipitate by filtration; the solid precipitate is washed with dilute filtrates containing NH$_4$Cl: first, with more concentrated filtrates containing at least 10% but less than 20% NH$_4$Cl, then with less concentrated filtrates containing more than 5% but less than 10% NH$_4$Cl, then with even less concentrated filtrates containing less than 5% NH$_4$Cl; and at the end the solid precipitate is washed with demineralized water with a specific conductivity of 10-50 µS/cm to remove NH$_4$Cl from the solid precipitate to less than 0.05% by weight of the solid precipitate.

The filtrates from washing are collected and reused to wash new portions of the solid precipitate until the filtrates reach a saturation of 10-20% NH$_4$Cl, i.e. become the so-called saturated filtrates.

Next, the mother liquor containing NH$_4$Cl, as well as saturated filtrates with an NH$_4$Cl content of 10-20%, are sent to Stage 900 for the processing of the mother liquor containing calcium chloride.

The solid precipitate is washed with water, dried 203 at a temperature of 100-200° C. to remove free moisture and calcined 204 for 1-8 hours at a temperature of 300-1050° C.

The characteristics of the product resulting from calcination are given in Table 1.

TABLE 1

| No. | Characteristics | Unit of Measure | Value |
|---|---|---|---|
| 1 | Content of TiO$_2$ | % | 60-95 |
| 2 | Content of Fe$_2$O$_3$ | % | 0.1-10.0 |
| 3 | Content of SiO$_2$ | % | 1-25 |
| 4 | Content of MnO | % | 0.05-3 |
| 5 | Other impurities | % | 0.1-10.0 |

Finished Ti-based products can be used for a variety of applications such as blast furnace additives to protect the furnace bottom from erosion. Also, the obtained products can be used for the production of electrodes coating, etc.

In one embodiment of the invention, after Stage 105 of ilmenite concentrate (Stage 100) digestion, the solid precipitate 201 is neutralized 205 with ammonia water containing 3-25% of NH$_4$OH, with reaction (3) taking place.

After neutralization, the mother liquor containing NH$_4$Cl is separated from the solid precipitate by filtration; the solid precipitate is washed with dilute filtrates containing NH$_4$Cl: first, with more concentrated filtrates containing at least 10% but less than 20% NH$_4$Cl, then with less concentrated filtrates containing more than 5% but less than 10% NH$_4$Cl, then with even less concentrated filtrates containing less than 5% NH$_4$Cl; and at the end the solid precipitate is washed with demineralized water with a specific conductivity of 10-50 µS/cm to remove NH$_4$Cl from the solid precipitate to less than 0.05% by weight of the solid precipitate.

Before drying 206, a 10-30% solution of chloride or sulfate of an alkali metal selected from Group 1 of the Periodic Table is added to the solid precipitate in an amount of 0.1-5% by weight of the solid precipitate and thoroughly stirred to distribute the solution uniformly in the entire volume of the precipitate.

After that, the solid precipitate is dried 206 at a temperature of 100-200° C. to remove free moisture and calcined 207 for 1-8 hours at a temperature of 300-1050° C.

After calcination 207, the resulting material is milled 208 in Raymond mills, roller grinders, a centrifugal mill in which rotation velocity of the impeller at the maximum distance from the shaft reaches at least 100 m/s, more preferably at least 125 m/s, even more preferably at least 150 m/s, or a jet mill using jets of air or steam. Also, to achieve greater efficiency and high degree of milling, successive milling in several types of mills can be used, for example, first, milling in a roller grinder and then in a centrifugal mill, or, first, in a Raymond mill and then in a jet mill, or, first, in a roller grinder, next in a centrifugal mill and then in a jet mill, but without being limited to these sequences and combinations.

The characteristics of the product resulting from calcination are given in Table 2.

TABLE 2

| No | Characteristics | Unit of Measure | Value | Notes |
|---|---|---|---|---|
| 1 | Content of $TiO_2$ | % | 60 ÷ 95 | |
| 2 | Content of $Fe_2O_3$ | % | 0.1 ÷ 10.0 | |
| 3 | Content of $SiO_2$ | % | 1 ÷ 25 | |
| 4 | Content of MnO | % | 0.05 ÷ 3.00 | |
| 5 | Other impurities | % | 0.1 ÷ 10.0 | |
| 6 | L* (CIELAB) | | 50 ÷ 95 | According to ISO 787-1 |
| 7 | a* (CIELAB) | | −3 ÷ 5 | According to ISO 787-1 |
| 8 | b* (CIELAB) | | 2 ÷ 20 | According to ISO 787-1 |
| 9 | Hiding power | $g/m^2$ | 20-40 | According to ISO 6504-3 |
| 10 | Dispersibility | μm | 5 ÷ 40 | According to ISO 8780-3 |
| 11 | Dispersibility | μm | 1 ÷ 15 | According to ISO 8780-4 |

Stage 200 produced finished Ti-based products with a titanium dioxide content of more than 50%: Low-cost $TiO_2$-based pigments. The resulting product can be used as a pigment to replace 5 to 50% of a commercial white titanium dioxide pigment in formulations for the production of Paint & Coatings, plastics, paper, etc., which makes it possible to reduce the cost of paints and coatings, plastics, paper by using a cheaper pigment compared to a commercial white titanium dioxide pigment.

Figure 4:
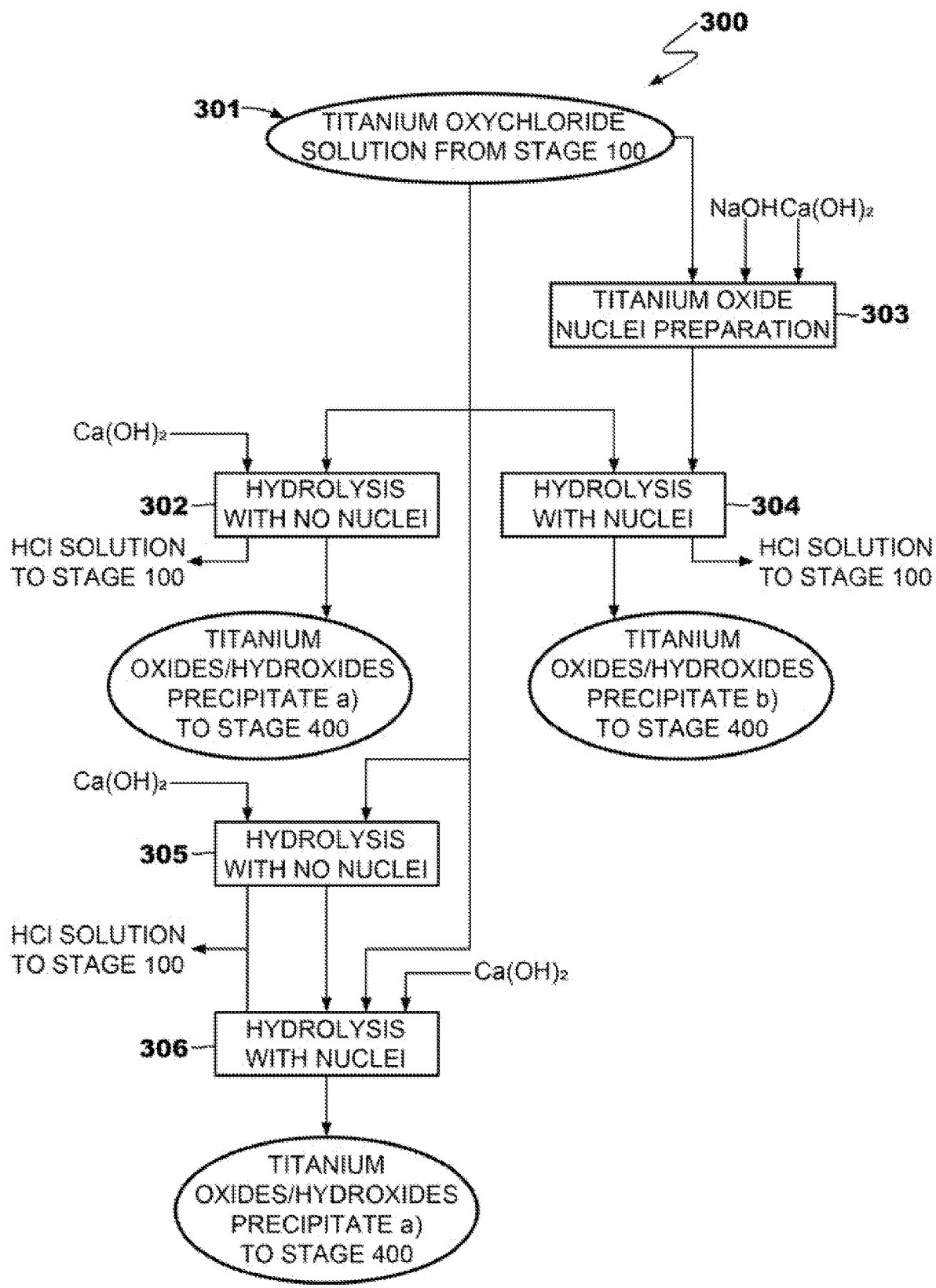
FIG. 4 is a flow diagram of titanium oxychloride hydrolysis stage.

FIG. 4 shows a flow diagram of titanium oxychloride hydrolysis Stage 300.

The solution 301 of titanium oxychloride $TiOCl_2$ from Stage 100 of ilmenite concentrate digestion enters Stage 302. Before hydrolysis, the titanium oxychloride $TiOCl_2$ solution must not contain $Fe^{3+}$ ions, the $Ti^{3+}$ content must be 0.2-3 $g/dm^3$ expressed as $Ti_2O_3$; the reactor in which the hydrolysis is carried out must be sealed to prevent outside air from entering it to avoid oxidation of $Fe^{2+}$ to $Fe^{3+}$ and contamination of titanium oxide/hydroxide resulting from hydrolysis with iron compounds.

A titanium oxychloride ($TiOCl_2$) solution with a $TiO_2$ concentration of 50-400 $g/dm^3$ and a temperature of 10-60° C. is heated to a temperature of 70-95° C. for 10-120 minutes.

The temperature in the reactor is raised within 10-60 minutes after the beginning of hydrolysis to a boiling point of 100-120° C., and the solution is boiled for 3-15 hours until the $TiO_2$ yield is at least 95%. The $TiO_2$ yield was determined as the ratio of the $TiO_2$ amount precipitated during hydrolysis to the total amount of $TiO_2$ before the hydrolysis procedure.

The hydrolysis proceeds according to the following chemical reactions:

$$TiOCl_2 + 2H_2O = TiO(OH)_2 + 2HCl \quad (4)$$

$$TiOCl_2 + H_2O = TiO_2 + 2HCl \quad (5)$$

As a result of continuous hydrogen chloride removal from the solution due to evaporation, the equilibrium of reactions (4), (5) is shifted to the right towards the formation of $TiO(OH)_2$ and $TiO_2$ according to the Le Chatelier's principle.

The $TiO_2$ yield can be increased to 100% by introducing milk of lime slurry with CaO content in the range between 1% and 25% into the reaction mass after reaching a 95% hydrolysis yield and thereby increasing the pH of the reaction mass to pH=1.0-3.0, more preferably to pH=1.2-2.8, even more preferably to pH=1.5-2.5. In this case, the titanium dissolved in the solution precipitates according to reactions (4), (5), and the following chemical reaction occurs as a result of milk of lime addition:

$$2HCl + Ca(OH)_2 + CaCl_2 + 2H_2O \quad (6)$$

Evolved vapors of hydrochloric acid are removed from the hydrolysis reactor through a heat exchanger irrigated with cooled water with a temperature of 5-30° C., where the condensation of hydrochloric acid with an HCl content of 20-35% occurs. The hydrochloric acid solution is continuously removed from the heat exchanger and collected in a separate collecting tank.

The finished product being titanium oxides/hydroxides precipitate for the production of technical titanium dioxide with a particle size of 0.2 to 50 μm is sent to Stage 400.

In one of the embodiments of the invention, to obtain titanium dioxide particles in the size range 100-350 nm, within which the titanium dioxide obtained is a pigment, since it most effectively scatters electromagnetic radiation in the wavelength range of 400-700 nm visible to the human eye, or in the particle size range 350-1500 nm, within which the resulting titanium dioxide is a material for infrared radiation scattering, since it most effectively scatters electromagnetic radiation in the infrared wavelength range of 700-3000 nm, hydrolysis of titanium oxychloride is carried out as follows.

Titanium nuclei are prepared prior to hydrolysis in Stage 303. A solution of titanium oxychloride ($TiOCl_2$) with a $TiO_2$ concentration of 50-400 $g/dm^3$ and a temperature of 20-30° C. is used for this procedure.

This solution reacts intermittently with calcium hydroxide $Ca(OH)_2$ to form insoluble $TiO_2$ nuclei that precipitate from the solution. The nuclei are washed with water, and the concentration of the slurry is increased by settling to obtain aqueous slurry of up to 50 $g/dm^3$ of $TiO_2$.

Upon first introduction of titanium oxychloride solution into calcium hydroxide slurry, the titanium oxychloride solution is instantly hydrolyzed due to the highly alkaline environment, resulting in the formation of crystalline $TiO_2$ nuclei according to the equations of chemical reactions (7), (8).

$$Ca(OH)_2 + TiOCl_2 = TiO(OH)_2 + CaCl_2 \quad (7)$$

$$Ca(OH)_2 + TiOCl_2 = TiO_2 + CaCl_2 + H_2O \quad (8).$$

Next, rapid mixing in the tank results in an overall acidic environment (due to deliberate incomplete neutralization of all HCl present). This acidic environment prevents further formation of crystalline $TiO_2$ and promotes crystal growth on the nuclei that have been formed.

To attain these two conditions, the entire titanium oxychloride solution is added to calcium hydroxide slurry within a short, well controlled and consistent period.

This reaction is exothermic causing the temperature of the added titanium oxychloride solution to rise to about 40-50° C. Then this solution is heated to 65-90° C. at a constant rate with steam and held at this temperature for 0.5-2.5 hours.

Using an incomplete neutralization ensures production and control of the correct amount and size of $TiO_2$ nuclei. These nuclei then grow during the process of nuclei preparation completion.

The next stage in the nucleation reaction is quenching, that is, a rapid temperature drop to 40-50° C., neutralization of the remaining HCl with sodium hydroxide NaOH, and increasing pH to 9-9.5. This effectively stops the reaction and makes the $TiO_2$ flocculate, facilitating its precipitation. The actual temperature after quenching is irrelevant to within a few degrees. In this case, the following chemical reactions occur:

$$2NaOH + TiOCl_2 = TiO(OH)_2 + 2NaCl \quad (9)$$

$$2NaOH + TiOCl_2 = TiO_2 + 2NaCl + H_2O \quad (10)$$

$$NaOH + HCl = NaCl + H_2O \quad (11).$$

When the nuclei are precipitated from completely chloride solutions, a mixture of anatase and rutile crystallites (with an admixture of brookite) is formed. All crystallites will initiate precipitation of hydrous titanium dioxide during the hydrolysis reaction and, if present, the rutile crystallites will promote rutile crystal growth upon calcination.

To obtain primary particles of crystalline titanium oxide with a particle size distribution of 100-350 nm or 350-1500 nm, hydrolysis of titanium oxychloride solutions in Stage 304 is carried out in the presence of nuclei, which are added to the titanium oxychloride solution during heating (after it has reached a temperature of 30-95° C.) in the amount of 0.1-5% of the nuclei expressed as $TiO_2$ by the amount of $TiO_2$ contained in the titanium oxychloride solution.

Before the start of hydrolysis the solution must not contain $Fe^{3+}$ ions, the $Ti^{3+}$ content must be 0.2-3 g/dm³ expressed as $TiO_2$; the reactor in which the hydrolysis is carried out must be sealed to prevent outside air from entering it to avoid oxidation of $Fe^{2+}$ to $Fe^{3+}$ and contamination of titanium oxide/hydroxide resulting from hydrolysis with iron compounds.

A solution of titanium oxychloride ($TiOCl_2$) with a $TiO_2$ concentration of 50-400 g/dm³ and a temperature of 10-60° C. is heated to a temperature of 70-95° C. for 10-120 minutes.

The temperature in the reactor is raised within 10-60 minutes after the beginning of hydrolysis to a boiling point of 100-120° C., and the solution is boiled for 2-6 hours until the $TiO_2$ yield is at least 95%. The $TiO_2$ yield was determined as the ratio of the $TiO_2$ amount precipitated during hydrolysis to the total amount of $TiO_2$ before the hydrolysis procedure.

The hydrolysis proceeds according to chemical reactions (4), (5).

As a result of continuous hydrogen chloride removal from the solution due to evaporation, the equilibrium of reactions (4), (5) is shifted to the right towards the formation of $TiO(OH)_2$ and $TiO_2$ according to the Le Chatelier's principle.

The $TiO_2$ yield can be increased to 100% by introducing milk of lime slurry with CaO content in the range between 1% and 25% into the reaction mass after reaching a 95% hydrolysis yield and thereby increasing the pH of the reaction mass to pH=1.0-3.0, more preferably to pH=1.2-2.8, even more preferably to pH=1.5-2.5. In this case, the titanium dissolved in the solution precipitates according to reactions (4), (5).

In one of the embodiments of the invention, to obtain titanium dioxide particles in the size range of 50-250 μm, within which the titanium dioxide obtained is a feedstock for the production of titanium tetrachloride in the chloride method of titanium dioxide production or in the production of metallic titanium by titanium recovery from its chlorides (the Kroll process, the Hunter process, the Armstrong process, etc.) and where the requirements for feedstock particle size, to ensure efficient chlorination process, exist, hydrolysis of titanium oxychloride is carried out as follows.

A titanium oxychloride ($TiOCl_2$) solution with a $TiO_2$ concentration of 50-400 g/dm³ and a temperature of 10-60° C. enters Stage 305, where it is heated to a temperature of 70-95° C. for 10-120 minutes.

The temperature in the reactor is raised within 10-60 minutes after the beginning of hydrolysis to a boiling point of 100-120° C., and the solution is boiled for 2-6 hours until the $TiO_2$ yield is at least 95%. The hydrolysis proceeds according to chemical reactions (4), (5). The $TiO_2$ yield was determined as the ratio of the $TiO_2$ amount precipitated during hydrolysis to the total amount of $TiO_2$ before the hydrolysis procedure.

The $TiO_2$ yield can be increased to 100% by introducing milk of lime slurry with CaO content in the range between 1% and 25% into the reaction mass after reaching a 95% hydrolysis yield and thereby increasing the pH of the reaction mass to pH=1.0-3.0, more preferably to pH=1.2-2.8, even more preferably to pH=1.5-2.5. In this case, the titanium dissolved in the solution precipitates according to reactions (4), (5).

Evolved vapors of hydrochloric acid are removed from the hydrolysis reactor through a heat exchanger irrigated with cooled water with a temperature of 5-30° C., where the condensation of hydrochloric acid with an HCl content of 20-35% occurs. The hydrochloric acid solution is continuously removed from the heat exchanger and collected in a separate collecting tank.

Thereafter, the resulting titanium oxides/hydroxides are used as nuclei for the hydrolysis of titanium oxychloride solution. This is achieved by the addition in Stage 306, before the start of hydrolysis, of titanium oxides/hydroxides resulting from hydrolysis of Stage 305 to a titanium oxychloride solution with a $TiO_2$ concentration of 50-400 g/dm³ and a temperature of 10-60° C., in an amount of 3-100%, more preferably 5-90%, even more preferably 10-70% by weight of $TiO_2$ in titanium oxychloride solution.

Following that, the titanium oxychloride solution is heated to a temperature of 70-95° C. for 10-120 minutes.

The temperature in the reactor is raised within 10-60 minutes after the beginning of hydrolysis to a boiling point of 100-120° C., and the solution is boiled for 2-6 hours until the $TiO_2$ yield is at least 95%. The $TiO_2$ yield was determined as the ratio of the $TiO_2$ amount precipitated during hydrolysis to the total amount of $TiO_2$ before the hydrolysis procedure.

The $TiO_2$ yield can be increased to 100% by introducing milk of lime slurry with CaO content in the range between 1% and 25% into the reaction mass after reaching a 95% hydrolysis yield and thereby increasing the pH of the reaction mass to pH=1.0-3.0, more preferably to pH=1.2-

2.8, even more preferably to pH=1.5-2.5. In this case, the titanium dissolved in the solution precipitates according to reactions (4), (5).

Evolved vapors of hydrochloric acid are removed from the hydrolysis reactor through a heat exchanger irrigated with cooled water with a temperature of 5-30° C., where the condensation of hydrochloric acid with an HCl content of 20-35% occurs. The hydrochloric acid solution is continuously removed from the heat exchanger and collected in a separate collecting tank.

The hydrolysis results in the production of titanium oxides/hydroxides precipitates as a finished product for various purposes, depending on the selected hydrolysis type.

Such finished products can be the following:
a) titanium oxides/hydroxides precipitate for the production of technical-grade titanium dioxide with a particle size of 0.2 to 250 μm;
b) titanium oxides/hydroxides precipitate for the production of titanium dioxide pigment, titanium dioxide for infrared radiation scattering with a particle size of 100 to 1500 nm.

Figure 5:
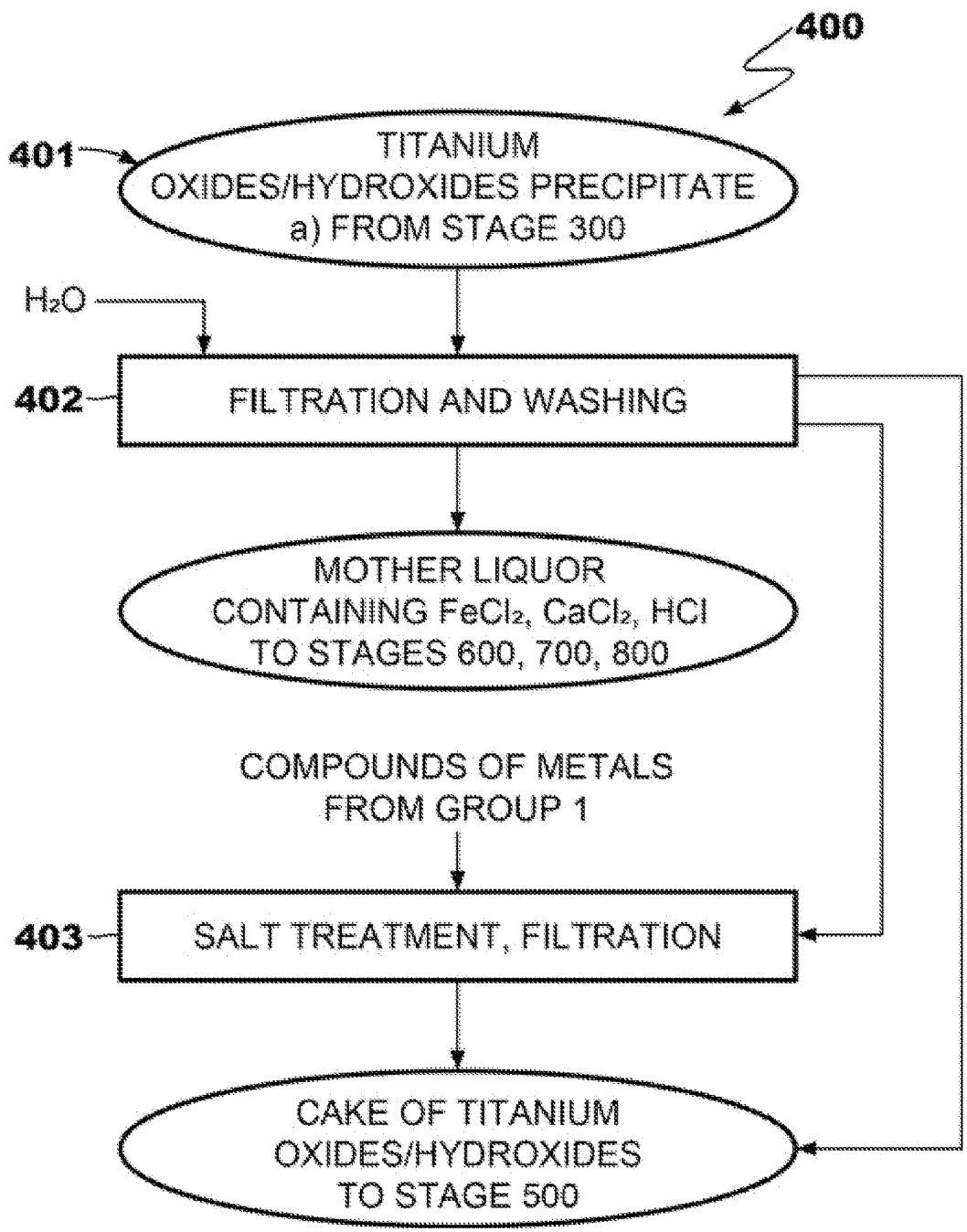
FIGS. 5, 6 and 7 are flow diagrams illustrating the stage of titanium oxides/hydroxides precipitate washing from impurities.

FIG. 5 is a flow diagram illustrating Stage 400 of titanium oxides/hydroxides precipitate washing from impurities.

Following the hydrolysis, the titanium oxide/hydroxide slurry 401 is cooled to 20-70° C. and filtered 402 to separate the titanium oxide/hydroxide cake from the mother liquor.

Various types of filters including but not limited to Moore filters, filter presses, drum filters, candle filters etc. can be used as filtering equipment.

Following filtration 402 the mother liquor containing iron chloride $FeCl_2$, calcium chloride $CaCl_2$ and free hydrochloric acid HCl is sent to Stage 600, 700, 800 for precipitation of iron hydroxides and production of color pigments: black, red, yellow.

The obtained cake of titanium oxides/hydroxides is washed with demineralized water in a filter. Various types of filters including but not limited to Moore filters, filter presses, drum filters, candle filters etc. can be used as filtering equipment.

In case precise particle size control is not necessary, for example, in the production of non-pigment type of titanium oxide with a particle size of 5-250 μm, the cake of titanium oxides/hydroxides is sent to calcination stage leaving out the salt treatment Stage 403.

In an optional salt treatment Stage 403 the cake of titanium oxides/hydroxides is repulped in demineralized water or in the mother liquor returned from the stage of cake separation from the mother liquor following the salt treatment stage, to reach a $TiO_2$ concentration of 200-500 g/dm$^3$, upon which a solution of a compound of a metal or a mixture of compounds of metals from Group 1 of the Periodic Table is added to the slurry, the compounds of metals including but not limited to halides, sulfates, hydroxides, phosphates, carbonates, for example, LiCl, NaCl, KCl, $Li_2SO_4$, $Na_2SO_4$, $K_2SO_4$, LiOH, NaOH, KOH, $Li_3PO_4$, $Na_3PO_4$, $K_3PO_4$, $Li_2CO_3$, $Na_2CO_3$, $K_2CO_3$. The amount of a metal compound or a mixture of metal compounds added is in the range from 0.1% to 5% by weight of $TiO_2$. The resulting slurry is thoroughly mixed and sent for filtration to separate the mother liquor from titanium oxides/hydroxides cake. Various types of filters including, but not limited to, Moore filters, filter presses, drum filters, candle filters etc. can be used as filtering equipment.

The mother liquor containing a dissolved metal compound or a mixture of metal compounds is returned to prepare a new portion of titanium oxides/hydroxides slurry for salt treatment.

The cake resulting from filtration passes to Stage 500 of titanium oxides/hydroxides precipitate calcination.

The resulting finished product obtained is titanium oxides/hydroxides precipitate washed from impurities, with a particle size of 0.2 to 250 μm.

Figure 6:
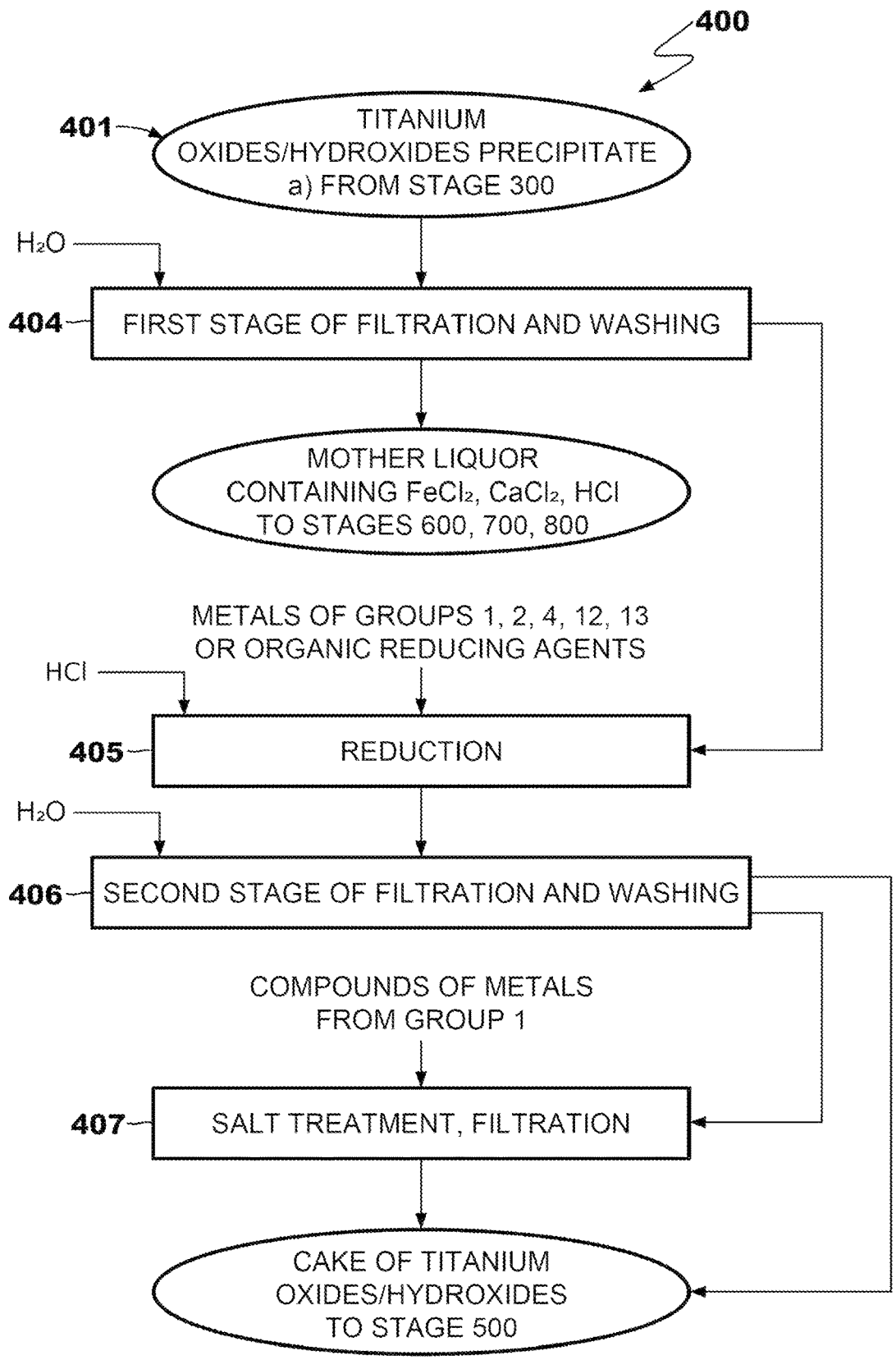

In one of the embodiments of the invention, as shown in FIG. 6, when high requirements are set for the purity of titanium oxide in terms of iron, chromium, vanadium and other metal impurities, for example, in the production of titanium dioxide pigment but without being limited to it, following hydrolysis (Stage 300), the titanium oxides/hydroxides slurry 401 is cooled to 20-70° C. and filtered 404 to separate the titanium oxides/hydroxides cake from the mother liquor.

Various types of filters including but not limited to Moore filters, filter presses, drum filters, candle filters etc. can be used as filtering equipment.

Following the separation from the mother liquor and washing with water as described above the titanium oxides/hydroxides cake passes to reduction Stage 405.

After the filtration stage 404 the mother liquor containing iron chlorides $FeCl_2$, calcium chloride $CaCl_2$) and free hydrochloric acid HCl, is sent to Stage 600, 700, 800 to precipitate iron hydroxides and obtain color pigments: black, red, yellow.

In Stage 405 the cake is repulped in water; a solution of hydrochloric acid is added to the slurry bringing the pH to less than 2, more preferably to less than 1.5, even more preferably to less than 0.5. The reaction mass is heated up to 50-90° C. thereafter.

Following that, a reducing agent is introduced into the slurry, the reducing agent being selected from metals of Groups 1, 2, 4, 12, 13 of the Periodic Table, including but not limited to, for example, Na, Mg, Ti, Zn, Al.

The reduction is carried out to reach a $Ti^{3+}$ content equal to or more than 0.3 g/dm$^3$. Metals from Groups 4, 12, 13, before being fed for reduction, must be well broken to a particle size in the range of 1-100 μm, more preferably 1-80 μm, even more preferably 1-40 μm.

Alternatively, organic reducing agents including but not limited to 4-methylaminophenol sulfate, benzene-1,4-diol, 2,4-diaminophenol dihydrochloride, as well as hydroxymethanesulfonates such as sodium hydroxymethanesulfonate, potassium hydroxymethanesulphonate, hydroxymethanesulfonic acid can be used as a reducing agent.

The reduction of ferric iron to ferrous iron is carried out by oxidation of the reducing metal and transfer of electrons from it to the iron, which is schematically represented in the following redox half-reaction equations:

$$Me^0 - n\bar{e} = Me^{n+} \qquad (12)$$

$$nFe^{3+} + n\bar{e} = nFe^{2+} \qquad (13)$$

where Me is a metal from Groups 1, 2, 4, 12, 13 of the Periodic Table;
$\bar{e}$ is an electron;
n is a coefficient.

When using an organic reducing agent, reduction is carried out by oxidizing the reducing agent and transferring electrons from it to iron, which is schematically represented in the following redox half-reaction equations:

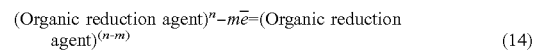
$$\text{(Organic reduction agent)}^n - m\bar{e} = \text{(Organic reduction agent)}^{(n-m)} \qquad (14)$$

$$mFe^{3+} + m\bar{e} = mFe^{2+} \qquad (15)$$

where (Organic reduction agent) is an organic reduction agent; $\bar{e}$ is an electron; m, n are coefficients.

Following the reduction stage the slurry is cooled to 20-70° C. and filtered 406 to separate the titanium oxides/hydroxides cake from the mother liquor. Various types of filters including but not limited to Moore filters, filter presses, drum filters, candle filters etc. can be used as filtering equipment.

In case precise particle size control is not necessary, for example, in the production of non-pigment type of titanium oxide with a particle size of 0.2-250 μm or for the production of food quality titanium dioxide E-171, but without being limited to these cases, the cake of titanium oxides/hydroxides is sent to the calcination stage leaving out the salt treatment stage.

In case precise particle size control is necessary, for example (but without being limited to these cases), in the production of titanium dioxide pigment with particle sizes in the range of 100-350 μm, or in the production of titanium dioxide with particle sizes in the range of 350-1500 nm, within which the resulting titanium dioxide is a material for infrared radiation scattering, the titanium oxide/hydroxide cake passes to the salt treatment Stage 407.

In the salt treatment Stage 407 the cake of titanium oxides/hydroxides is repulped in demineralized water or in the mother liquor returned from the stage of separating the cake from the mother liquor after the salt treatment stage, to reach a $TiO_2$ concentration of 200-500 g/dm³, upon which a solution of a compound of a metal or a mixture of compounds of metals from Group 1 of the Periodic Table is added to the slurry, the compounds of metals including but not limited to halides, sulfates, hydroxides, phosphates, carbonates, for example, LiCl, NaCl, KCl, $Li_2SO_4$, $Na_2SO_4$, $K_2SO_4$, LiOH, NaOH, KOH, $Li_3PO_4$, $Na_3PO_4$, $K_3PO_4$, $Li_2CO_3$, $Na_2CO_3$, $K_2CO_3$. The amount of a metal compound or a mixture of metal compounds added is in the range from 0.1% to 5% by weight of $TiO_2$. The resulting slurry is thoroughly mixed and sent for filtration to separate the mother liquor from titanium oxides/hydroxides cake. Various types of filters including, but not limited to, Moore filters, filter presses, drum filters, candle filters etc. can be used as filtering equipment.

The mother liquor containing the dissolved metal compound or mixture of metal compounds is returned to prepare a new portion of titanium oxides/hydroxides slurry for salt treatment.

The cake resulting from filtration passes to Stage 500 of titanium oxides/hydroxides precipitate calcination.

The resulting finished product obtained is a cake of titanium oxides/hydroxides with a particle size of 0.1 to 250 μm which is sent to Stage 500.

Figure 7:
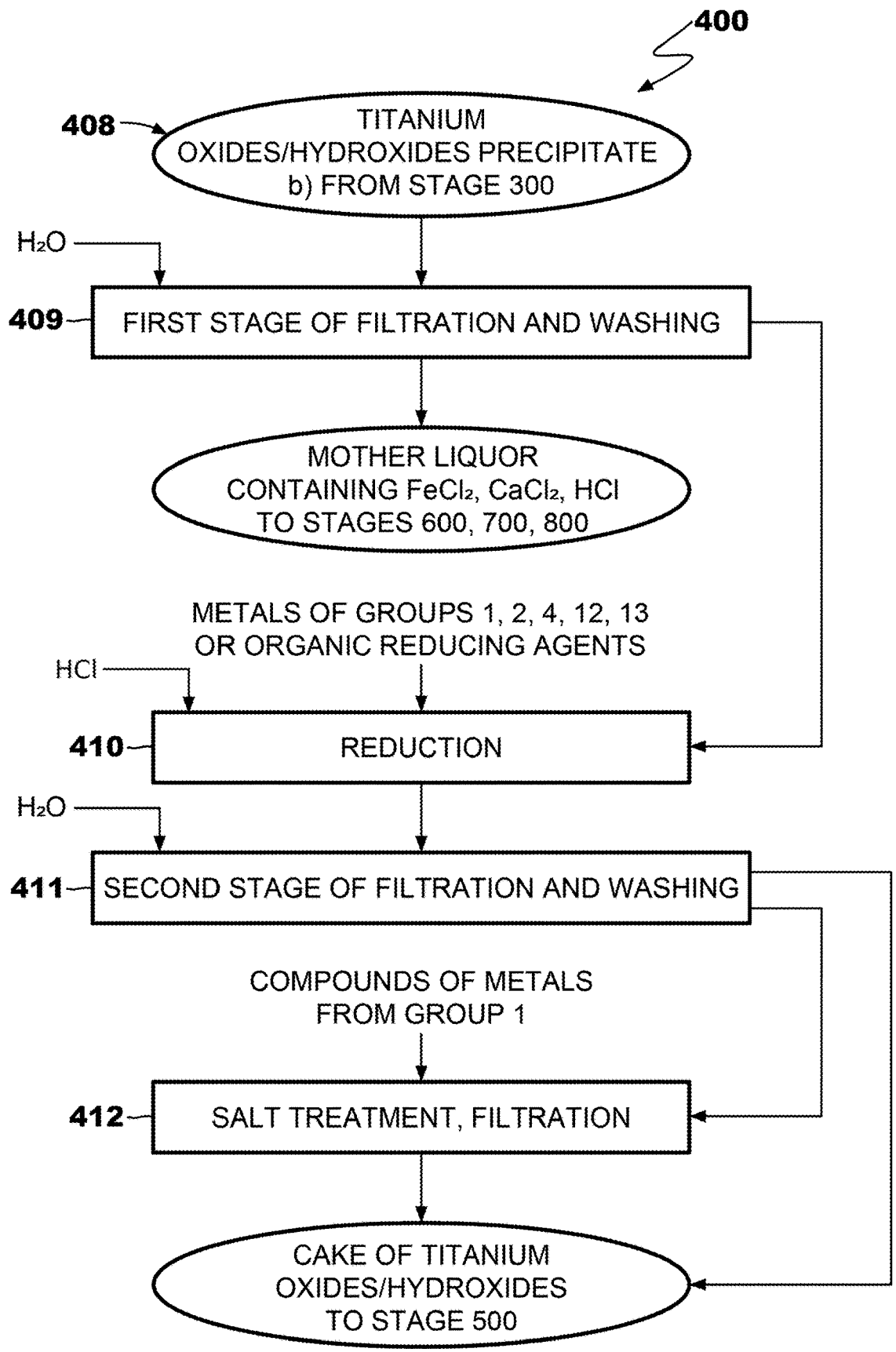

In one of the embodiments of the invention, as shown in FIG. 7, when high requirements are set for the purity of titanium oxide in terms of iron, chromium, vanadium and other metal impurities, for example, in the production of titanium dioxide pigment but without being limited to it, following hydrolysis (Stage 300) the titanium oxides/hydroxides precipitate 408 is cooled to 20-70° C. and filtered 409 to separate the titanium oxides/hydroxides cake from the mother liquor.

Various types of filters including, but not limited to, Moore filters, filter presses, drum filters, candle filters etc. can be used as filtering equipment.

Following the separation from the mother liquor and washing with water as described above the titanium oxides/hydroxides cake passes to reduction Stage 410.

After the filtration stage 409 the mother liquor containing iron chlorides $FeCl_2$, calcium chloride $CaCl_2$ and free hydrochloric acid HCl, is sent to Stage 600, 700, 800 to precipitate iron hydroxides and obtain color pigments: black, red, yellow.

In Stage 410 the cake is repulped in water; a solution of hydrochloric acid is added to the slurry bringing the pH to less than 2, more preferably to less than 1.5, even more preferably to less than 0.5. The reaction mass is heated up to 50-90° C. thereafter.

Following that, a reducing agent is introduced into the slurry, the reducing agent being selected from metals of Groups 1, 2, 4, 12, 13 of the Periodic Table, including but not limited to, for example, Na, Mg, Ti, Zn, Al.

The reduction is carried out to reach a $Ti^{3+}$ content equal to or more than 0.3 g/dm³. Metals from Groups 4, 12, 13, before being fed for reduction, must be well broken to a particle size in the range of 1-100 μm, more preferably 1-80 μm, even more preferably 1-40 μm.

Alternatively, organic reducing agents including but not limited to 4-methylaminophenol sulfate, benzene-1,4-diol, 2,4-diaminophenol dihydrochloride, as well as hydroxymethanesulfonates such as sodium hydroxymethanesulfonate, potassium hydroxymethanesulphonate, hydroxymethanesulfonic acid can be used as a reducing agent.

The reduction of ferric iron to ferrous iron is carried out by oxidation of the reducing metal and transfer of electrons from it to the iron, which is schematically represented in the following redox half-reaction equations:

$$Me^0 - n\bar{e} = Me^{n+} \tag{12}$$

$$nFe^{3+} + n\bar{e} = nFe^{2+} \tag{13}$$

where Me is a metal from Groups 1, 2, 4, 12, 13 of the Periodic Table;
$\bar{e}$ is an electron;
n is a coefficient.

When using an organic reducing agent, reduction is carried out by oxidizing the reducing agent and transferring electrons from it to iron, which is schematically represented in the following redox half-reaction equations:

$$\text{(Organic reduction agent)}^{n} - m\bar{e} = \text{(Organic reduction agent)}^{(n-m)} \tag{14}$$

$$mFe^{3+} + m\bar{e} = mFe^{2+} \tag{15}$$

where (Organic reduction agent) is an organic reduction agent;
$\bar{e}$ is an electron;
m, n are coefficients.

Following the reduction stage the slurry is cooled to 20-70° C. and filtered 411 depending on the embodiment of the invention, to separate the titanium oxides/hydroxides cake from the mother liquor. Various types of filters including but not limited to Moore filters, filter presses, drum filters, candle filters etc. can be used as filtering equipment.

In case precise particle size control is not necessary, for example (but without being limited to these cases), in the production of non-pigment type of titanium oxide with a particle size of 0.2-250 μm or for the production of food quality titanium dioxide E-171, the cake of titanium oxides/hydroxides is sent to the calcination stage leaving out the salt treatment stage.

In case precise particle size control is necessary, for example (but without being limited to these cases), in the production of titanium dioxide pigment with particle sizes in the range of 100-350 nm, or in the production of titanium dioxide with particle sizes in the range of 350-1500 nm, within which the resulting titanium dioxide is a material for infrared radiation scattering, the titanium oxide/hydroxide cake passes to the salt treatment Stage 412 depending on the embodiment of the invention.

In the salt treatment Stage 412 the cake of titanium oxides/hydroxides is repulped in demineralized water or in the mother liquor returned from the stage of separating the cake from the mother liquor after the salt treatment stage, to reach a $TiO_2$ concentration of 200-500 g/dm$^3$, upon which a solution of a compound of a metal or a mixture of compounds of metals from Group 1 of the Periodic Table is added to the slurry, the compounds of metals including but not limited to halides, sulfates, hydroxides, phosphates, carbonates, for example, LiCl, NaCl, KCl, $Li_2SO_4$, $Na_2SO_4$, $K_2SO_4$, LiOH, NaOH, KOH, $Li_3PO_4$, $Na_3PO_4$, $K_3PO_4$, $Li_2CO_3$, $Na_2CO_3$, $K_2CO_3$. The amount of a metal compound or a mixture of metal compounds added is in the range from 0.1% to 5% by weight of $TiO_2$. The resulting slurry is thoroughly mixed and sent for filtration to separate the mother liquor from titanium oxides/hydroxides cake. Various types of filters including but not limited to Moore filters, filter presses, drum filters, candle filters etc. can be used as filtering equipment.

The mother liquor containing the dissolved metal compound or mixture of metal compounds is returned to prepare a new portion of titanium oxides/hydroxides slurry for salt treatment.

The cake resulting from filtration passes to Stage 500 of titanium oxides/hydroxides precipitate calcination.

The finished product is a cake of titanium oxides/hydroxides for the production of titanium dioxide pigment with a particle size of 100-1500 nm (to Stage 500).

Figure 8:
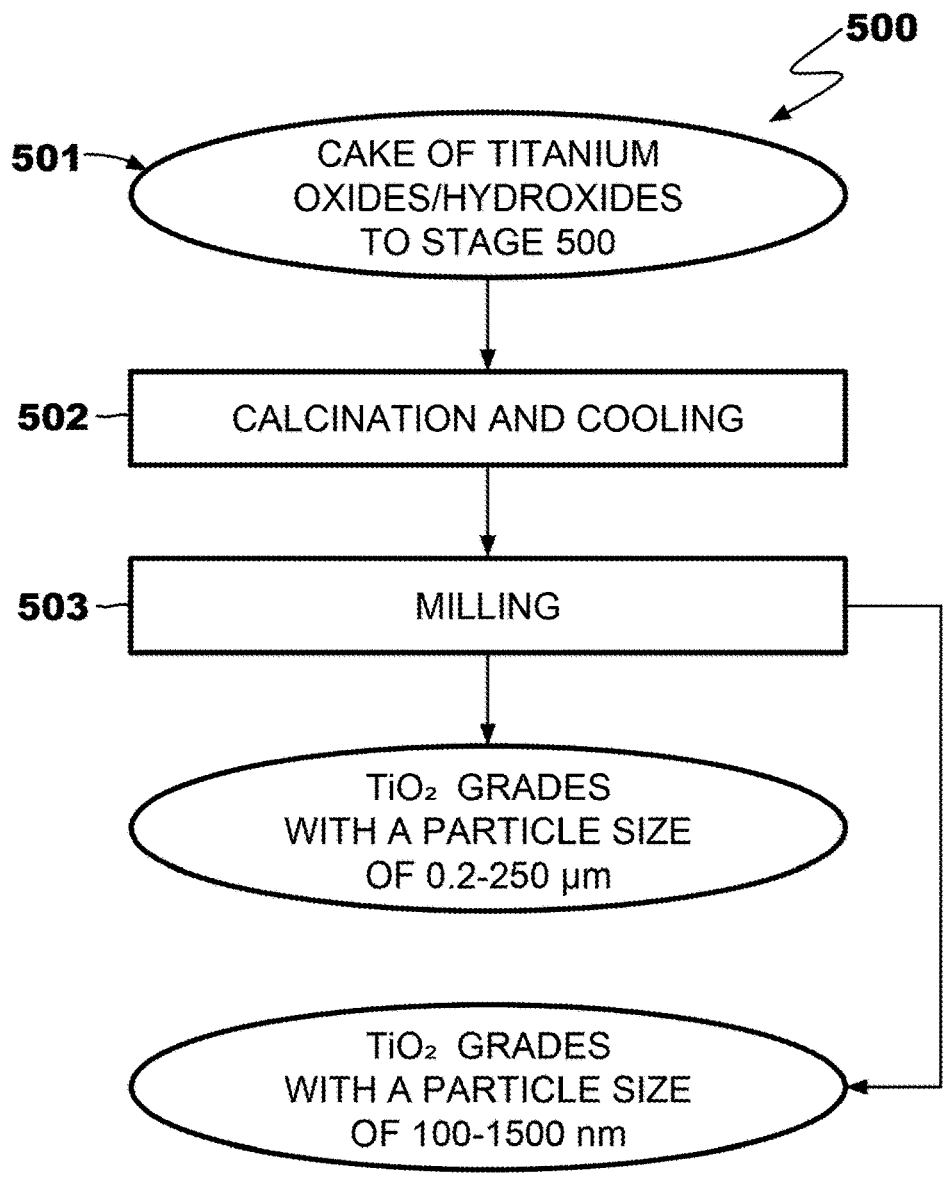
FIG. 8 is a flow diagram illustrating the stage of titanium oxides/hydroxides precipitate calcination.

FIG. 8 shows a flow diagram illustrating the Stage 500 of titanium oxides/hydroxides precipitate calcination.

The cake 501 of titanium oxides/hydroxide with a particle size of 0.2-250 μm obtained in Stage 400 is calcined 502 at a temperature in the range of 250-900° C., and the calcination time is 0.5-10 hours. In the process of calcination, free moisture is removed from the cake, and titanium hydroxide is converted into titanium oxide according to the following chemical reaction equation:

$$TiO(OH)_2 = TiO_2 + H_2O \tag{16}$$

In the production of titanium dioxide pigment with a particle size in the range of 100-350 nm, or of titanium dioxide with a particle size of 350-1500 nm, in which the resulting titanium dioxide is a material for infrared radiation scattering, calcination is carried out at a temperature in the range of 500-1000° C., and the calcination time is 0.5-10 hours. In the process of calcination, free moisture is removed from the cake, and titanium hydroxide is converted into titanium oxide according to the chemical reaction equation (16).

Titanium dioxide resulting from calcination is cooled, milled 503 and used for various purposes, depending on the production method. Examples of uses are given below:

The finished product is titanium dioxide with a particle size in the range of 0.2-50 μm which can be used as a feedstock in the production of metallic titanium, for example, for the technologies described in U.S. Nonprovisional application Ser. No. 16/783,885 and U.S. Nonprovisional application Ser. No. 17/005,986 (Applicant: VELTA HOLDING US INK and others).

The finished product is titanium dioxide with a particle size in the range of 50-250 m which can be used as a feedstock for the production of titanium tetrachloride in chloride titanium dioxide production, or in the production of metallic titanium by titanium recovery from its chlorides (the Kroll process, the Hunter process, the Armstrong process, etc.) and where the requirements for feedstock particle size, to ensure efficient chlorination process, exist, but without being limited to these applications.

The finished product is titanium dioxide with a particle size in the range of 100-350 nm which can be used as a white pigment, since it scatters electromagnetic radiation most effectively in the wavelength range of 400-700 nm visible to the human eye. Such titanium dioxide can be further subjected to surface treatment with inorganic and organic compounds, as well as to various types of milling according to methods well known to those skilled in the art, in order to achieve certain properties and characteristics depending on the requirements of the end uses which include but are not limited to production of various types of paper, plastics, paints and coatings.

The finished product is titanium dioxide with a particle size in the range of 350-1500 nm which can be used as a material for infrared radiation scattering, since it scatters electromagnetic radiation most effectively in the infrared wavelength range of 700-3000 nm. Such titanium dioxide can be further subjected to surface treatment with inorganic and organic compounds, as well as to various types of milling according to methods well known to those skilled in the art, in order to achieve certain properties and characteristics depending on the requirements of the end uses which include but are not limited to production of various types of paper, plastics, paints and coatings.

Figure 9:
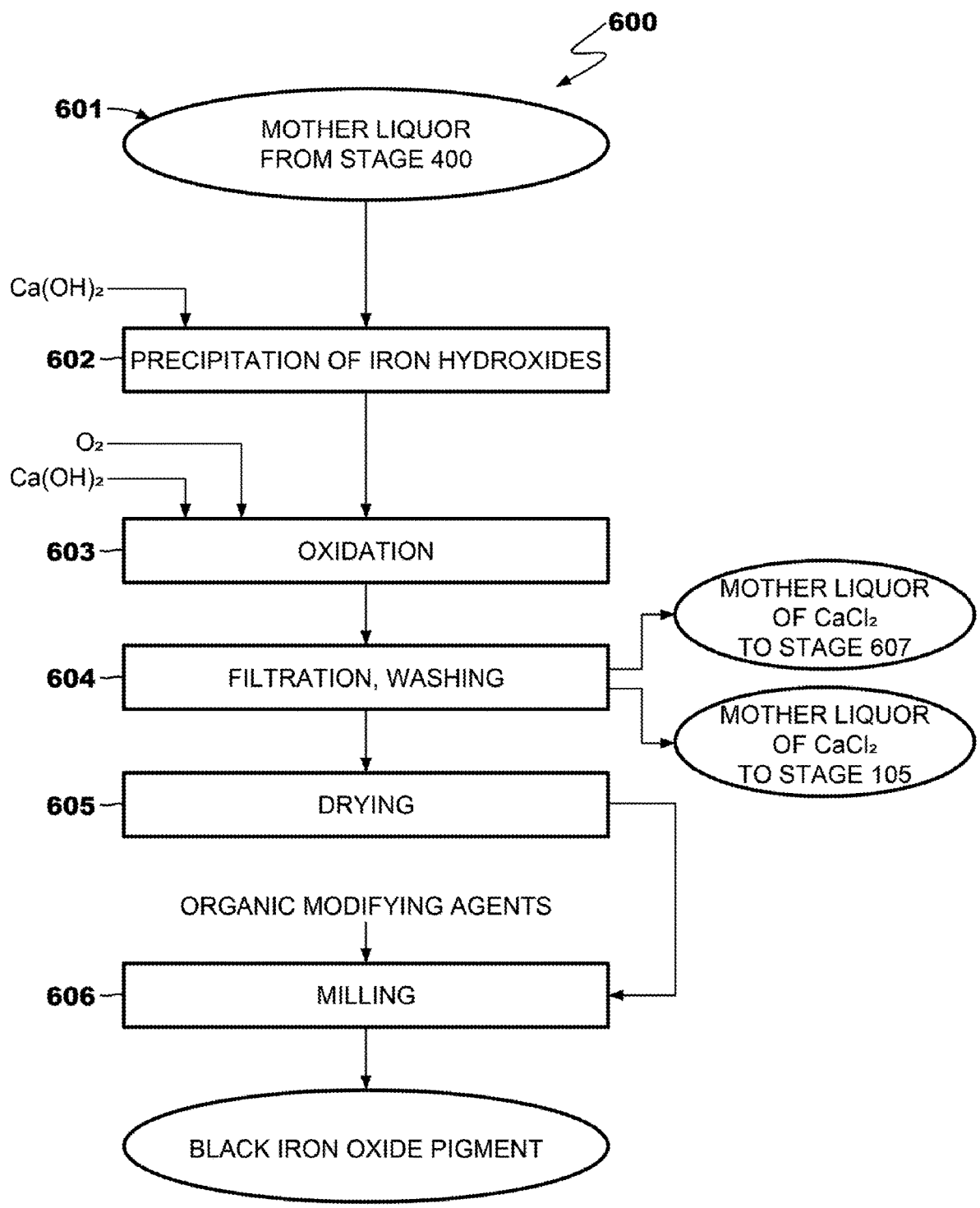
FIG. 9 is a flow diagram illustrating the stage of iron hydroxides precipitation to obtain black iron oxide pigment.

FIG. 9 shows a flow diagram illustrating the Stage 600 of iron hydroxides precipitation to obtain black iron oxide pigment.

Following the Stage 400 of titanium oxides/hydroxides precipitate washing from impurities, the mother liquor 601 with a temperature of 20-70° C. and containing iron chloride $FeCl_2$, calcium chloride $CaCl_2$ and free hydrochloric acid HCl, is loaded into the collecting tank; a pump provides continuous circulation of the liquor from the collecting tank through the iron oxide pigments synthesis reactor.

Simultaneously, milk of lime slurry with a $Ca(OH)_2$ content in the range between 5% and 35% is fed into the reactor to neutralize a part of the free hydrochloric acid. Neutralization (precipitation) 602 is carried out to pH=2.5-7.0, more preferably to pH=3.0-6.5, even more preferably to pH=3.5-5.5. The neutralization time is 0.5-5 hours.

The neutralization (precipitation) process 602 follows the reaction equation (6).

In this case, as the pH increases, the following reactions occur:

$$FeCl_2 + 2H_2O = Fe(OH)_2 + 2HCl \tag{17}$$

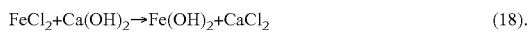

$$FeCl_2 + Ca(OH)_2 \rightarrow Fe(OH)_2 + CaCl_2 \tag{18}$$

After neutralization during the oxidation Stage 603, the reaction mass in the reactor is heated to a temperature of 70-100° C., more preferably to 75-95° C., even more preferably to 80-90° C., and air is supplied under the layer of the reaction mass at a rate in the range of 0.1-15 nm$^3$/minute per 1 m$^3$ of the solution in the reactor.

Oxidation 603 with air is carried out for 5-40 hours, with periodic adjustment of the pH using milk of lime slurry to neutralize the hydrogen chloride released as a result of the reaction according to the equation (17).

The following reactions occur during the process of oxidation 603:

$$2Fe(OH)_2 + H_2O + \tfrac{1}{2}O_2 = 2Fe(OH)_3 \quad (19)$$

$$2Fe(OH)_3 + Fe(OH)_2 = FeO \cdot Fe_2O_3 + 4H_2O \quad (20)$$

For the production of black iron oxide pigment, the oxidation degree representing the ratio of $Fe^{3+}$ to the total Fe must be 50-85% depending on the desired tint.

After cooling to a temperature below 70° C., the slurry is filtered 604 to separate the mother liquor from the cake being the black iron oxide pigment, and also to wash this cake from water-soluble salts. Various types of filters including, but not limited to Moore filters, filter presses, drum filters, candle filters etc. can be used as filtering equipment. The iron yield is 95-99%.

Thereafter, the black iron oxide cake is dried 605 at a temperature of 30-80° C. to remove free moisture. Various types of drying plants, including, for example, but not limited to fluidized bed dryers, vacuum dryers, Swirl Fluidizer type dryers (manufactured by GEA) or Spin Flash dryers (manufactured by Anhydro) etc. can be used for drying.

If necessary, the resulting pigment is subjected to surface modification with organic additives to improve dispersibility and impart the desired properties to pigment surface, for example, hydrophilicity for paints&coatings application, or hydrophobicity for plastics application.

For hydrophilic pigment grades, additives that can be used for these purposes include, but are not limited to polyatomic alcohols such as trimethylopropane, trimethylolethane, pentaerythritol, triethanolamine and others.

For hydrophobic pigment grades, additives that can be used for these purposes include, but are not limited to polydimethylsiloxanes, stearic acid, silanes, for example, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, phosphonic acids such as n-octyl phosphonic acid and others.

The dosage of these organic additives is 0.1 to 3% by weight of the pigment.

Thereafter, the pigment is milled 606, various types of milling equipment including, for example, but not limited to jet mills, centrifugal mills etc. can be used for milling.

Figure 10:
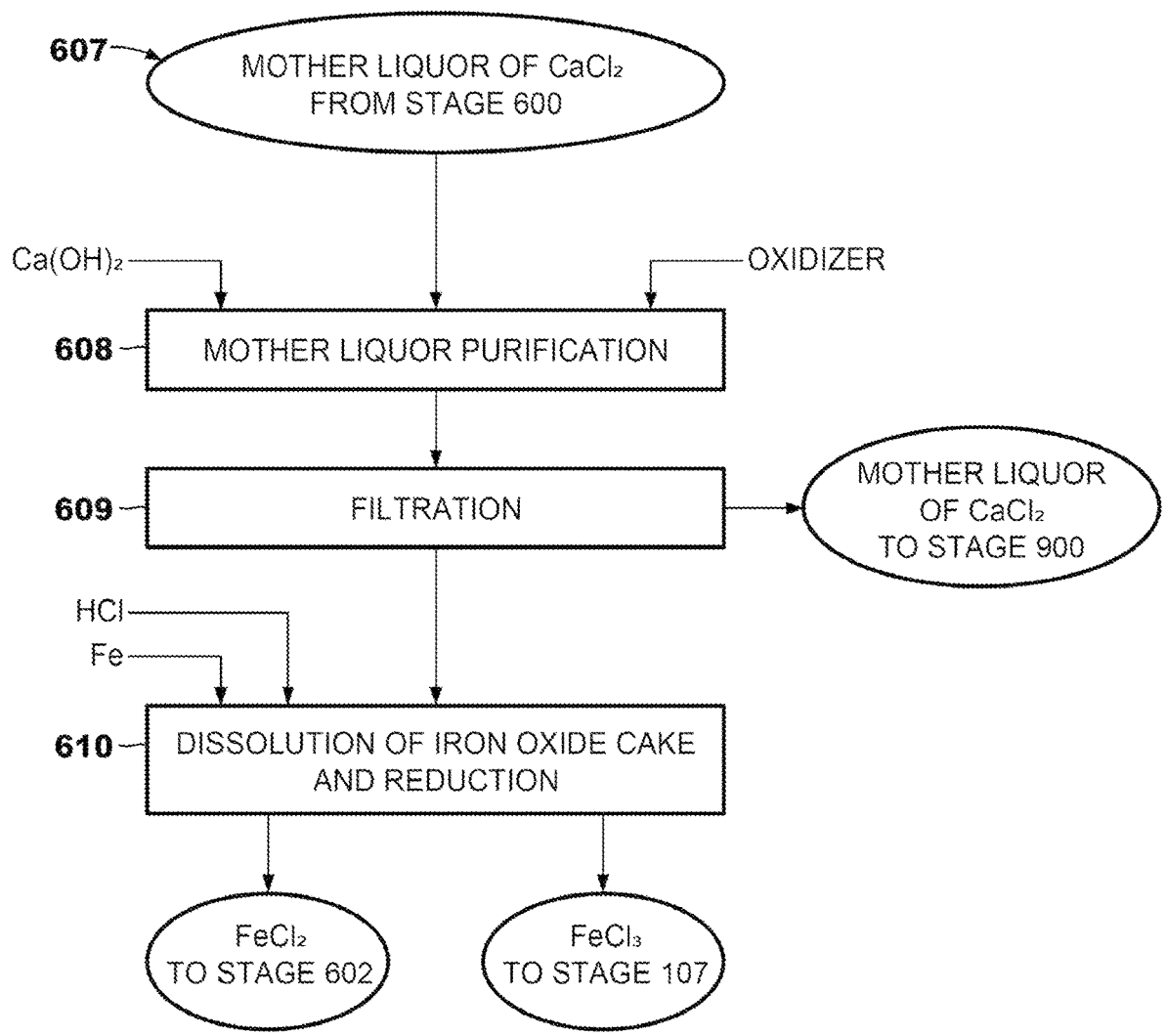
FIG. 10 is a flow diagram illustrating the stage of mother liquor purification from iron residues.

Returning to FIG. 10, which illustrates the stage of mother liquor purification from iron residues, the mother liquor 607 obtained in the stage of black 600 iron oxide pigment production, contains the residues of iron dissolved therein. To purify 608 from iron, an oxidizing agent being, for example, CaCl (ClO), Ca (ClO)$_2$, Cl$_2$, H$_2$O$_2$, but not limited to these, is introduced into the mother liquor to oxidize $Fe^{2+}$ to $Fe^{3+}$.

$$Fe^{2+} - e = Fe^{3+} \quad (21)$$

After that, the mother liquor is further neutralized to pH=7-12 with calcium hydroxide Ca(OH)$_2$. In this case, all iron precipitates as iron hydroxide Fe(OH)$_3$.

After neutralization, the resulting slurry is filtered 609 to separate the precipitated iron hydroxide from the mother liquor. Various types of filters including, but not limited to Moore filters, filter presses, drum filters, candle filters etc. can be used as filtering equipment.

The obtained iron hydroxide cake is dissolved 610 with a solution of hydrochloric acid, whereby a solution of iron chloride FeCl$_3$ with pH in the range of 0.5-2.0 is obtained.

In this case the following reaction occurs:

$$Fe(OH)_3 + 3HCl \rightarrow FeCl_3 + 3H_2O \quad (22)$$

After that, FeCl$_3$ is reduced either with iron pellets or iron scrap. In this case the following chemical reaction occurs:

$$2FeCl_3 + Fe = 3FeCl_2 \quad (23)$$

The resulting solution of iron chloride is sent to Stage 602, where it is mixed with the mother liquor from the stage of titanium oxides/hydroxides precipitate washing from impurities.

In another embodiment of the invention, the solution of iron chloride FeCl$_3$ with a pH in the range of 0.5-2.0 is returned to the reduction stage 107, where it is mixed with a solution of titanium oxychloride after digestion and reduced together with it.

Figure 11:
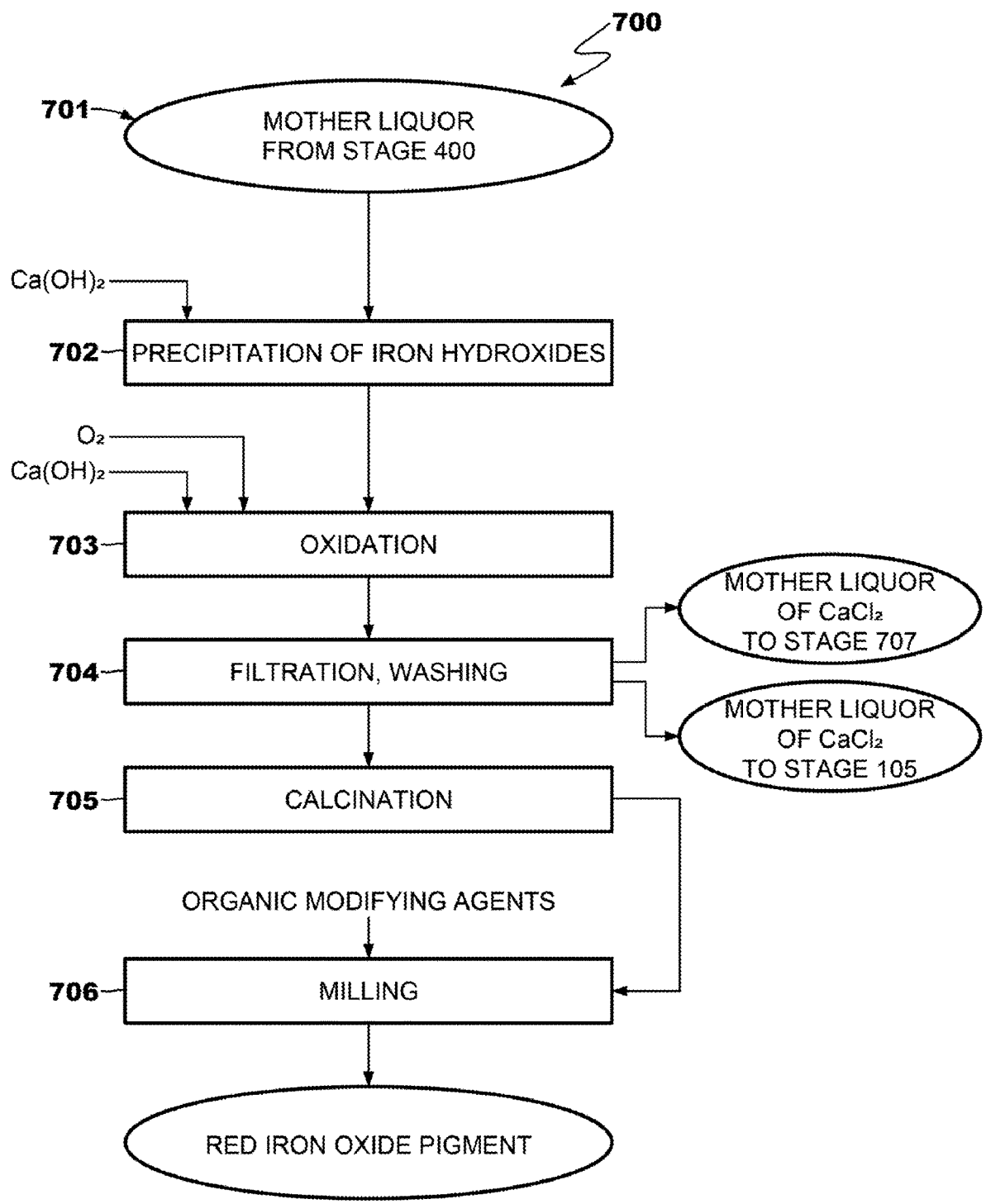
FIG. 11 is a flow diagram illustrating the stage of iron hydroxides precipitation to obtain red iron oxide pigment.

In yet another embodiment of the invention, as shown in FIG. 11, to obtain red iron oxide pigment, the mother liquor 701 from Stage 400 of titanium oxides/hydroxides precipitate washing from impurities, containing iron chloride FeCl$_2$, calcium chloride CaCl$_2$ and free hydrochloric acid HCl, and having a temperature of 20-70° C., is loaded into the collecting tank; a pump provides continuous circulation of the liquor from the collecting tank through the iron oxide pigments synthesis reactor.

Simultaneously, milk of lime slurry with a Ca(OH)$_2$ content in the range between 5% and 35% is fed into the reactor to neutralize a part of the free hydrochloric acid. Neutralization (precipitation) 702 is carried out to pH=2.5-7.0, more preferably to pH=3.0-6.5, even more preferably to pH=3.5-5.5. The neutralization time is 0.5-5 hours.

The neutralization (precipitation) process 702 follows the reaction equation (6).

In this case, as the pH increases, the reactions (17), (18) take place.

After neutralization during the oxidation Stage 703, the reaction mass in the reactor is heated to a temperature of 70-100° C., more preferably to 75-95° C., even more preferably to 80-90° C., and air is supplied under the layer of the reaction mass at a rate in the range of 0.1-15 nm$^3$/minute per 1 m$^3$ of the solution in the reactor.

Oxidation 703 with air is carried out for 5-40 hours, with periodic adjustment of the pH using milk of lime slurry to neutralize the hydrogen chloride released as a result of the reaction according to the equation (17).

The reactions (19), (20) occur during the process of oxidation 703.

For the production of red iron oxide pigment, the oxidation degree representing the ratio of $Fe^{3+}$ to the total Fe must be 50-85% depending on the desired tint.

After cooling to a temperature below 70° C., the slurry is filtered 704 to separate the mother liquor from the cake being the black iron oxide pigment, and also to wash this cake from water-soluble salts. Various types of filters including, but not limited to Moore filters, filter presses, drum filters, candle filters etc. can be used as filtering equipment. The iron yield is 95-99%.

Following that, the cake of black iron oxide pigment is subjected to calcination 705 at a temperature of 350-1000° C. for 1-10 hours.

During calcination the following chemical reaction occurs:

$$4FeO \cdot Fe_2O_3 + O_2 = 6Fe_2O_3 \quad (24)$$

The authors also noticed that the following parameters influence the tint of red iron oxide pigment:
degree of black iron oxide pigment oxidation, representing the ratio of $Fe^{3+}$ to the total Fe;
calcination temperature;
calcination time.

Thus, at a higher temperature and longer calcination time, browner tint with higher opacity is obtained; therefore, changing the time and temperature of calcination makes it possible to adjust the tints of the resulting red iron oxide pigments from less opaque light red ones, including pigments with beige tints, to more opaque dark red and brown, including pigments with purple tints.

Following calcination, the resulting pigment is cooled and, if necessary, subjected to surface modification with organic additives to improve dispersibility and impart the desired properties to pigment surface, for example, hydrophilicity for paints&coatings application, or hydrophobicity for plastics application.

For hydrophilic pigment grades, additives that can be used for these purposes include, but are not limited to polyatomic alcohols such as trimethylopropane, trimethylolethane, pentaerythritol, triethanolamine and others.

For hydrophobic pigment grades, additives that can be used for these purposes include, but are not limited to polydimethylsiloxanes, stearic acid, silanes, for example, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, phosphonic acids such as n-octyl phosphonic acid and others.

The dosage of these organic additives is 0.1 to 3% by weight of the pigment.

Thereafter, the pigment is milled 706, various types of milling equipment including, for example, but not limited to jet mills, centrifugal mills etc. can be used for milling.

Figure 12:
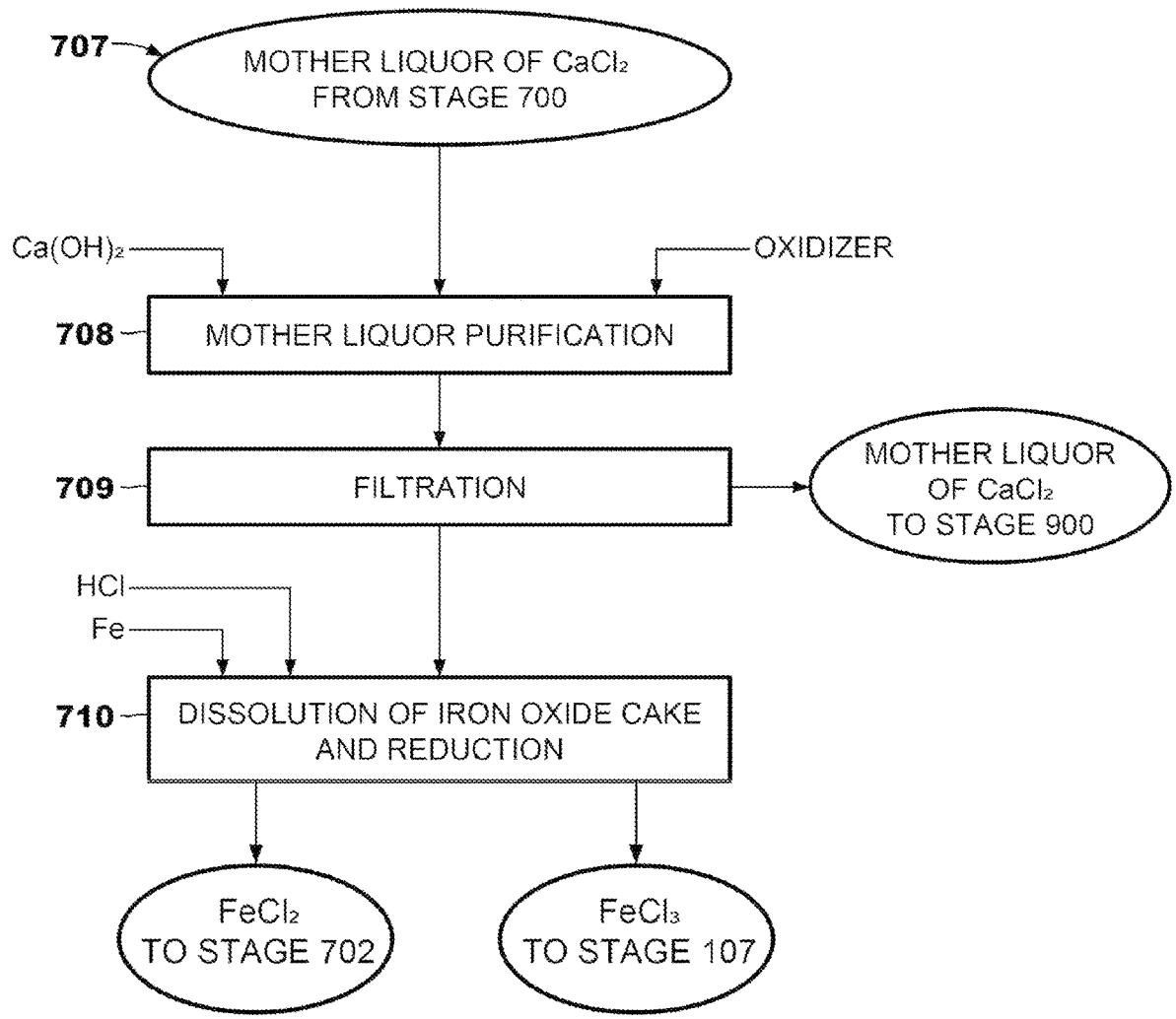
FIG. 12 is a flow diagram illustrating the stage of mother liquor purification from iron residues.

Returning to FIG. 12, which illustrates the stage of mother liquor purification from iron residues, the mother liquor 707 obtained in the stage of red 700 iron oxide pigment production, contains the residues of iron dissolved therein. To purify 708 from iron, an oxidizing agent being, for example, CaCl(ClO), Ca (ClO)$_2$, Cl$_2$, H$_2$O$_2$, but not limited to these, is introduced into the mother liquor to oxidize $Fe^{2+}$ to $Fe^{3+}$ according to the equation (21).

After that, the mother liquor is further neutralized to pH=7-12 with calcium hydroxide Ca(OH)$_2$. In this case, all iron precipitates as iron hydroxide Fe(OH)$_3$.

After neutralization, the resulting slurry is filtered 709 to separate the precipitated iron hydroxide from the mother liquor. Various types of filters including, but not limited to Moore filters, filter presses, drum filters, candle filters etc. can be used as filtering equipment.

The obtained iron hydroxide cake is dissolved 710 with a solution of hydrochloric acid, whereby a solution of iron chloride FeCl$_3$ with pH in the range of 0.5-2.0 is obtained.

In this case, the chemical reaction occurs according to the equation (22).

After that, FeCl$_3$ is reduced either with iron pellets or iron scrap. In this case the chemical reaction occurs according to the equation (23).

The resulting solution of iron chloride is sent to Stage 702, where it is mixed with the mother liquor from the stage of titanium oxides/hydroxides precipitate washing from impurities.

In another embodiment of the invention, the solution of iron chloride FeCl$_3$ with a pH in the range of 0.5-2.0 is returned to the reduction stage 107, where it is mixed with a solution of titanium oxychloride after digestion and reduced together with it.

Figure 13:
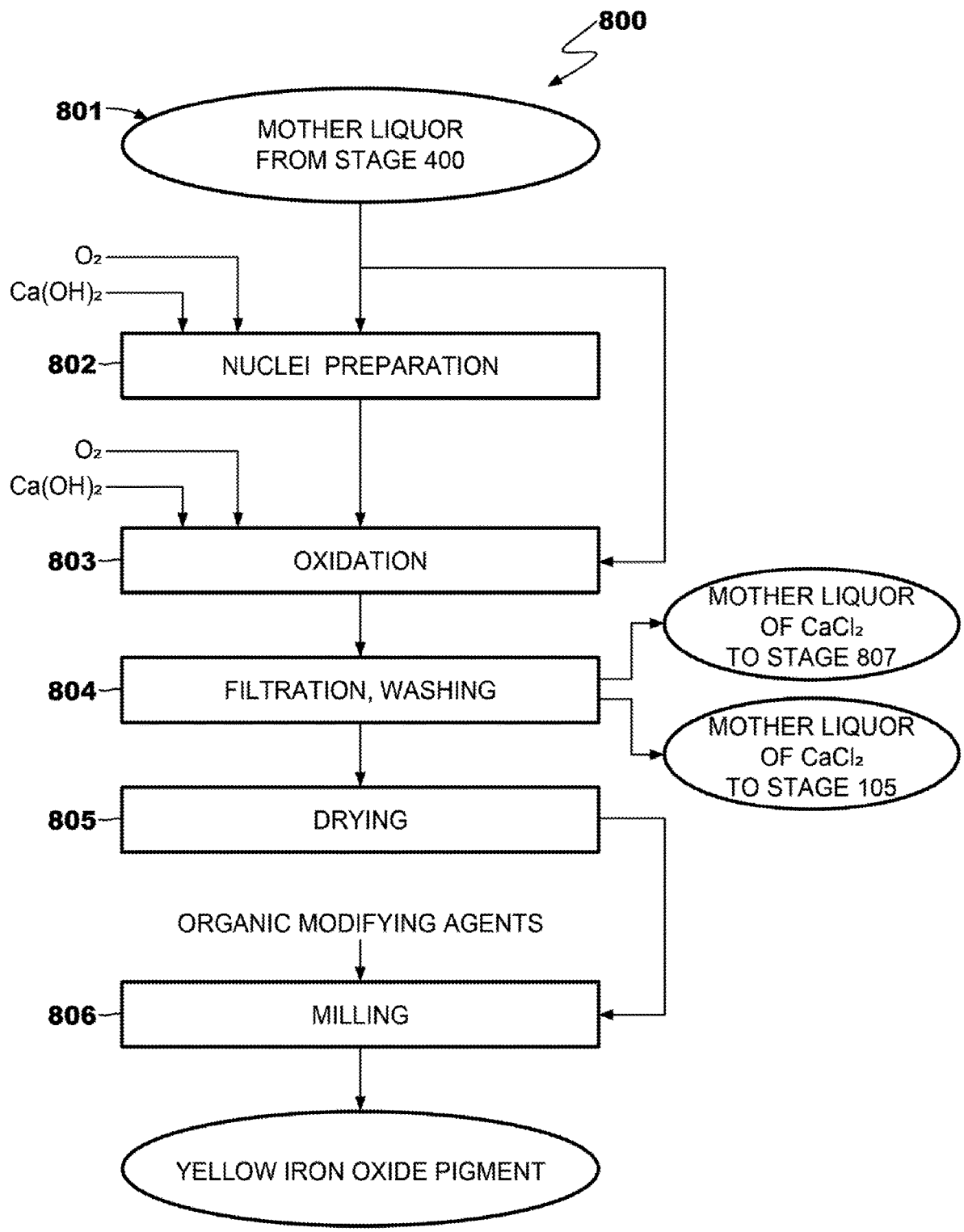
FIG. 13 is a flow diagram illustrating the stage of iron hydroxides precipitation to obtain yellow iron oxide pigment.

In yet another embodiment of the invention, as shown in FIG. 13, yellow iron oxide pigment can be obtained.

For this, part of the mother liquor 801 from Stage 400 of titanium oxides/hydroxides precipitate washing from impurities, containing iron chlorides FeCl$_2$, calcium chloride CaCl$_2$ and free hydrochloric acid HCl, and having a temperature of 20-70° C. is loaded into the collecting tank; if necessary it is cooled to a temperature of less than 50° C., more preferably of less than 40° C., even more preferably of less than 35° C. A pump provides continuous circulation of the liquor from the collecting tank through the synthesis reactor (Stage 802).

Simultaneously, milk of lime slurry with a Ca(OH)$_2$ content in the range between 5% and 35% is fed into the reactor to neutralize a part of the free hydrochloric acid according to the equation (6).

Neutralization is carried out to the degree of iron precipitation in the range 5-35%, more preferably 10-30%, even more preferably 15-20% according to the equations (17, 18). The neutralization time is 0.1-2 hours. Following neutralization, 0.1-2 hours' curing allows ripening of the nuclei, with continuous circulation of the slurry through the synthesis reactor. The slurry is dark green in color. After curing, the process of oxidation with compressed air oxygen begins, the air being supplied to the synthesis reactor during 5-40 hours with the rate of 0.1-15 nm$^3$/minute per 1 m$^3$ of solution in the reactor. In this case, the following reaction occurs:

$$4Fe(OH)_2 + O_2 \rightarrow 4FeOOH + 4H_2O \quad (25).$$

During the oxidation of iron hydroxide, the color of the slurry changes from dark blue-green to dull yellow.

After that, in Stage 803, the mother liquor from the stage of titanium oxides/hydroxides precipitate washing from impurities, containing iron chloride FeCl$_2$, calcium chloride CaCl$_2$ and free hydrochloric acid HCl, and having a temperature of 20-70° C. is added to the collecting tank with a ready-for-use nuclei slurry of dull yellow color, with a ratio of Fe contained in the mother liquor to Fe that has precipitated in the nuclei slurry from 10:1 to 1:1.

Following that, the resulting reaction mass is heated (Stage 803) to 50-85° C., more preferably to 60-80° C., even more preferably to 70-75° C., and air is supplied under the layer of the reaction mass at a rate in the range of 0.1-15 nm$^3$/minute per 1 m$^3$ of solution in the reactor. At the same time, milk of lime slurry with a Ca(OH)$_2$ content in the range between 5% and 35% is supplied to the synthesis reactor to neutralize part of free hydrochloric acid. Neutralization is carried out to pH=2.5-6.0, more preferably to pH=3.0-5.5, even more preferably to pH=3.5-5.0. The process of oxidation with air is carried out for 5-40 hours, while the pH is periodically adjusted using milk of lime slurry to neutralize the hydrogen chloride released as a result of the reaction according to the equation (17).

The end of the process is determined by the content of residual dissolved iron, which must not exceed 15 g/dm$^3$, more preferably 10 g/dm$^3$, even more preferably 5 g/dm$^3$.

After cooling to a temperature below 70° C., the slurry is filtered 804 to separate the mother liquor from the cake being the yellow iron oxide pigment, and also to wash this cake from water-soluble salts. Various types of filters including, but not limited to Moore filters, filter presses, drum filters, candle filters etc. can be used as filtering equipment.

Thereafter, the yellow iron oxide cake is dried 805 at a temperature of 30-80° C. to remove free moisture. Various types of drying plants, including, for example, but not limited to fluidized bed dryers, vacuum dryers, Swirl Fluidizer type dryers (manufactured by GEA) or Spin Flash dryers (manufactured by Anhydro) etc. can be used for drying.

If necessary, the resulting pigment is subjected to surface modification with organic additives to improve dispersibility and impart the desired properties to pigment surface, for example, hydrophilicity for paints&coatings application, or hydrophobicity for plastics application.

For hydrophilic pigment grades, additives that can be used for these purposes include, but are not limited to polyatomic alcohols such as trimethylopropane, trimethylolethane, pentaerythritol, triethanolamine and others.

For hydrophobic pigment grades, additives that can be used for these purposes include, but are not limited to polydimethylsiloxanes, stearic acid, silanes, for example, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, phosphonic acids such as n-octyl phosphonic acid and others.

The dosage of these organic additives is 0.1 to 3% by weight of the pigment.

Thereafter, the pigment is milled 806, various types of milling equipment including, for example, but not limited to jet mills, centrifugal mills etc. can be used for milling.

Figure 14:
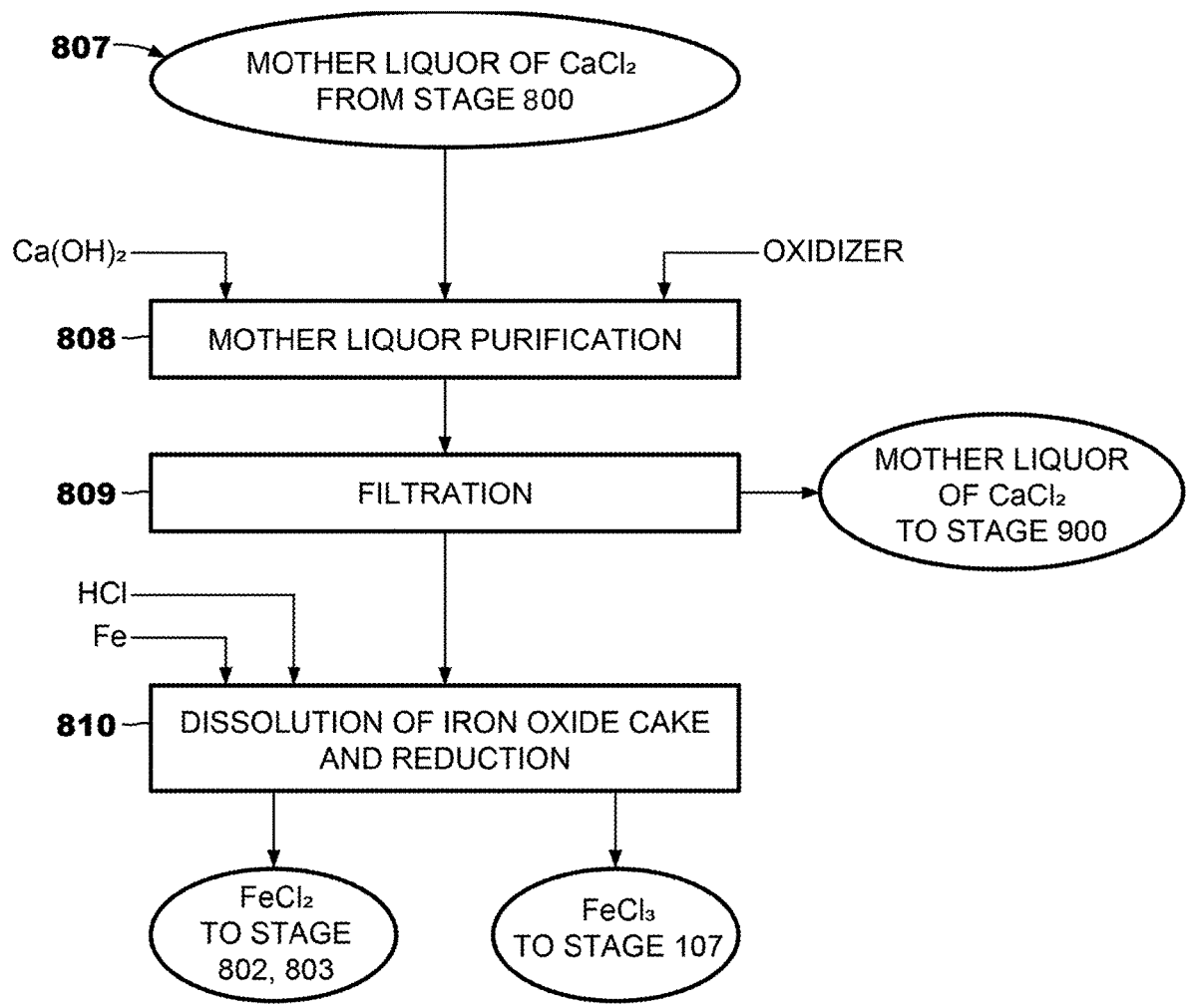
FIG. 14 is a flow diagram illustrating the stage of mother liquor purification from iron residues.

Returning to FIG. 14, which illustrates the stage of mother liquor purification from iron residues, the mother liquor 807 obtained in the stage of yellow 800 iron oxide pigment production, contains the residues of iron dissolved therein. To purify 808 from iron, an oxidizing agent being, for example, $CaCl(ClO)$, $Ca(ClO)_2$, $Cl_2$, $H_2O_2$, but not limited to these, is introduced into the mother liquor to oxidize $Fe^{2+}$ to $Fe^{3+}$ according to the equation (21).

After that, the mother liquor is further neutralized to pH=7-12 with calcium hydroxide $Ca(OH)_2$. In this case, all iron precipitates as iron hydroxide $Fe(OH)_3$.

After neutralization, the resulting slurry is filtered 809 to separate the precipitated iron hydroxide from the mother liquor. Various types of filters including, but not limited to Moore filters, filter presses, drum filters, candle filters etc. can be used as filtering equipment.

The obtained iron hydroxide cake is dissolved 810 with a solution of hydrochloric acid, whereby a solution of iron chlorides $FeCl_2$ and $FeCl_3$ with pH in the range of 0.5-2.0 is obtained.

In this case, the chemical reaction occurs according to the equation (22).

After that, $FeCl_3$ is reduced either with iron pellets or iron scrap. In this case the chemical reaction occurs according to the equation (23).

The resulting solution of iron chloride is sent to Stage 802 or 803, where it is mixed with the mother liquor from the stage of titanium oxides/hydroxides precipitate washing from impurities.

In another embodiment of the invention, the solution of iron chloride $FeCl_3$ with a pH in the range of 0.5-2.0 is returned to the reduction stage 107, where it is mixed with a solution of titanium oxychloride after digestion and reduced together with it.

Figure 15:
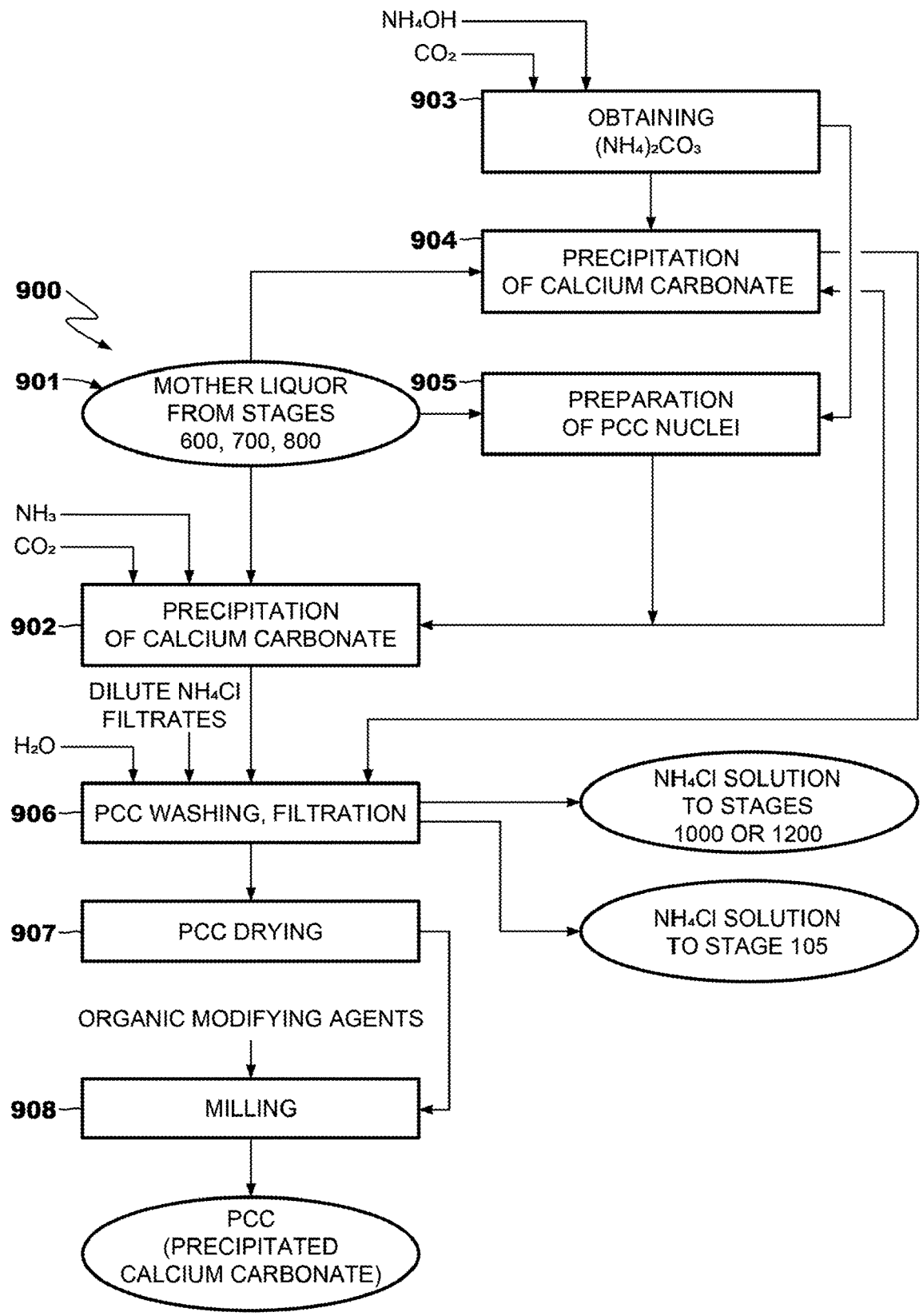
FIG. 15 is a flow diagram illustrating the stage to process the mother liquor containing calcium chloride.

FIG. 15 shows a flow diagram illustrating the Stage 900 to process the mother liquor containing calcium chloride.

The mother liquor 901 containing calcium chloride comes from the Stages 600, 700, 800 and is fed to the scrubber against the flow of gas containing $CO_2$. Also, immediately before the reaction zone, gaseous ammonia is introduced into the $CO_2$-containing gas stream. Various types of equipment including, but not limited to MECS/DuPont Dynawave foam scrubbers, or packed-bed scrubbers or jet scrubbers, providing vigorous spraying of calcium chloride solution etc. can be used for this purpose. Due to the design features of a particular type of scrubbers, the contact area of the mother liquor in the reaction zone increases and calcium chloride contained in the solution interacts chemically with $CO_2$ and $NH_3$ according to the following reaction:

$$2NH_3+CO_2+CaCl_2+H_2O=CaCO_3+2NH_4Cl \tag{26}$$

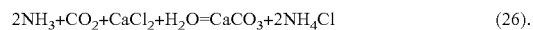

The resulting poorly water-soluble calcium carbonate precipitates 902 (the so-called precipitated calcium carbonate, PCC) to form an aqueous PCC slurry. Ammonium chloride remains dissolved in water.

The process is carried out with an excess of ammonia 0.1-5% and an excess of $CO_2$ of at least 1% relative to the stoichiometric requirement in order to ensure the complete conversion of all calcium chloride in the solution into calcium carbonate. The temperature of the reaction mass after the reaction is 20-95° C., more preferably 40-95° C., even more preferably 60-95° C.

In one embodiment of the present invention, a solution of ammonium carbonate is separately prepared 903 by capturing $CO_2$ from gases containing it, with ammonia water solution containing 5-25% of $NH_4OH$, which results in the following reaction:

$$2NH_4OH+CO_2=(NH_4)_2CO_3+H_2O \tag{27}$$

Next, with an agitator constantly stirring, the calculated amount of the ammonium carbonate solution is added to the reactor containing calcium chloride mother liquor. As a result, the following reaction occurs:

$$(NH_4)_2CO_3+CaCl_2=CaCO_3+2NH_4Cl \tag{28}$$

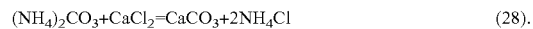

The resulting poorly water-soluble calcium carbonate precipitates 904 to form an aqueous PCC slurry. Ammonium chloride remains dissolved in water.

The process is carried out with an excess of ammonium carbonate 0.1-5% relative to the stoichiometric requirement in order to ensure the complete conversion of all calcium chloride in the solution into calcium carbonate. The temperature of the process is 20-60° C.

$CO_2$ sources for all embodiments of this invention can be exhaust gases generated, for example, as a result of limestone calcination, exhaust gases from gas turbine co-generation plants, gas boilers, gas burners of calciners and dryers, waste $CO_2$ from ammonia production, as well as gases from any other $CO_2$ source.

To control the rate of PCC precipitation PCC nuclei being nanosized PCC crystals, prepared separately, can be introduced into calcium chloride solution before it is fed to the scrubber or before mixing it with ammonium carbonate solution, in an amount of 0.1 to 5% by weight of $CaCl_2$.

Preparation of PCC nuclei is carried out in Stage 905 in a separate reactor as follows:

A solution of ammonium carbonate cooled to 5-20° C. with a $(NH_4)_2CO_3$ content of 5-25% is rapidly added into calcium chloride solution cooled to 5-20° C. with a $CaCl_2$ content of 50-300 g/dm³, with rapid stirring. At the same time, high-intensity cooling of the reaction mass is provided to prevent the temperature rise above 50° C., more preferably above 40° C., even more preferably above 30° C. The rate of ammonium carbonate solution addition to the calcium chloride solution is from 50 to 3000 dm$^3$/minute per each 1 m$^3$ of ammonium chloride solution in the reactor. The calculated amount of ammonium carbonate is 1-5% excess relative to the stoichiometric requirement according to the equation (28).

After adding the calculated amount of ammonium carbonate solution to the reactor, the reaction mass containing PCC nuclei is cooled to 5-15° C., after which the nuclei can be used in production within 48 hours from preparation, more preferably within 24 hours from preparation, even more preferably within 12 hours from preparation.

After synthesis, the PCC slurry passes to the stage of adjustment, where the pH is adjusted to 6-8 using hydrochloric acid.

Following that, the slurry is processed to separate PCC from the mother liquor and wash the PCC cake 906 from water-soluble impurities. Suitable equipment can include, but is not limited to drum vacuum filters, Moore vacuum filters, filter presses, batch type filtering centrifuges, centrifuges with continuous discharge of solids, candle filters etc.

PCC is washed with dilute filtrates containing NH$_4$Cl: first, with more concentrated filtrates containing at least 10% but less than 20% NH$_4$Cl, then with less concentrated filtrates containing more than 5% but less than 10% NH$_4$Cl, then with even less concentrated filtrates containing less than 5% NH$_4$Cl; and at the end the solid precipitate is washed with demineralized water with a specific conductivity of 10-50 μS/cm to remove NH$_4$Cl from the solid precipitate to less than 0.05% by weight of the solid precipitate. The filtrates from washing are collected and reused to wash new portions of the solid PCC precipitate until the filtrates reach a saturation of 10-20% NH$_4$Cl, i.e. become the so-called saturated filtrates.

Next, the mother liquor containing NH$_4$Cl, as well as saturated filtrates with an NH$_4$Cl content of 10-20%, are sent to Stage 1000 of hydrogen chloride regeneration from ammonium chloride solution.

In another embodiment of the invention, the mother liquor containing NH$_4$Cl, as well as saturated filtrates with an NH$_4$Cl content of 10-20%, are sent to Stage 1200 of crystalline ammonium chloride production.

The PCC cake washed from water-soluble impurities (with water-soluble impurities content of 0.01-0.5%) is dried 907 at a temperature of 100-200° C. to remove free moisture. Various types of drying plants, including, for example, but not limited to fluidized bed dryers, vacuum dryers, Swirl Fluidizer type dryers (manufactured by GEA) or Spin Flash dryers (manufactured by Anhydro) etc. can be used for drying.

Following that, the dried PCC is milled 908 and, if necessary, is subjected to surface modification with organic additives to improve dispersibility and impart the desired properties to PCC surface, for example, hydrophilicity for paints&coatings application, or hydrophobicity for plastics application.

For hydrophilic PCC grades, additives that can be used for these purposes include, but are not limited to polyatomic alcohols such as trimethylopropane, trimethylolethane, pentaerythritol, triethanolamine and others.

For hydrophobic PCC grades, additives that can be used for these purposes include, but are not limited to polydimethylsiloxanes, stearic acid, silanes, for example, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, phosphonic acids such as n-octyl phosphonic acid and others.

The dosage of these organic additives is 0.1 to 3% by weight of PCC.

The mother liquor processing results in precipitated calcium carbonate as a finished product.

Figure 16:
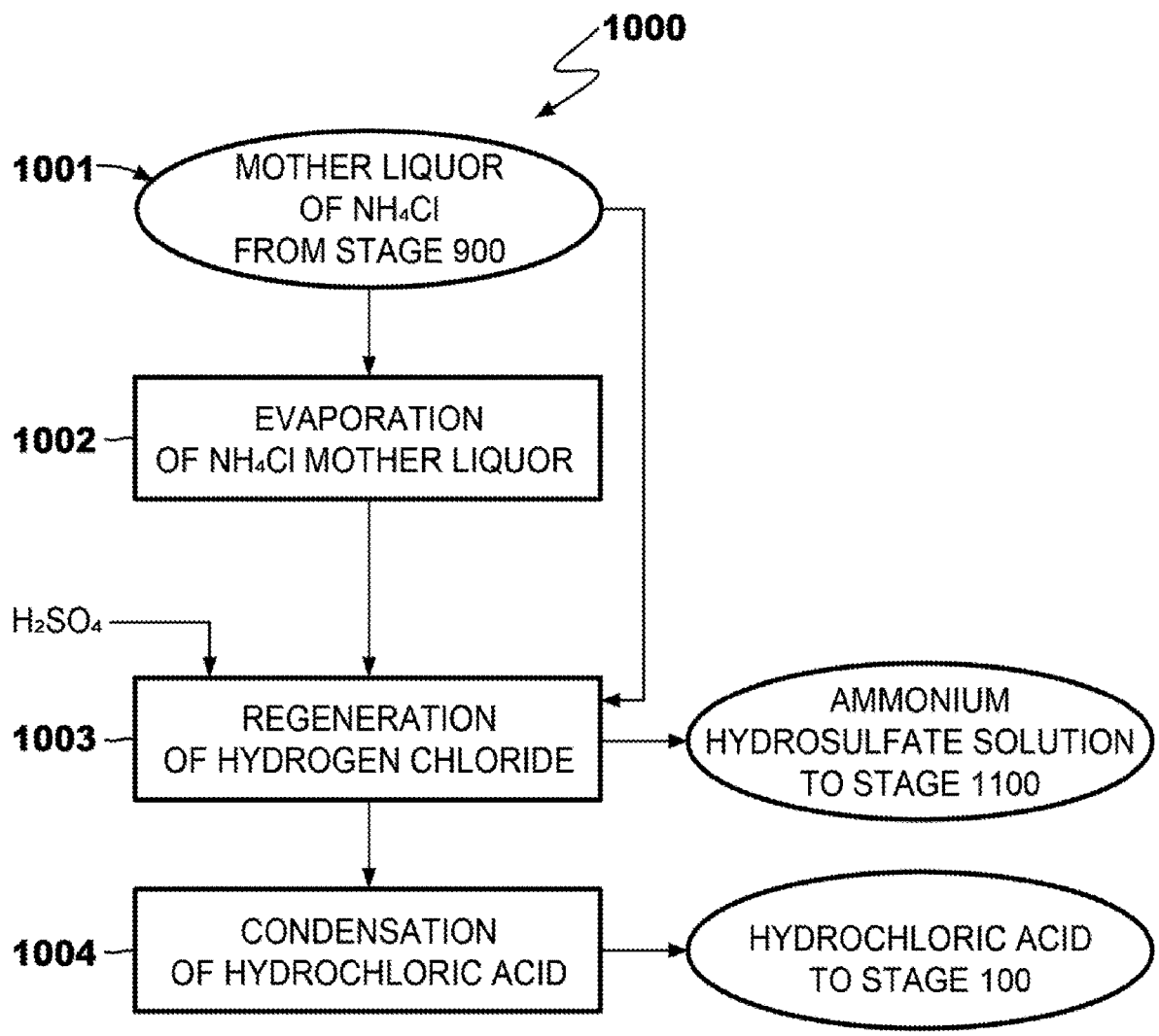
FIG. 16 is a flow diagram illustrating the stage of hydrogen chloride regeneration from ammonium chloride solution.

FIG. 16 shows a flow diagram illustrating the Stage 1000 of hydrogen chloride regeneration from ammonium chloride solution. The mother liquor and concentrated ammonium chloride filtrates 1001 coming from Stage 900 of processing of the mother liquor containing calcium chloride, are fed into the reactor. To increase the concentration of the obtained hydrochloric acid, the mother liquor of ammonium chloride can be pre-evaporated to a concentration of NH$_4$Cl≤773 g/dm$^3$. Evaporation 1002 is carried out both under normal conditions with an absolute pressure of 1 bar and under vacuum with an absolute pressure of 0.05-0.95 bar. Using a vacuum makes it possible to lower the boiling point of the solution; the deeper the vacuum, the lower the boiling point. Due to the evaporation of water, the concentration of ammonium chloride in the solution increases, and when the solubility limit is reached, ammonium chloride begins to crystallize from the solution.

Following that, in Stage 1003, sulfuric acid with a concentration of 50-100%, more preferably 65-100%, even more preferably 95-100%, is fed into the reactor with thorough stirring in such an amount that must satisfy the ratio NH$_4$Cl:H$_2$SO$_4$ 1:1.55÷2.25, more preferably 1:1.65÷2.15, even more preferably 1:1.75÷2.05.

The reaction mass is heated as a result of the ongoing exothermic reaction and the release of heat due to dissolution of sulfuric acid in water; if necessary, the reaction mass is heated 1003 to a temperature of 100-220° C., the absolute pressure is maintained in the range of 0.15-1 bar. In this case, the following chemical reaction occurs:

$$NH_4Cl+H_2SO_4=NH_4HSO_4+HCl \qquad (29).$$

Vapors of hydrochloric acid released during this process are removed from the reactor through a heat exchanger 1004, irrigated with cooled water with a temperature of 7-30° C., where hydrochloric acid is condensed to reach an HCl content of 10-35%. The hydrochloric acid solution is continuously removed from the heat exchanger and collected in a separate collecting tank to be returned to Stage 100 of titanium-containing feedstock digestion.

As a result of continuous removal of gaseous hydrogen chloride from the solution, the equilibrium of the reaction (27) is shifted to the right towards the formation of NH$_4$HSO$_4$ according to the Le Chatelier's principle. The process is carried out until the complete removal of hydrogen chloride from the reaction mass is achieved.

Figure 17:
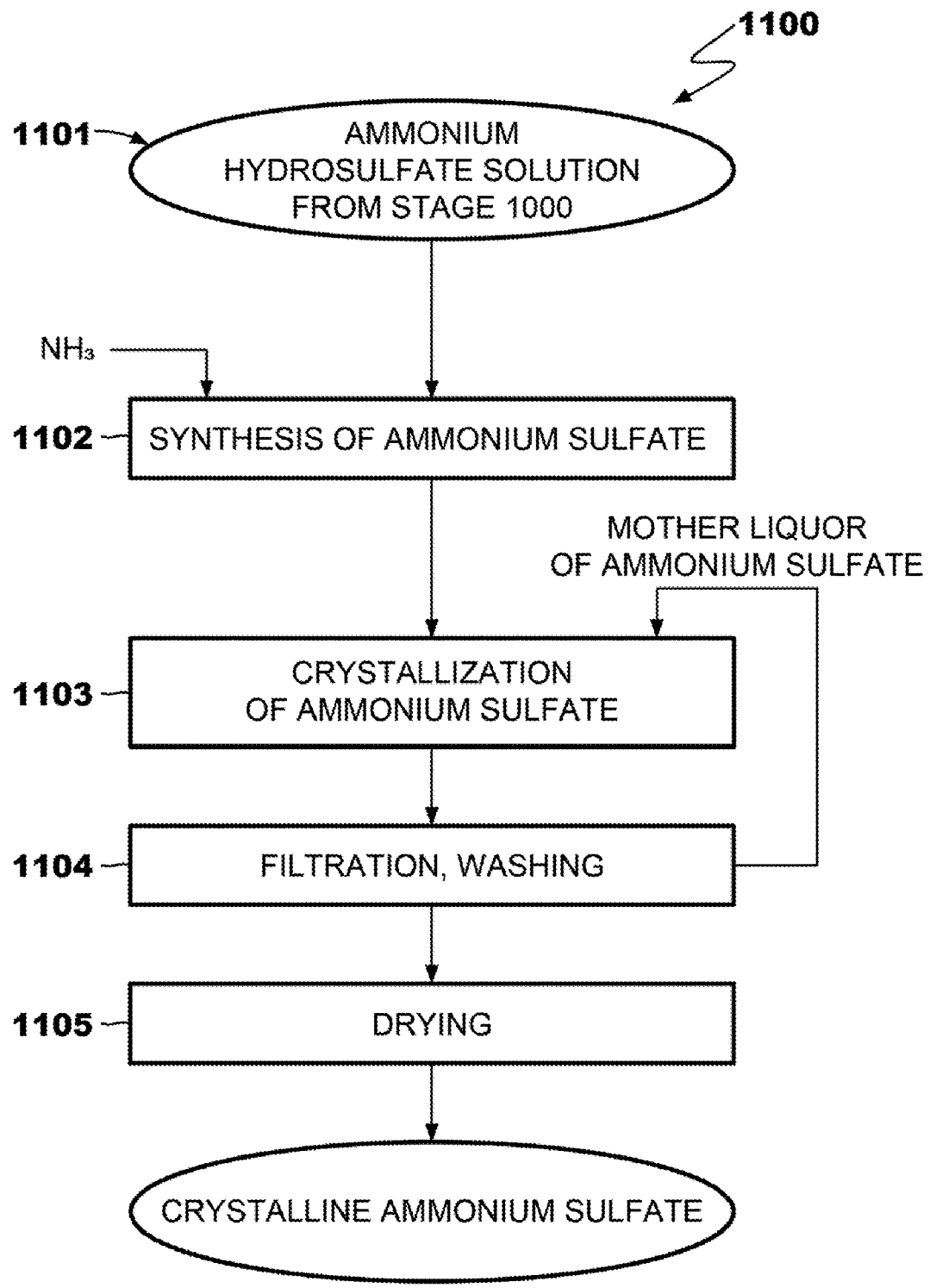
FIG. 17 is a flow diagram illustrating the stage of obtaining ammonium sulfate and ammonium sulfate crystallization.

FIG. 17 shows a flow diagram illustrating the Stage 1100 of obtaining ammonium chloride and its crystallization.

The reaction mass obtained in Stage 1100 of hydrogen chloride regeneration from ammonium chloride solution 1101, consisting of crystals of ammonium hydrogen sulfate NH$_4$HSO$_4$ and the mother liquor being a saturated solution of ammonium hydrogen sulfate, is dissolved with water until the crystals of ammonium hydrogen sulfate are completely dissolved, and simultaneously heated, if necessary, to 60-95° C., to obtain ammonium hydrogen sulfate solution with a NH$_4$HSO$_4$ content of 45-70%. Following that, the resulting ammonium hydrogen sulfate solution is fed 1102 to the scrubber against the flow of gaseous ammonia. Various types of equipment including, but not limited to MECS/DuPont Dynawave foam scrubbers, or packed-bed scrubbers or jet scrubbers, providing vigorous spraying of ammonium hydrogen sulfate solution etc. can be used for this purpose. As a result, the following chemical reaction occurs:

$$NH_4HSO_4 + NH_3 = (NH_4)_2SO_4 \tag{30}$$

The resulting sulfate solution is subjected to evaporation and ammonium sulfate is crystallized 1103 therefrom. Evaporation is carried out both under normal conditions with an absolute pressure of 1 bar and under vacuum with an absolute pressure of 0.05-0.95 bar. Using a vacuum makes it possible to lower the boiling point of the solution; the deeper the vacuum, the lower the boiling point. Due to the evaporation of water, the concentration of ammonium sulfate in the solution increases, and when the solubility limit is reached, ammonium sulfate begins to crystallize from the solution. Various types of equipment including, but not limited to DTB Crystallizers, Forced Circulation Crystallizers, Oslo Crystallizers can be used for evaporation and crystallization.

The slurry containing ammonium sulfate crystals with a solid content of $(NH_4)_2SO_4$ in the range of 5-50% is then processed by filtration 1104 or centrifugation to separate it from the mother liquor; then it is washed with water, if necessary, and dried 1105 at a temperature of 50-150° C. to remove free moisture.

Following the separation of ammonium sulfate crystals the mother liquor is mixed with new portions of ammonium sulfate solution coming from ammonium sulfate production stage; the resulting mixture is evaporated and ammonium sulfate is crystallized. The resulting finished product is crystalline ammonium sulfate.

Figure 18:
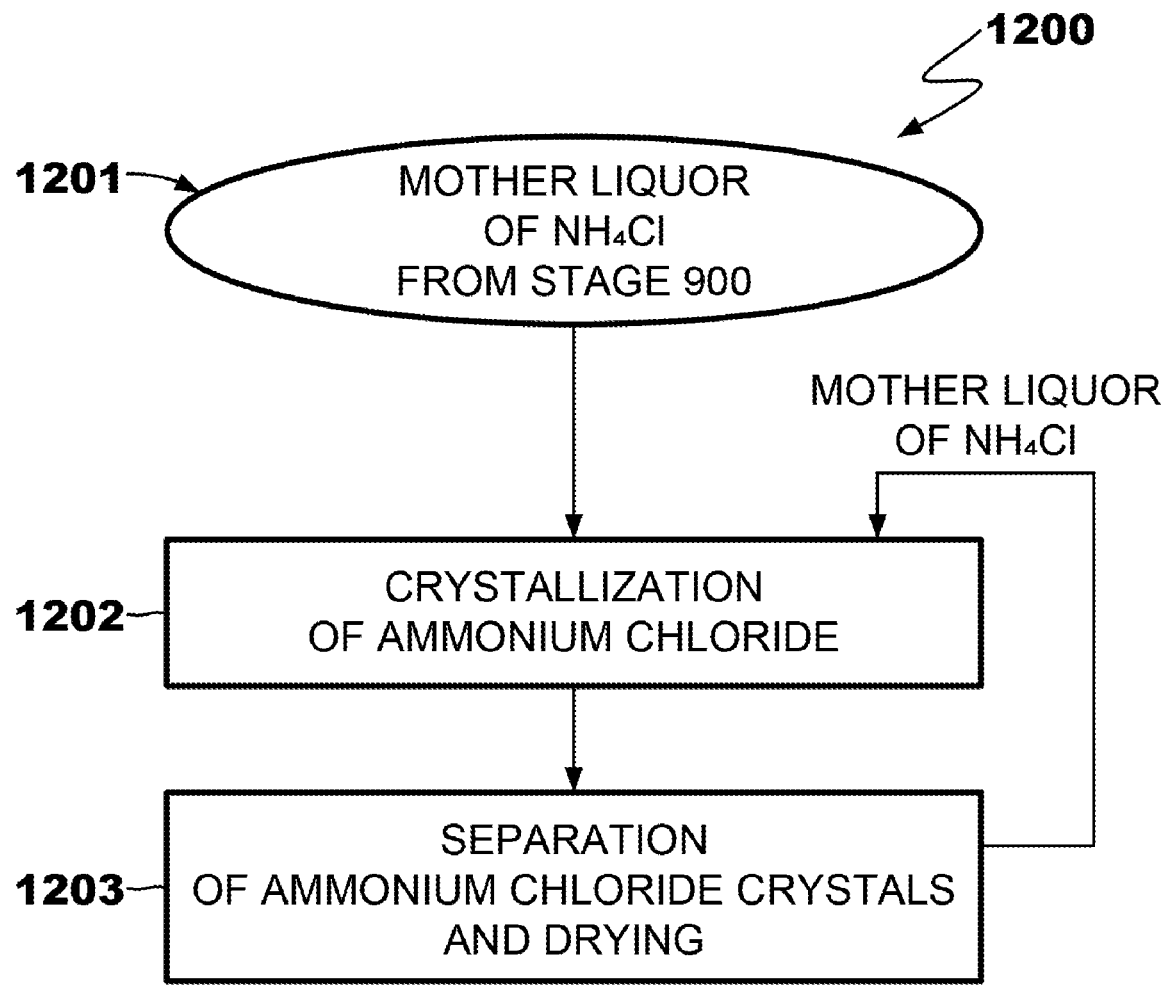
FIG. 18 is a flow diagram illustrating the stage of obtaining crystalline ammonium chloride (as an alternative).

FIG. 18 shows a flow diagram illustrating the Stage 1200 of obtaining ammonium sulfate and ammonium sulfate crystallization.

In one of the alternative embodiments of the present invention, the mother liquor 1201 and concentrated ammonium chloride filtrates coming from the Stage 900 of the processing of the mother liquor containing calcium chloride, are evaporated to crystallize ammonium chloride from them. Evaporation 1202 is carried out both under normal conditions with an absolute pressure of 1 bar and under vacuum with an absolute pressure of 0.05-0.95 bar. Using a vacuum makes it possible to lower the boiling point of the solution; the deeper the vacuum, the lower the boiling point. Due to the evaporation of water, the concentration of ammonium chloride in the solution increases, and when the solubility limit is reached, ammonium chloride begins to crystallize from the solution. Various types of equipment including, but not limited to DTB Crystallizers, Forced Circulation Crystallizers, Oslo Crystallizers can be used for evaporation and crystallization. The slurry containing ammonium chloride crystals with a solid content of $NH_4Cl$ in the range of 5-50% is then processed by filtration or centrifugation to separate it from the mother liquor; then it is washed 1203 with water, if necessary, and dried at a temperature of 50-150° C. to remove free moisture.

Following the separation of ammonium chloride crystals the mother liquor is mixed with new portions of the mother liquor and concentrated ammonium chloride filtrates coming from the stage of processing of the mother liquor containing calcium chloride; the resulting mixture is evaporated and ammonium chloride is crystallized.

The resulting finished product is crystalline ammonium chloride.

The following examples illustrate but do not limit the present invention.

Example 1

1. Digestion of Ilmenite Concentrate

Milled ilmenite concentrate (with $TiO_2$ content of 58.0 wt %; FeO—16.5%, $Fe_2O_3$—19.7%, $P_2O_5$—0.07%) with a particle size of 5-45 μm and hydrochloric acid with a concentration of at least 30% HCl were used for digestion.

Hydrochloric acid is the acid:
  i. returned from the stage of titanium oxychloride hydrolysis;
  ii. obtained from ammonium chloride solutions in hydrogen chloride regeneration stage.

The digestion was carried out in two stages in a countercurrent system. The first digestion stage used hydrochloric acid and the unreacted solid part (sludge) from the second digestion stage, and the second digestion stage used the solution from the first digestion stage containing titanium oxychloride and iron chlorides and mechanically activated ilmenite concentrate.

Heating was carried out through the water jacket of the digestion reactor; stirring was performed with an overhead stirrer, stirring speed: 200 rpm.

After the first digestion stage the sludge was separated from the mother liquor using a candle filter and sent to the stage of processing the solid residue after ilmenite concentrate digestion, and the filtrate was sent to the second stage of ilmenite digestion. After the second digestion stage, the sludge was separated from the mother liquor in a candle filter and sent to the first digestion stage, and the filtrate was sent to the stage of reduction of ferric iron to its ferrous state.

For one digestion cycle, 238 kg of milled ilmenite concentrate and 1380 liters of hydrochloric acid with an HCl content of 30% were used. The digestion was carried out at a temperature of 60° C. The stage to digest the milled ilmenite concentrate lasted 5 hours, and the stage to digest the unreacted solid part (sludge) lasted 8 hours.

The last filtration stage in a candle filter yielded 1165 liters of mother liquor, while 10 liters of mother liquor remained in the sludge, the total volume of mother liquor was 1175 liters. The $TiO_2$ concentration was 88 g/dm³, and the titanium yield was 75%. The $Fe^{2+}$ concentration in the mother liquor was 26 g/dm³, the total iron concentration was 49.2 g/dm³.

The reduction of ferric iron to the ferrous state was carried out by circulating the mother liquor through the reactor with an excess amount of metallic iron. For this, a reactor was used, made of polymer and not heated, while the reactor height was 10 times greater than its diameter. The circulation was carried out using a membrane pump, injection was carried out through the fitting in the lower part of the reactor, and the reduced solution was returned through the overflow outlet in the upper part of the reactor. The solution temperature during reduction was 42° C.

The reduction was carried out until a mass concentration of trivalent titanium ($Ti_2O_3$) reached 3 g/dm³. After reduction, the concentration of ferrous iron ($Fe^{2+}$) was 73 g/dm³.

2. Processing of the Solid Residue after Ilmenite Concentrate Digestion

The filtration yielded 59 kg of sludge. The sludge was repulped using an overhead stirrer in 100 liters of filtered water, filtered and washed in a candle filter to reach neutral pH of the filtrate. The washed sludge was dried at 120° C.

and calcined at 900° C. Calcination provided 46.2 kg of the product for metallurgy Veltilit BF consisting of: $TiO_2$—74.65%, $Fe_2O_3$—16.98%, $SiO_2$—8.37%.

3. Hydrolysis of Titanium Oxychloride

Hydrolysis of the filtered solution of titanium oxychloride $TiOCl_2$ coming from the stage of ilmenite concentrate digestion was carried out in a reactor equipped with a heating jacket and a high-speed stirrer. The reactor was filled with 1165 liters of the filtered reduced solution at a temperature of 30° C., and heating started. Heating was carried out by circulating oil through the jacket. The solution was heated at a rate of 0.5° C. per minute with constant stirring. Stirring was carried out using a turbine stirrer at 200 rpm. Upon reaching 80° C., the process of hydrolysis began. No seeds were used for the hydrolysis. The heating rate being the same, the solution was brought to the boil and boiling continued for 10 hours.

A system of coolers and scrubbers was used to capture the vapors. All the evaporated hydrochloric acid was collected and sent to the ilmenite concentrate digestion stage.

The titanium dioxide slurry resulting from hydrolysis was cooled to 60° C. and sent for filtration. As a result, 167 kg of titanium dioxide precipitate and 571 liters of mother liquor were obtained. The cake contained 60% of $TiO_2$. The mother liquor contained 4 $g/dm^3$ of $TiO_2$ and 130 $g/dm^3$ of Fe (185.7 $g/dm^3$ of $Fe_2O_3$).

4. Washing Titanium Oxides/Hydroxides Precipitate from Impurities

The titanium oxides/hydroxides cake obtained in the filter was washed with 1000 liters of purified water with an HCl content of 2%, water temperature being 60° C., and then the cake was washed with 300 liters of purified water with the same temperature. The content of trivalent titanium before filtration was adjusted to reach the concentration of 1.2 $g/dm^3$ ($Ti_2O_3$). At the end of the wash, pH of the filtrate was neutral. Washing resulted in the cake of titanium oxides/hydroxides with the following impurity content: 0.03% Fe and 0.0016% Cr.

5. Calcination of Titanium Oxides/Hydroxides Precipitate

The washed cake was not subjected to salt treatment.

The resulting cake was calcined in a tube furnace at a hot end temperature of 960° C. Calcination yielded 100 kg of titanium dioxide with a particle size of 15-25 μm.

6. Precipitation of Iron Hydroxides to Obtain Color Pigments

The mother liquor resulting from the washing stage contains iron II chlorides in an amount of 185.7 $g/dm^3$ $Fe_2O_3$ and 30 $g/dm^3$ of free HCl.

571 liters of the mother liquor were poured into the iron oxide pigments synthesis reactor, the temperature of the solution being 40° C. With constant circulation provided by a membrane pump, the solution was neutralized with milk of lime slurry containing 200 $g/dm^3$ of CaO. 300 liters of $Ca(OH)_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 440 liters of slurry. At the degree of iron oxidation being 69% the synthesis process was stopped.

After cooling to 60° C., the slurry was filtered in a candle filter. Filtration yielded 201 kg of black pigment cake ($Fe_3O_4$) with a moisture content of 50% and 748 liters of filtrate. The filtrate contained 2.9 $g/dm^3$ of iron as $Fe_2O_3$, and 153 $g/dm^3$ of calcium chloride $CaCl_2$. The volume of the filtrate, taking into account the filtrate remaining in the cake, was 825 liters. Thus, the yield of iron oxide pigments reached 98.3%.

The $Fe_3O_4$ cake was repulped in purified water with a temperature of 60° C. to obtain a concentration of 300 $g/dm^3$, and stirred for 2 hours, then filtered in a candle filter and washed with 1 $m^3$ of pure water with a temperature of 40° C.

Next, the resulting cake of black iron oxide pigment was dried at a temperature of 80° C. Drying resulted in 102 kg of black iron oxide pigment with a neutral tint and a moisture content of 1.5%.

7. Processing of the Mother Liquor Containing Calcium Chloride

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 748 liters of filtrate with a $CaCl_2$ concentration of 211 $g/dm^3$ were fed into the foam scrubber. The process was carried out for 1.5 hours at a temperature of 50° C. During this time, 65.6 $Nm^3$ of ammonia and 32.8 $Nm^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 203.1 kg of sludge with a moisture content of 30% and 673 liters of filtrate (the total filtrate volume being 720 l). The $NH_4Cl$ concentration was 152 $g/dm^3$. The filtrate was fed to the stage of hydrogen chloride regeneration from ammonium chloride solution.

The sludge was washed in a filter with 350 liters of purified water with a temperature of 40° C., repulped in purified water with a temperature of 40° C. to obtain the concentration of 300 $g/dm^3$, filtered and washed again in a filter with 600 liters of purified water with a temperature of 40° C. Then it was dried at a temperature of 120° C. to obtain 142.9 kg of calcium carbonate with a moisture content of 0.5%. Calcium carbonate primary particle sizes were in the range of 0.5-2.5 μm.

8. Regeneration of Hydrogen Chloride from Ammonium Chloride Solution

The resulting calcium chloride solution in an amount of 673 liters with an $NH_4Cl$ concentration of 211 $g/dm^3$ was poured into a reactor connected to a hydrochloric acid vapor recovery system. Then, with continuous stirring, 280.1 kg of 95% sulfuric acid were poured into the solution. The reaction mass was brought to boil and kept for 5 hours. During this time, the capture system collected 96.9 kg of HCl. The volume of the solution in the reactor was 400 l, the concentration of ammonium hydrogen sulfate was 763 $g/dm^3$, the concentration of free sulfuric acid was 15 $g/dm^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 400 liters. Then, ammonia in an amount of 62.2 $Nm^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 358.7 kg of ammonium sulfate with a moisture content of 0.1%.

Example 2

1. Digestion of Ilmenite Concentrate

Digestion of ilmenite concentrate was carried out similarly to Example 1, except that calcium chloride mother liquor from the iron hydroxides precipitation stage was used.

And for one digestion cycle, 238 kg of milled ilmenite concentrate and 1202 liters of hydrochloric acid with an HCl content of 30% and 178 liters of calcium chloride mother liquor with a concentration of 800 g/dm$^3$ returned from the iron hydroxides precipitation stage, with a CaCl$_2$) concentration of 800 g/dm$^3$ were used. The digestion was carried out at a temperature of 60° C. The stage to digest the milled ilmenite concentrate lasted 5 hours, and the stage to digest the unreacted solid part (sludge) lasted 8 hours.

The last filtration stage in a candle filter yielded 1160 liters of mother liquor, while 15 liters of mother liquor remained in the sludge, the total volume of mother liquor was 1175 liters. The TiO$_2$ concentration was 99.8 g/dm$^3$, and the titanium yield was 85%. The Fe$^{2+}$ concentration in the mother liquor was 26 g/dm$^3$, the total iron concentration was 51.2 g/dm$^3$.

The reduction of ferric iron to the ferrous state was carried out by circulating the mother liquor through the reactor with an excess amount of metallic iron. For this, a reactor was used, made of polymer and not heated, while the reactor height was 10 times greater than its diameter. The circulation was carried out using a membrane pump, injection was carried out through the fitting in the lower part of the reactor, and the reduced solution was returned through the overflow outlet in the upper part of the reactor. The solution temperature during reduction was 42° C.

The reduction was carried out until a mass concentration of trivalent titanium (Ti$_2$O$_3$) reached 3 g/dm$^3$. After reduction, the concentration of ferrous iron (Fe$^{2+}$) was 81 g/dm$^3$.

2. Processing of the Solid Residue after Ilmenite Concentrate Digestion

The filtration yielded 50.1 kg of sludge. The sludge was repulped using an overhead stirrer in 100 liters of filtered water, filtered and washed in a candle filter to reach neutral pH of the filtrate. The washed sludge was dried at 120° C. and calcined at 900° C. Calcination provided 29.1 kg of the product for metallurgy Veltilit BF consisting of: TiO$_2$—71.13%, Fe$_2$O$_3$—15.57%, SiO$_2$—13.3%.

3. Hydrolysis of Titanium Oxychloride

Hydrolysis of the filtered solution of titanium oxychloride TiOCl$_2$ coming from the stage of ilmenite concentrate digestion was carried out in a reactor equipped with a heating jacket and a high-speed stirrer. The reactor was filled with 1160 liters of the filtered reduced solution at a temperature of 30° C., and heating started. Heating was carried out by circulating oil through the jacket. The solution was heated at a rate of 0.5° C. per minute with constant stirring. Stirring was carried out using a turbine stirrer at 200 rpm. Upon reaching 80° C., the process of hydrolysis began. No seeds were used for the hydrolysis. The heating rate being the same, the solution was brought to the boil and boiling continued for 10 hours.

A system of coolers and scrubbers was used to capture the vapors. All the evaporated hydrochloric acid was collected and sent to the ilmenite concentrate digestion stage.

The titanium dioxide slurry resulting from hydrolysis was cooled to 60° C. and sent for filtration. As a result, 192 kg of titanium dioxide precipitate and 700 liters of mother liquor were obtained. The cake contained 60% of TiO$_2$. The mother liquor contained 125.6 g/dm$^3$ of Fe (179.4 g/dm$^3$ of Fe$_2$O$_3$).

4. Washing Titanium Oxides/Hydroxides Precipitate from Impurities

The titanium oxides/hydroxides cake obtained in the filter was washed with 1000 liters of purified water with an HCl content of 2%, water temperature being 60° C., and then the cake was washed with 300 liters of purified water with the same temperature. The content of trivalent titanium before filtration was adjusted to reach the concentration of 1.2 g/dm$^3$ (Ti$_2$O$_3$). At the end of the wash, pH of the filtrate was neutral. Washing resulted in the cake of titanium oxides/hydroxides with the following impurity content: 0.03% Fe and 0.0016% Cr.

5. Calcination of Titanium Oxides/Hydroxides Precipitate

The washed cake was not subjected to salt treatment.

The resulting cake was calcined in a tube furnace at a hot end temperature of 960° C. Calcination yielded 115.2 kg of titanium dioxide with a particle size of 15-25 μm.

6. Precipitation of Iron Hydroxides to Obtain Color Pigments

The mother liquor resulting from the washing stage contains iron II chlorides in an amount of 179.4 g/dm$^3$ Fe$_2$O$_3$ and 24 g/dm$^3$ of free HCl.

700 liters of the mother liquor were poured into the iron oxide pigments synthesis reactor, the temperature of the solution being 40° C. With constant circulation provided by a membrane pump, the solution was neutralized with milk of lime slurry containing 200 g/dm$^3$ of CaO. 350 liters of Ca(OH)$_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 504 liters of slurry. At the degree of iron oxidation being 70% the synthesis process was stopped.

After cooling to 60° C., the slurry was filtered in a candle filter. Filtration yielded 237 kg of black pigment cake (Fe$_3$O$_4$) with a moisture content of 50% and 909 liters of filtrate. The filtrate contained 3.1 g/dm$^3$ of iron as Fe$_2$O$_3$, and 342 g/dm$^3$ of calcium chloride CaCl$_2$. The volume of the filtrate, taking into account the filtrate remaining in the cake, was 1000 liters. Thus, the yield of iron oxide pigments reached 97.6%.

The Fe$_3$O$_4$ cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of black iron oxide pigment was dried at a temperature of 80° C. Drying resulted in 120.3 kg of black iron oxide pigment with a neutral tint and a moisture content of 1.5%.

7. Processing of the Mother Liquor Containing Calcium Chloride

After the extraction of iron, the mother liquor in an amount of 416.4 l containing 142.4 kg of CaCl$_2$ was evaporated and sent to the stage of titanium-containing feedstock digestion.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 492.6 liters of filtrate with a $CaCl_2$ concentration of 342 g/dm$^3$ were fed into the foam scrubber. The process was carried out for 1.5 hours at a temperature of 50° C. During this time, 70.0 Nm$^3$ of ammonia and 35.0 Nm$^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 216.9 kg of sludge with a moisture content of 30% and 413 liters of filtrate (the total filtrate volume being 463 l). The $NH_4Cl$ concentration was 351 g/dm$^3$. The filtrate was fed to the stage of hydrogen chloride regeneration from ammonium chloride solution.

The sludge was washed in a filter with 350 liters of purified water with a temperature of 40° C., repulped in purified water with a temperature of 40° C. to obtain the concentration of 300 g/dm$^3$, filtered and washed again in a filter with 600 liters of purified water with a temperature of 40° C. Then it was dried at a temperature of 120° C. to obtain 152.6 kg of calcium carbonate with a moisture content of 0.5%. Calcium carbonate primary particle sizes were in the range of 0.5-2.5 μm.

8. Regeneration of Hydrogen Chloride from Ammonium Chloride Solution

The resulting calcium chloride solution in an amount of 413 liters with an $NH_4Cl$ concentration of 351 g/dm$^3$ was poured into a reactor connected to a hydrochloric acid vapor recovery system. Then, with continuous stirring, 284.3 kg of 95% sulfuric acid were poured into the solution. The reaction mass was brought to the boil and kept for 5 hours. During this time, the capture system collected 98.9 kg of HCl. The volume of the solution in the reactor was 300 l, the concentration of ammonium hydrogen sulfate was 1039 g/dm$^3$, the concentration of free sulfuric acid was 15 g/dm$^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 62.8 Nm$^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 364.2 kg of ammonium sulfate with a moisture content of 0.1%.

Example 3

1. Digestion of Ilmenite Concentrate

Milled ilmenite concentrate (with $TiO_2$ content of 58.0 wt %; FeO—16.5%, $Fe_2O_3$—19.7%, $P_2O_5$—0.07%) with a particle size of 0.5-10 μm, hydrochloric acid with a concentration of at least 30% HCl and calcium chloride mother liquor from the stage of iron hydroxides precipitation were used for digestion.

The digestion was carried out in two stages in a counter-current system. The first digestion stage used hydrochloric acid, calcium chloride mother liquor from the stage of iron hydroxides precipitation and the unreacted solid part (sludge) from the second digestion stage, and the second digestion stage used the solution from the first stage containing titanium oxychloride and iron chlorides and mechanically activated ilmenite concentrate.

Heating was carried out through the water jacket of the digestion reactor; stirring was performed with an overhead stirrer, stirring speed: 200 rpm.

After the first digestion stage the sludge was separated from the mother liquor using a candle filter and sent to the stage of processing the solid residue after ilmenite concentrate digestion, and the filtrate was sent to the second stage of ilmenite digestion. After the second digestion stage, the sludge was separated from the mother liquor in a candle filter and sent to the first digestion stage, and the filtrate was sent to the stage of reduction of ferric iron to its ferrous state.

For one digestion cycle, 238 kg of milled ilmenite concentrate and 1202 liters of hydrochloric acid with an HCl content of 30% and 178 liters of calcium chloride mother liquor returned from the iron hydroxides precipitation stage, with a $CaCl_2$ concentration of 800 g/dm$^3$ were used. The digestion was carried out at a temperature of 60° C. The stage to digest the milled ilmenite concentrate lasted 5 hours, and the stage to digest the unreacted solid part (sludge) lasted 8 hours.

The last filtration stage in a candle filter yielded 1160 liters of mother liquor, while 10 liters of mother liquor remained in the sludge, the total volume of mother liquor was 1750 liters. The $TiO_2$ concentration was 106 g/dm$^3$, and the titanium yield was 90%. The $Fe^{2+}$ concentration in the mother liquor was 26 g/dm$^3$, the total iron concentration was 54 g/dm$^3$.

The reduction of ferric iron to the ferrous state was carried out by circulating the mother liquor through the reactor with an excess amount of metallic iron. For this, a reactor was used, made of polymer and not heated, while the reactor height was 10 times greater than its diameter. The circulation was carried out using a membrane pump, injection was carried out through the fitting in the lower part of the reactor, and the reduced solution was returned through the overflow outlet in the upper part of the reactor. The solution temperature during reduction was 42° C.

The reduction was carried out until a mass concentration of trivalent titanium ($Ti_2O_3$) reached 3 g/dm$^3$. After reduction, the concentration of ferrous iron ($Fe^{2+}$) was 84 g/dm$^3$.

2. Processing of the Solid Residue after Ilmenite Concentrate Digestion

The filtration yielded 32 kg of sludge. The sludge was repulped using an overhead stirrer in 100 liters of filtered water, filtered and washed in a candle filter to reach neutral pH of the filtrate. The washed sludge was dried at 120° C. and calcined at 900° C. Calcination provided 17.9 kg of the product for metallurgy Veltilit BF consisting of: $TiO_2$—77.27%, $Fe_2O_3$—1.06%, $SiO_2$—21.67%.

3. Hydrolysis of titanium oxychloride

Hydrolysis of the filtered solution of titanium oxychloride $TiOCl_2$ coming from the stage of ilmenite concentrate digestion was carried out in a reactor equipped with a heating jacket and a high-speed stirrer. The reactor was filled with 1160 liters of the filtered reduced solution at a temperature of 30° C., and heating started. Heating was carried out by circulating oil through the jacket. The solution was heated at a rate of 0.5° C. per minute with constant stirring. Stirring was carried out using a turbine stirrer at 200 rpm. Upon reaching 80° C., the process of hydrolysis began. No seeds were used for the hydrolysis. The heating rate being the same, the solution was brought to the boil and boiling continued for 10 hours.

A system of coolers and scrubbers was used to capture the vapors. All the evaporated hydrochloric acid was collected and sent to the ilmenite concentrate digestion stage.

The titanium dioxide slurry resulting from hydrolysis was cooled to 60° C. and sent for filtration. As a result, 205 kg of titanium dioxide precipitate and 690 liters of mother liquor were obtained. The cake contained 60% of $TiO_2$. The mother liquor contained 130.2 $g/dm^3$ of Fe (186 $g/dm^3$ of $Fe_2O_3$).

4. Washing Titanium Oxides/Hydroxides Precipitate from Impurities

The titanium oxides/hydroxides cake obtained in the filter was washed with 1000 liters of purified water with an HCl content of 2%, water temperature being 60° C., and then the cake was washed with 300 liters of purified water with the same temperature. The content of trivalent titanium before filtration was adjusted to reach the concentration of 1.2 $g/dm^3$ ($Ti_2O_3$). At the end of the wash, pH of the filtrate was neutral. Washing resulted in the cake of titanium oxides/hydroxides with the following impurity content: 0.03% Fe and 0.0016% Cr.

5. Calcination of Titanium Oxides/Hydroxides Precipitate

The washed cake was not subjected to salt treatment.

The resulting cake was calcined in a tube furnace at a hot end temperature of 960° C. Calcination yielded 124.2 kg of titanium dioxide with a particle size of 15-25 μm.

6. Precipitation of Iron Hydroxides to Obtain Color Pigments

The mother liquor resulting from the washing stage contains iron II chlorides in an amount of 186 $g/dm^3$ $Fe_2O_3$ and 25 $g/dm^3$ of free HCl.

690 liters of the mother liquor were poured into the iron oxide pigments synthesis reactor, the temperature of the solution being 40° C. With constant circulation provided by a membrane pump, the solution was neutralized with milk of lime slurry containing 200 $g/dm^3$ of CaO. 345 liters of $Ca(OH)_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 515 liters of slurry. At the degree of iron oxidation being 70% the synthesis process was stopped.

After cooling to 60° C., the slurry was filtered in a candle filter. Filtration yielded 241.6 kg of black pigment cake ($Fe_3O_4$) with a moisture content of 50% and 907 liters of filtrate. The filtrate contained 2.4 $g/dm^3$ of iron as $Fe_2O_3$, and 347 $g/dm^3$ of calcium chloride $CaCl_2$. The volume of the filtrate, taking into account the filtrate remaining in the cake, was 1000 liters. Thus, the yield of iron oxide pigments reached 97.4%.

The $Fe_3O_4$ cake was repulped in purified water with a temperature of 60° C. to obtain a concentration of 300 $g/dm^3$, and stirred for 2 hours, then filtered in a candle filter and washed with 1 $m^3$ of pure water with a temperature of 40° C.

Next, the resulting cake of black iron oxide pigment was dried at a temperature of 80° C. Drying resulted in 122.6 kg of black iron oxide pigment with a neutral tint and a moisture content of 1.5%.

7. Processing of the Mother Liquor Containing Calcium Chloride

After the extraction of iron, the mother liquor in an amount of 410.4 l containing 142.4 kg of $CaCl_2$ was evaporated and sent to the stage of titanium-containing feedstock digestion.

Extraction of calcium carbonate is carried out from solutions resulting from the filtration of black iron oxide pigment in the stage of iron precipitation from iron chloride solutions.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 496.6 liters of filtrate with a $CaCl_2$ concentration of 347 $g/dm^3$ were fed into the foam scrubber. The process was carried out for 1.5 hours at a temperature of 50° C. During this time, 71.6 $Nm^3$ of ammonia and 35.8 $Nm^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 221.7 kg of sludge with a moisture content of 30% and 419 liters of filtrate (the total filtrate volume being 470 l). The $NH_4Cl$ concentration was 353 $g/dm^3$. The filtrate was fed to the stage of hydrogen chloride regeneration from ammonium chloride solution.

The sludge was washed in a filter with 350 liters of purified water with a temperature of 40° C., repulped in purified water with a temperature of 40° C. to obtain the concentration of 300 $g/dm^3$, filtered and washed again in a filter with 600 liters of purified water with a temperature of 40° C. Then it was dried at a temperature of 120° C. to obtain 156.0 kg of calcium carbonate with a moisture content of 0.5%. Calcium carbonate primary particle sizes were in the range of 0.5-2.5 μm.

8. Regeneration of Hydrogen Chloride from Ammonium Chloride Solution

The resulting calcium chloride solution in the amount of 419 liters with an $NH_4Cl$ concentration of 353 $g/dm^3$ was poured into a reactor connected to a hydrochloric acid vapor recovery system. Then, with continuous stirring, 289.9 kg of 95% sulfuric acid were poured into the solution. The reaction mass was brought to the boil and kept for 5 hours. During this time, the capture system collected 100.9 kg of HCl. The volume of the solution in the reactor was 300 l, the concentration of ammonium hydrogen sulfate was 1060 $g/dm^3$, the concentration of free sulfuric acid was 15 $g/dm^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 64.0 $Nm^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 373.4 kg of ammonium sulfate with a moisture content of 0.1%.

Example 4

1. Digestion of Ilmenite Concentrate

Milled ilmenite concentrate (with $TiO_2$ content of 58.0 wt %; FeO—16.5%, $Fe_2O_3$—19.7%, $P_2O_5$—0.07%) with a particle size of 0.5-10 µm, hydrochloric acid with a concentration of at least 30% HCl and calcium chloride mother liquor from the stage of iron hydroxides precipitation were used for digestion.

The digestion was carried out in two stages in a counter-current system. The first digestion stage used hydrochloric acid and the unreacted solid part (sludge) from the second digestion stage, and the second digestion stage used the solution from the first stage containing titanium oxychloride and iron chlorides and mechanically activated ilmenite concentrate. The first digestion stage is combined with the reduction stage.

Heating was carried out through the water jacket of the digestion reactor; stirring was performed with an overhead stirrer, stirring speed: 200 rpm.

To reduce ferric iron to the ferrous state, a basket with metallic iron was dipped into the digestion reactor in the second digestion stage.

After the first digestion stage the sludge was separated from the mother liquor using a candle filter and sent to the stage of processing the solid residue after ilmenite concentrate digestion, and the filtrate was sent to the second stage of ilmenite digestion. After the second digestion stage, the sludge was separated from the mother liquor in a candle filter and sent to the first digestion stage, and the filtrate was sent to the stage of reduction of ferric iron to its ferrous state.

For one digestion cycle, 238 kg of milled ilmenite concentrate and 1202 liters of hydrochloric acid with an HCl content of 30% and 178 liters of calcium chloride mother liquor with a concentration of 800 $g/dm^3$ were used. The digestion was carried out at a temperature of 60° C. The stage to digest the milled ilmenite concentrate lasted 6 hours, and the stage to digest the unreacted solid part (sludge) lasted 8 hours.

The reduction was carried out until a mass concentration of trivalent titanium ($Ti_2O_3$) reached 3 $g/dm^3$. After reduction, the concentration of ferrous iron ($Fe^{2+}$) was 85 $g/dm^3$.

And the last filtration stage in a candle filter yielded 1161.6 liters of mother liquor, while 8.4 liters of mother liquor remained in the sludge, the total volume of mother liquor was 1170 liters. The $TiO_2$ concentration was 112 $g/dm^3$, and the titanium yield was 95%. The total iron concentration was 85 $g/dm^3$.

The reduction of ferric iron to the ferrous state was carried out in the second digestion stage.

2. Processing of the Solid Residue after Ilmenite Concentrate Digestion

The filtration yielded 22 kg of sludge. The sludge was repulped using an overhead stirrer in 100 liters of filtered water, filtered and washed in a candle filter to reach neutral pH of the filtrate. The washed sludge was dried at 120° C. and calcined at 900° C. Calcination provided 10.9 kg of the product for metallurgy Veltilit BF consisting of: $TiO_2$—63.54%, $Fe_2O_3$—0.83%, $SiO_2$—35.63%.

3. Hydrolysis of Titanium Oxychloride

Hydrolysis of the filtered solution of titanium oxychloride $TiOCl_2$ coming from the stage of ilmenite concentrate digestion was carried out in a reactor equipped with a heating jacket and a high-speed stirrer. The reactor was filled with 1161.6 liters of the filtered reduced solution at a temperature of 30° C., and heating started. Heating was carried out by circulating oil through the jacket. The solution was heated at a rate of 0.5° C. per minute with constant stirring. Stirring was carried out using a turbine stirrer at 200 rpm. Upon reaching 80° C., the process of hydrolysis began. The heating rate being the same, the solution was brought to the boil and boiling continued for 10 hours.

A system of coolers and scrubbers was used to capture the vapors. All the evaporated hydrochloric acid was collected and sent to the ilmenite concentrate digestion stage.

The titanium dioxide slurry resulting from hydrolysis was cooled to 60° C. and sent for filtration. As a result, 218.5 kg of titanium dioxide precipitate and 685 liters of mother liquor were obtained. The cake contained 60% of $TiO_2$. The mother liquor contained 132 $g/dm^3$ of Fe (188.6 $g/dm^3$ of $Fe_2O_3$).

4. Washing Titanium Oxides/Hydroxides Precipitate from Impurities

The titanium oxides/hydroxides cake obtained in the filter was washed with 1000 liters of purified water with an HCl content of 2%, water temperature being 60° C., and then the cake was washed with 300 liters of purified water with the same temperature. The content of trivalent titanium before filtration was adjusted to reach the concentration of 1.2 $g/dm^3$ ($Ti_2O_3$). At the end of the wash, pH of the filtrate was neutral. Washing resulted in the cake of titanium oxides/hydroxides with the following impurity content: 0.03% Fe and 0.0016% Cr.

5. Calcination of Titanium Oxides/Hydroxides Precipitate

The washed cake was not subjected to salt treatment.

The resulting cake was calcined in a tube furnace at a hot end temperature of 960° C. Calcination yielded 131.1 kg of titanium dioxide with a particle size of 15-25 µm.

6. Precipitation of iron hydroxides to obtain color pigments

The mother liquor resulting from the washing stage contains iron II chlorides in an amount of 188.6 $g/dm^3$ $Fe_2O_3$ and 24 $g/dm^3$ of free HCl.

685 liters of the mother liquor were poured into the iron oxide pigments synthesis reactor, the temperature of the solution being 40° C. With constant circulation provided by a membrane pump, the solution was neutralized with milk of lime slurry containing 200 $g/dm^3$ of CaO. 345 liters of $Ca(OH)_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 515 liters of slurry. At the degree of iron oxidation being 70% the synthesis process was stopped.

After cooling to 60° C., the slurry was filtered in a candle filter. Filtration yielded 241.6 kg of black pigment cake ($Fe_3O_4$) with a moisture content of 50% and 907 liters of filtrate. The filtrate contained 2.4 $g/dm^3$ of iron as $Fe_2O_3$, and 346 $g/dm^3$ of calcium chloride $CaCl_2$. The volume of the filtrate, taking into account the filtrate remaining in the cake, was 1000 liters. Thus, the yield of iron oxide pigments reached 98.16%.

The $Fe_3O_4$ cake was repulped in purified water with a temperature of 60° C. to obtain a concentration of 300 $g/dm^3$, and stirred for 2 hours, then filtered in a candle filter and washed with 1 $m^3$ of pure water with a temperature of 40° C.

Next, the resulting cake of black iron oxide pigment was dried at a temperature of 80° C. Drying resulted in 122.6 kg of black iron oxide pigment with a neutral tint and a moisture content of 1.5%.

7. Processing of the Mother Liquor Containing Calcium Chloride

After the extraction of iron, the mother liquor in an amount of 411.6 l containing 142.4 kg of $CaCl_2$ was evaporated and sent to the stage of titanium-containing feedstock digestion.

Extraction of calcium carbonate is carried out from solutions resulting from the filtration of black iron oxide pigment in the stage of iron precipitation from iron chloride solutions.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 495.4 liters of filtrate with a $CaCl_2$ concentration of 346 $g/dm^3$ were fed into the foam scrubber. The process was carried out for 1.5 hours at a temperature of 50° C. During this time, 71.3 $Nm^3$ of ammonia and 35.6 $Nm^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 200.7 kg of sludge with a moisture content of 30% and 419 liters of filtrate (the total filtrate volume being 465 l). The $NH_4Cl$ concentration was 356 $g/dm^3$. The filtrate was fed to the stage of hydrogen chloride regeneration from ammonium chloride solution.

The sludge was washed in a filter with 350 liters of purified water with a temperature of 40° C., repulped in purified water with a temperature of 40° C. to obtain the concentration of 300 $g/dm^3$, filtered and washed again in a filter with 600 liters of purified water with a temperature of 40° C. Then it was dried at a temperature of 120° C. to obtain 155.2 kg of calcium carbonate with a moisture content of 0.5%. Calcium carbonate primary particle sizes were in the range of 0.5-2.5 μm.

8. Regeneration of Hydrogen Chloride from Ammonium Chloride Solution

The resulting calcium chloride solution in the amount of 419 liters with an $NH_4Cl$ concentration of 352 $g/dm^3$ was poured into a reactor connected to a hydrochloric acid vapor recovery system. Then, with continuous stirring, 289.1 kg of 95% sulfuric acid were poured into the solution. The reaction mass was brought to the boil and kept for 5 hours. During this time, the capture system collected 101.8 kg of HCl. The volume of the solution in the reactor was 300 l, the concentration of ammonium hydrogen sulfate was 1069 $g/dm^3$, the concentration of free sulfuric acid was 15 $g/dm^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 64.5 $Nm^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 374.4 kg of ammonium sulfate with a moisture content of 0.1%.

Example 5

1. Digestion of Ilmenite Concentrate

Digestion of ilmenite concentrate was carried out similarly to Example 4.

2. Processing of the Solid Residue after Ilmenite Concentrate Digestion

The filtration resulted in 22 kg of sludge. The sludge was repulped with an overhead stirrer in 100 L of filtered water and neutralized with 25% ammonia solution to reach neutral pH. Then, a solution of potassium chloride was introduced into the slurry in the amount of 0.7% $K_2O$ of the $TiO_2$ content in the system. The slurry was filtered in a candle filter, dried at 120° C. and calcined for 100 minutes at 900° C. Calcination yielded 10.95 kg of the product consisting of: $TiO_2$—63.29%, $Fe_2O_3$—0.82%, $SiO_2$—35.33%, $K_2O$—0.46%. Following calcination the product was milled in a centrifugal mill. The product is intended to replace part of titanium dioxide pigment in color paint systems.

3. Hydrolysis of Titanium Oxychloride

Hydrolysis of titanium oxychloride was carried out similarly to Example 4.

4. Washing Titanium Oxides/Hydroxides Precipitate from Impurities

Washing titanium oxides/hydroxides precipitate from impurities was carried out similarly to Example 4.

5. Calcination of Titanium Oxides/Hydroxides Precipitate

The washed cake was not subjected to salt treatment.

The resulting cake was calcined in a tube furnace at a hot end temperature of 960° C. Calcination yielded 131.1 kg of titanium dioxide with a particle size of 15-25 μm.

Following calcination the product was treated with organic substances in an amount of 0.7% and milled in a centrifugal mill. The dispersibility of the product after milling was tested using a high speed impeller mill according to ISO 8780-3; the particle size was 23 μm. This product has a beige tint and can replace up to 20% of titanium dioxide pigment in color paint systems.

6. Precipitation of Iron Hydroxides to Obtain Color Pigments

Precipitation of iron hydroxides to obtain color pigments was carried out similarly to Example 4.

7. Processing of the Mother Liquor Containing Calcium Chloride

Processing of the mother liquor containing calcium chloride was carried out similarly to Example 4.

8. Regeneration of Hydrogen Chloride from Ammonium Chloride Solution

Regeneration of hydrogen chloride from ammonium chloride solution was carried out similarly to Example 4.

9. Obtaining Ammonium Sulfate and Ammonium Sulfate Crystallization

Ammonium sulfate was obtained similarly to Example 4.

Example 6

1. Digestion of Ilmenite Concentrate

Digestion of ilmenite concentrate was carried out similarly to Example 5.

2. Processing of the Solid Residue after Ilmenite Concentrate Digestion

Processing of the solid residue after ilmenite concentrate digestion was carried out similarly to Example 5.

3. Hydrolysis of Titanium Oxychloride

Hydrolysis of the filtered solution of titanium oxychloride $TiOCl_2$ coming from the stage of ilmenite concentrate digestion was carried out in a reactor equipped with a heating jacket and a high-speed stirrer. Heating was carried out by circulating oil through the jacket. Stirring was carried out using a turbine stirrer at 200 rpm. Seeds were used for the hydrolysis.

A system of coolers and scrubbers was used to capture the vapors. All the evaporated hydrochloric acid was collected and sent to the ilmenite concentrate digestion stage.

The reactor was filled with 1161.6 liters of the filtered reduced solution at a temperature of 30° C., and heating started. The solution was heated at a rate of 0.5° C. per minute with constant stirring. Upon reaching 50° C., synthetic rutile seeds were introduced into the solution in an amount of 1%. The seeds were prepared based on synthetic rutile obtained in the hydrolysis stage.

Upon reaching 80° C., the process of hydrolysis began. The heating rate being the same, the solution was brought to the boil and boiling continued for 10 hours.

A system of coolers and scrubbers was used to capture the vapors. All the evaporated hydrochloric acid was collected and sent to the ilmenite concentrate digestion stage.

The titanium dioxide slurry resulting from hydrolysis was cooled to 60° C. and sent for filtration. As a result, 220.7 kg of titanium dioxide precipitate and 690 liters of mother liquor were obtained. The cake contained 60% of $TiO_2$. The mother liquor contained 132 g/dm$^3$ of Fe (188.6 g/dm$^3$ of $Fe_2O_3$).

4. Washing Titanium Oxides/Hydroxides Precipitate from Impurities

Washing titanium oxides/hydroxides precipitate from impurities was carried out similarly to Example πpNMepy 5.

5. Calcination of Titanium Oxides/Hydroxides Precipitate

The washed cake was not subjected to salt treatment.

The resulting cake was calcined in a tube furnace at a hot end temperature of 960° C. Calcination yielded 131.1 kg of titanium dioxide with a particle size of 120 μm.

6. Precipitation of Iron Hydroxides to Obtain Color Pigments

Precipitation of iron hydroxides to obtain color pigments was carried out similarly to Example 5.

7. Processing of the Mother Liquor Containing Calcium Chloride

Processing of the mother liquor containing calcium chloride was carried out similarly to Example 5.

8. Regeneration of Hydrogen Chloride from Ammonium Chloride Solution

Regeneration of hydrogen chloride from ammonium chloride solution was carried out similarly to Example 5.

9. Obtaining Ammonium Sulfate and Ammonium Sulfate Crystallization

Ammonium sulfate was obtained similarly to Example 5.

Example 7

1. Digestion of Ilmenite Concentrate

Digestion of ilmenite concentrate was carried out similarly to Example 6.

2. Processing of the Solid Residue after Ilmenite Concentrate Digestion

Processing of the solid residue after ilmenite concentrate digestion was carried out similarly to Example 6.

3. Hydrolysis of Titanium Oxychloride

Hydrolysis of the filtered solution of titanium oxychloride $TiOCl_2$ coming from the stage of ilmenite concentrate digestion was carried out in two reactors equipped with heating jackets and high-speed stirrers. Heating was carried out by circulating oil through the jacket. Stirring was carried out using a turbine stirrer at 200 rpm. No seeds were used for the hydrolysis. A system of coolers and scrubbers was used to capture the vapors. The collected hydrochloric acid was sent to the ilmenite concentrate digestion stage.

The reactor was filled with 1161.6 liters of the filtered reduced solution at a temperature of 30° C., and heating started. The solution was heated at a rate of 0.5° C. per minute with constant stirring. Upon reaching 70° C., the solution was pumped into the second reactor, where water in an amount of 116 l was boiling. The solution was pumped over in 20 minutes. After pumping into the second reactor was over, the solution was brought to the boil and kept at a temperature of 108° C. for 10 hours. All the evaporated hydrochloric acid was collected and sent to the ilmenite concentrate digestion stage.

The titanium dioxide slurry resulting from hydrolysis was cooled to 60° C. and sent for filtration. As a result, 220.7 kg of titanium dioxide precipitate and 790 liters of mother liquor were obtained. The cake contained 60% of $TiO_2$. The mother liquor contained 116 g/dm$^3$ of Fe (165.7 g/dm$^3$ of $Fe_2O_3$).

4. Washing Titanium Oxides/Hydroxides Precipitate from Impurities

The titanium oxides/hydroxides cake obtained in the filter was washed with 1000 liters of purified water with an HCl content of 2%, water temperature being 60° C. The content of trivalent titanium before filtration was adjusted to reach the concentration of 1.2 g/dm$^3$ ($Ti_2O_3$).

The resulting titanium dioxide cake in an amount of 220.7 kg was repulped in 250 l of purified water with a temperature of 75° C., the concentration of HCl was brought to 5%, and trivalent titanium was introduced to reach a concentration of 1.2 g/dm$^3$ ($Ti_2O_3$). Repulping of the slurry lasted 2 hours; after repulping, the temperature of the slurry was 62° C.

The slurry was filtered in a candle filter and washed with 1500 l of purified water with a temperature of 65° C. At the end of the wash, pH of the filtrate was neutral. Washing resulted in the cake of titanium oxides/hydroxides with the following impurity content: 0.004% Fe and 0.0006% Cr.

5. Calcination of Titanium Oxides/Hydroxides Precipitate

The washed cake was repulped in purified water with a temperature of 30° C. to reach a concentration of 300 g/dm$^3$. After repulping for 30 minutes, 0.35% $K_2O$ as potassium hydroxide, 0.25% MgO as magnesium chloride and 0.2% $P_2O_5$ as phosphoric acid were added to the slurry. The reagents were dosed for 20 minutes at 20 min intervals. After adding the salts, the titanium oxides/hydroxides slurry was stirred for 60 minutes, followed by filtering in a press filter.

The resulting cake was calcined in a tube furnace at a hot end temperature of 960° C. Calcination yielded 131.75 kg of titanium dioxide with a particle size of 0.7-1.0 μm, suitable for use as a pigment with enhanced absorption of the IR spectrum.

6. Precipitation of Iron Hydroxides to Obtain Color Pigments

The mother liquor resulting from the washing stage contains iron II chlorides in an amount of 165.7 g/dm$^3$ $Fe_2O_3$ and 20 g/dm$^3$ of free HCl.

790 liters of the mother liquor were poured into the iron oxide pigments synthesis reactor, the temperature of the solution being 40° C. With constant circulation provided by a membrane pump, the solution was neutralized with milk of lime slurry containing 200 g/dm$^3$ of CaO. 350 liters of $Ca(OH)_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 519 liters of slurry. At the degree of iron oxidation being 70% the synthesis process was stopped.

After cooling to 60° C., the slurry was filtered in a candle filter. Filtration yielded 248.4 kg of black pigment cake ($Fe_3O_4$) with a moisture content of 50% and 905 liters of filtrate. The filtrate contained 2.4 g/dm$^3$ of iron as $Fe_2O_3$, and 348 g/dm$^3$ of calcium chloride $CaCl_2$. The volume of the filtrate, taking into account the filtrate remaining in the cake, was 1000 liters. Thus, the yield of iron oxide pigments reached 98.16%.

The $Fe_3O_4$ cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of black iron oxide pigment was dried at a temperature of 80° C. Drying resulted in 126.1 kg of black iron oxide pigment with a neutral tint and a moisture content of 1.5%.

7. Processing of the Mother Liquor Containing Calcium Chloride

After the extraction of iron, the mother liquor in an amount of 409.2 l containing 142.4 kg of $CaCl_2$ was evaporated and sent to the stage of titanium-containing feedstock digestion.

Extraction of calcium carbonate is carried out from solutions resulting from the filtration of black iron oxide pigment in the stage of iron precipitation from iron chloride solutions.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 495.8 liters of filtrate with a $CaCl_2$ concentration of 348 g/dm$^3$ were fed into the foam scrubber. The process was carried out for 1.5 hours at a temperature of 50° C. During this time, 71.7 Nm$^3$ of ammonia and 35.8 Nm$^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 220.0 kg of sludge with a moisture content of 30% and 419 liters of filtrate (the total filtrate volume being 470 l). The $NH_4Cl$ concentration was 354 g/dm$^3$. The filtrate was fed to the stage of hydrogen chloride regeneration from ammonium chloride solution.

The sludge was washed in a filter with 350 liters of purified water with a temperature of 40° C., repulped in purified water with a temperature of 40° C. to obtain the concentration of 300 g/dm$^3$, filtered and washed again in a filter with 600 liters of purified water with a temperature of 40° C. Then it was dried at a temperature of 120° C. to obtain 156.2 kg of calcium carbonate with a moisture content of 0.5%. Calcium carbonate primary particle sizes were in the range of 0.5-2.5 μm.

8. Regeneration of hydrogen chloride from ammonium chloride solution

The resulting calcium chloride solution in the amount of 419 liters with an $NH_4Cl$ concentration of 354 g/dm$^3$ was poured into a reactor connected to a hydrochloric acid vapor recovery system. Then, with continuous stirring, 290.7 kg of 95% sulfuric acid were poured into the solution. The reaction mass was brought to the boil and kept for 5 hours. During this time, the capture system collected 101.2 kg of HCl. The volume of the solution in the reactor was 300 l, the concentration of ammonium hydrogen sulfate was 1063 g/dm$^3$, the concentration of free sulfuric acid was 15 g/dm$^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 64.2 Nm$^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 372.4 kg of ammonium sulfate with a moisture content of 0.1%.

Example 8

1. Digestion of Ilmenite Concentrate

Digestion of ilmenite concentrate was carried out similarly to Example 7.

2. Processing of the Solid Residue after Ilmenite Concentrate Digestion

Processing of the solid residue after ilmenite concentrate digestion was carried out similarly to Example 7.

3. Hydrolysis of Titanium Oxychloride

Hydrolysis of the filtered solution of titanium oxychloride $TiOCl_2$ coming from the stage of ilmenite concentrate digestion was carried out in a reactor equipped with a heating jacket and a high-speed stirrer. Heating was provided by circulating oil through the jacket. Stirring was carried out using a turbine stirrer at 200 rpm. Seeds were used for the hydrolysis. A system of coolers and scrubbers was used to capture the vapors. The collected hydrochloric acid was sent to the ilmenite concentrate digestion stage.

The reactor was filled with 1161.6 liters of the filtered reduced solution at a temperature of 30° C., and heating started. The solution was heated at a rate of 0.5° C. per minute with constant stirring. Upon reaching 70° C., rutile seeds were introduced into the solution in an amount of 2%. The seeds slurry in an amount of 65.5 liters with a concentration of 40 g/dm$^3$ was added within 10 minutes. The solution was brought to the boil and kept at a temperature of 108° C. for 10 hours. All the evaporated hydrochloric acid was collected and sent to the ilmenite digestion stage.

To prepare the seeds, 6.23 kg of $TiCl_4$ were dissolved in 11.25 liters of water, the temperature being maintained at 35° C. The scrubber which trapped hydrochloric acid vapor neutralized 390 g of hydrochloric acid while dissolving titanium tetrachloride. After that, with stirring, the solution was neutralized with portions of a sodium hydroxide solution with a concentration of 200 g/dm$^3$. Sodium hydroxide in an amount of 22 liters was added for neutralization, the reaction mass was heated to 80° C. and kept for 1 hour. Then it was cooled to 50° C., and neutralized to pH 9.3 using sodium hydroxide with a concentration of 300 g/dm$^3$. After settling the slurry, the liquid was decanted and the slurry was diluted to 65.5 liters with stirring.

The titanium dioxide slurry resulting from hydrolysis was cooled to 60° C. and sent for filtration. As a result, 222.9 kg of titanium dioxide precipitate and 740 liters of mother liquor were obtained. The cake contained 60% of $TiO_2$. The mother liquor contained 122.8 $g/dm^3$ of Fe (175.4 $g/dm^3$ of $Fe_2O_3$).

4. Washing Titanium Oxides/Hydroxides Precipitate from Impurities

The titanium oxides/hydroxides cake obtained in the filter was washed with 1000 liters of purified water with an HCl content of 2%, water temperature being 60° C. The content of trivalent titanium before filtration was adjusted to reach the concentration of 1.2 $g/dm^3$ ($Ti_2O_3$).

The resulting titanium dioxide cake in an amount of 222.9 kg was repulped in 250 l of purified water with a temperature of 75° C., the concentration of HCl was brought to 5%, and trivalent titanium was introduced to reach a concentration of 1.2 $g/dm^3$ ($Ti_2O_3$). Repulping of the slurry lasted 2 hours; after repulping, the temperature of the slurry was 62° C.

The slurry was filtered in a candle filter and washed with 1500 liters of purified water with a temperature of 65° C. At the end of the wash, pH of the filtrate was neutral. Washing resulted in the cake of titanium oxides/hydroxides with the following impurity content: 0.003% Fe and 0.0005% Cr.

5. Calcination of Titanium Oxides/Hydroxides Precipitate

The washed cake was repulped in purified water with a temperature of 30° C. to reach a concentration of 300 $g/dm^3$. After repulping for 30 minutes, 0.35% $K_2O$ as potassium hydroxide, 0.25% MgO as magnesium chloride and 0.2% $P_2O_5$ as phosphoric acid were added to the slurry. The reagents were dosed for 20 minutes at 20 min intervals. After adding the salts, the titanium oxides/hydroxides slurry was stirred for 60 minutes, followed by filtering in a press filter.

The resulting cake was calcined in a tube furnace at a hot end temperature of 960° C. Calcination yielded 134.39 kg of titanium dioxide with a particle size of 0.3-0.6 µm, suitable for use as a pigment.

6. Precipitation of Iron Hydroxides to Obtain Color Pigments

The mother liquor resulting from the washing stage contains iron II chlorides in an amount of 175.4 $g/dm^3$ $Fe_2O_3$ and 21 $g/dm^3$ of free HCl.

740 liters of the mother liquor were poured into the iron oxide pigments synthesis reactor, the temperature of the solution being 40° C. With constant circulation provided by a membrane pump, the solution was neutralized with milk of lime slurry containing 200 $g/dm^3$ of CaO. 348 liters of $Ca(OH)_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 514 liters of slurry. At the degree of iron oxidation being 70% the synthesis process was stopped.

After cooling to 60° C., the slurry was filtered in a candle filter. Filtration yielded 246.4 kg of black pigment cake ($Fe_3O_4$) with a moisture content of 50% and 905 liters of filtrate. The filtrate contained 2.4 $g/dm^3$ of iron as $Fe_2O_3$, and 346 $g/dm^3$ of calcium chloride $CaCl_2$. The volume of the filtrate, taking into account the filtrate remaining in the cake, was 1000 liters. Thus, the yield of iron oxide pigments reached 98.15%.

The $Fe_3O_4$ cake was repulped in purified water with a temperature of 60° C. to obtain a concentration of 300 $g/dm^3$, and stirred for 2 hours, then filtered in a candle filter and washed with 1 $m^3$ of pure water with a temperature of 40° C.

Next, the resulting cake of black iron oxide pigment was dried at a temperature of 80° C. Drying resulted in 125.0 kg of black iron oxide pigment with a neutral tint and a moisture content of 1.5%.

7. Processing of the Mother Liquor Containing Calcium Chloride

After the extraction of iron, the mother liquor in an amount of 411.6 l containing 142.4 kg of $CaCl_2$) was evaporated and sent to the stage of titanium-containing feedstock digestion.

Extraction of calcium carbonate is carried out from solutions resulting from the filtration of black iron oxide pigment in the stage of iron precipitation from iron chloride solutions.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 493.4 liters of filtrate with a $CaCl_2$ concentration of 346 $g/dm^3$ were fed into the foam scrubber. The process was carried out for 1.5 hours at a temperature of 50° C. During this time, 71.0 $Nm^3$ of ammonia and 35.5 $Nm^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 219.7 kg of sludge with a moisture content of 30% and 419 liters of filtrate (the total filtrate volume being 470 l). The $NH_4Cl$ concentration was 350 $g/dm^3$. The filtrate was fed to the stage of hydrogen chloride regeneration from ammonium chloride solution.

The sludge was washed in a filter with 350 liters of purified water with a temperature of 40° C., repulped in purified water with a temperature of 40° C. to obtain the concentration of 300 $g/dm^3$, filtered and washed again in a filter with 600 liters of purified water with a temperature of 40° C. Then it was dried at a temperature of 120° C. to obtain 154.5 kg of calcium carbonate with a moisture content of 0.5%. Calcium carbonate primary particle sizes were in the range of 0.5-2.5 µm.

8. Regeneration of Hydrogen Chloride from Ammonium Chloride Solution

The resulting calcium chloride solution in the amount of 419 liters with an $NH_4Cl$ concentration of 350 $g/dm^3$ was poured into a reactor connected to a hydrochloric acid vapor recovery system. Then, with continuous stirring, 287.6 kg of 95% sulfuric acid were poured into the solution. The reaction mass was brought to the boil and kept for 5 hours. During this time, the capture system collected 100.1 kg of HCl. The volume of the solution in the reactor was 300 l, the concentration of ammonium hydrogen sulfate was 1051 $g/dm^3$, the concentration of free sulfuric acid was 15 $g/dm^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 63.5 $Nm^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 368.3 kg of ammonium sulfate with a moisture content of 0.1%.

Example 9

1. Digestion of Ilmenite Concentrate

Digestion of ilmenite concentrate was carried out similarly to Example 8.

2. Processing of the Solid Residue after Ilmenite Concentrate Digestion

Processing of the solid residue after ilmenite concentrate digestion was carried out similarly to Example 8.

3. Hydrolysis of Titanium Oxychloride

Hydrolysis of titanium oxychloride was carried out similarly to Example 8.

4. Washing Titanium Oxides/Hydroxides Precipitate from Impurities

Washing titanium oxides/hydroxides precipitate from impurities was carried out similarly to Example 8.

5. Calcination of Titanium Oxides/Hydroxides Precipitate

Calcination of titanium oxides/hydroxides precipitate was carried out similarly to Example 8.

6. Precipitation of Iron Hydroxides to Obtain Color Pigments

The mother liquor resulting from the washing stage contains iron II chlorides in an amount of 175.4 g/dm$^3$ Fe$_2$O$_3$ and 21 g/dm$^3$ of free HCl.

740 liters of the mother liquor were poured into the iron oxide pigments synthesis reactor, the temperature of the solution being 30° C. With constant circulation provided by a membrane pump, the solution was neutralized with milk of lime slurry containing 200 g/dm$^3$ of CaO. 260 liters of Ca(OH)$_2$ slurry were consumed to neutralize the solution to pH 3.6. The solution temperature after neutralization was 40° C. The neutralization process lasted 1 hour. After neutralization to pH 3.6, the reactor was heated and air was supplied at a rate of 300 l/min. Heating of the reaction mixture to 90° C. lasted 1.5 hours. At this temperature the oxidation lasted 23 hours, while the pH was adjusted every 30 minutes with milk of lime slurry; the entire synthesis process required 514 liters of slurry. At the degree of iron oxidation being 70% the synthesis process was stopped.

After cooling to 60° C., the slurry was filtered in a candle filter. Filtration yielded 246.4 kg of black pigment cake (Fe$_3$O$_4$) with a moisture content of 50% and 905 liters of filtrate. The filtrate contained 2.4 g/dm$^3$ of iron as Fe$_2$O$_3$, and 346 g/dm$^3$ of calcium chloride CaCl$_2$. The volume of the filtrate, taking into account the filtrate remaining in the cake, was 1000 liters. Thus, the yield of iron oxide pigments reached 98.15%.

The Fe$_3$O$_4$ cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of black iron oxide pigment was dried at a temperature of 80° C. Drying resulted in 125.0 kg of black iron oxide pigment with a blue tint and a moisture content of 1.5%.

7. Processing of the Mother Liquor Containing Calcium Chloride

Processing of the mother liquor containing calcium chloride was carried out similarly to Example 8.

8. Regeneration of Hydrogen Chloride from Ammonium Chloride Solution

Regeneration of hydrogen chloride from ammonium chloride solution was carried out similarly to Example 8.

9. Obtaining Ammonium Sulfate and Ammonium Sulfate Crystallization

Ammonium sulfate was obtained and crystallized similarly to Example 8.

Example 10

1. Digestion of Ilmenite Concentrate

Digestion of ilmenite concentrate was carried out similarly to Example 9.

2. Processing of the Solid Residue after Ilmenite Concentrate Digestion

Processing of the solid residue after ilmenite concentrate digestion was carried out similarly to Example 9.

3. Hydrolysis of Titanium Oxychloride

Hydrolysis of titanium oxychloride was carried out similarly to Example 9.

4. Washing Titanium Oxides/Hydroxides Precipitate from Impurities

Washing titanium oxides/hydroxides precipitate from impurities was carried out similarly to Example 9.

5. Calcination of Titanium Oxides/Hydroxides Precipitate

Calcination of titanium oxides/hydroxides precipitate was carried out similarly to Example 9.

6. Precipitation of Iron Hydroxides to Obtain Color Pigments

The mother liquor resulting from the washing stage contains iron II chlorides in an amount of 175.4 g/dm$^3$ Fe$_2$O$_3$ and 21 g/dm$^3$ of free HCl.

740 liters of the mother liquor were poured into the iron oxide pigments synthesis reactor, the temperature of the solution being 50° C. With constant circulation provided by a membrane pump, the solution was neutralized with milk of lime slurry containing 200 g/dm$^3$ of CaO. 400 liters of Ca(OH)$_2$ slurry were consumed to neutralize the solution to pH 5.0. The solution temperature after neutralization was 80° C. The neutralization process lasted 1 hour. After neutralization to pH 5.0, the reactor was heated and air was supplied at a rate of 300 l/min. Heating of the reaction mixture to 90° C. lasted 1.5 hours. At this temperature the oxidation lasted 20 hours, while the pH was adjusted every 30 minutes with milk of lime slurry; the entire synthesis process required 514 liters of slurry. At the degree of iron oxidation being 70% the synthesis process was stopped.

After cooling to 60° C., the slurry was filtered in a candle filter. Filtration yielded 246.4 kg of black pigment cake (Fe$_3$O$_4$) with a moisture content of 50% and 905 liters of filtrate. The filtrate contained 2.4 g/dm$^3$ of iron as Fe$_2$O$_3$, and 346 g/dm$^3$ of calcium chloride CaCl$_2$. The volume of the filtrate, taking into account the filtrate remaining in the cake, was 1000 liters. Thus, the yield of iron oxide pigments reached 98.15%.

The Fe$_3$O$_4$ cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of black iron oxide pigment was dried at a temperature of 80° C. Drying resulted in 125.5 kg of black iron oxide pigment with a neutral tint and a moisture content of 1.5%.

To obtain red iron oxide pigment, the black pigment in an amount of 125.5 kg was calcined in an electric rotary tube furnace at a hot end temperature of 600° C. Fresh air was supplied to the furnace during calcination. Calcination yielded 127.9 kg of red iron oxide pigment with a cold violet-red tint.

After cooling the pigment to room temperature, the red iron oxide pigment was milled in a centrifugal mill.

7. Processing of the Mother Liquor Containing Calcium Chloride

Processing of the mother liquor containing calcium chloride was carried out similarly to Example 9.

8. Regeneration of Hydrogen Chloride from Ammonium Chloride Solution

Regeneration of hydrogen chloride from ammonium chloride solution was carried out similarly to Example 9.

9. Obtaining Ammonium Sulfate and Ammonium Sulfate Crystallization

Ammonium sulfate was obtained and crystallized similarly to Example 9.

Example 11

1. Digestion of Ilmenite Concentrate

Digestion of ilmenite concentrate was carried out similarly to Example 10.

2. Processing of the Solid Residue after Ilmenite Concentrate Digestion

Processing of the solid residue after ilmenite concentrate digestion was carried out similarly to Example 10.

3. Hydrolysis of Titanium Oxychloride

Hydrolysis of titanium oxychloride was carried out similarly to Example 10.

4. Washing Titanium Oxides/Hydroxides Precipitate from Impurities

Washing titanium oxides/hydroxides precipitate from impurities was carried out similarly to Example 10.

5. Calcination of Titanium Oxides/Hydroxides Precipitate

Calcination of titanium oxides/hydroxides precipitate was carried out similarly to Example 10.

6. Precipitation of Iron Hydroxides to Obtain Color Pigments

The mother liquor resulting from the washing stage contains iron II chlorides in an amount of 175.4 g/dm$^3$ Fe$_2$O$_3$ and 21 g/dm$^3$ of free HCl.

740 liters of the mother liquor were poured into the iron oxide pigments synthesis reactor, the temperature of the solution being 40° C. With constant circulation provided by a membrane pump, the solution was neutralized with milk of lime slurry containing 200 g/dm$^3$ of CaO. 348 liters of Ca(OH)$_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 514 liters of slurry. At the degree of iron oxidation being 70% the synthesis process was stopped.

After cooling to 60° C., the slurry was filtered in a candle filter. Filtration yielded 246.4 kg of black pigment cake (Fe$_3$O$_4$) with a moisture content of 50% and 905 liters of filtrate. The filtrate contained 2.4 g/dm$^3$ of iron as Fe$_2$O$_3$, and 346 g/dm$^3$ of calcium chloride CaCl$_2$. The volume of the filtrate, taking into account the filtrate remaining in the cake, was 1000 liters. Thus, the yield of iron oxide pigments reached 98.15%.

The Fe$_3$O$_4$ cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of black iron oxide pigment was dried at a temperature of 80° C. Drying resulted in 125.5 kg of black iron oxide pigment with a neutral tint and a moisture content of 1.5%.

To obtain red iron oxide pigment, the black pigment in an amount of 125.5 kg was calcined in an electric rotary tube furnace at a hot end temperature of 600° C. Fresh air was supplied to the furnace during calcination. Calcination yielded 127.9 kg of red iron oxide pigment with a warm beige-red tint.

After cooling the pigment to room temperature, the red iron oxide pigment was milled in a centrifugal mill.

7. Processing of the Mother Liquor Containing Calcium Chloride

Processing of the mother liquor containing calcium chloride was carried out similarly to Example 10.

8. Regeneration of Hydrogen Chloride from Ammonium Chloride Solution

Regeneration of hydrogen chloride from ammonium chloride solution was carried out similarly to Example 10.

9. Obtaining Ammonium Sulfate and Ammonium Sulfate Crystallization

Ammonium sulfate was obtained and crystallized similarly to Example 10.

Example 12

1. Digestion of Ilmenite Concentrate

Digestion of ilmenite concentrate was carried out similarly to Example 11.

2. Processing of the Solid Residue after Ilmenite Concentrate Digestion

Processing of the solid residue after ilmenite concentrate digestion was carried out similarly to Example 11.

3. Hydrolysis of Titanium Oxychloride

Hydrolysis of titanium oxychloride was carried out similarly to Example 11.

4. Washing titanium oxides/hydroxides precipitate from impurities

Washing titanium oxides/hydroxides precipitate from impurities was carried out similarly to Example 11.

5. Calcination of Titanium Oxides/Hydroxides Precipitate

Calcination of titanium oxides/hydroxides precipitate was carried out similarly to Example 11.

6. Precipitation of Iron Hydroxides to Obtain Color Pigments

Precipitation of iron hydroxides to obtain color pigments was carried out similarly to Example 11, except that to obtain red iron oxide pigment, the black pigment in an amount of 125.5 kg was calcined in an electric rotary tube furnace at a hot end temperature of 700° C.

Fresh air was supplied to the furnace during calcination. Calcination yielded 127.9 kg of red iron oxide pigment with a brownish-red tint.

After cooling the pigment to room temperature, the red iron oxide pigment was milled in a centrifugal mill.

7. Processing of the Mother Liquor Containing Calcium Chloride

Processing of the mother liquor containing calcium chloride was carried out similarly to Example 11.

8. Regeneration of Hydrogen Chloride from Ammonium Chloride Solution

Regeneration of hydrogen chloride from ammonium chloride solution was carried out similarly to Example 11.

9. Obtaining Ammonium Sulfate and Ammonium Sulfate Crystallization

Ammonium sulfate was obtained and crystallized similarly to Example 11.

Example 13

1. Digestion of Ilmenite Concentrate

Digestion of ilmenite concentrate was carried out similarly to Example 12.

2. Processing of the Solid Residue after Ilmenite Concentrate Digestion

Processing of the solid residue after ilmenite concentrate digestion was carried out similarly to Example 12.

3. Hydrolysis of Titanium Oxychloride

Hydrolysis of titanium oxychloride was carried out similarly to Example 12.

4. Washing Titanium Oxides/Hydroxides Precipitate from Impurities

Washing titanium oxides/hydroxides precipitate from impurities was carried out similarly to Example 12.

5. Calcination of Titanium Oxides/Hydroxides Precipitate

Calcination of titanium oxides/hydroxides precipitate was carried out similarly to Example 12.

6. Precipitation of Iron Hydroxides to Obtain Color Pigments

The mother liquor resulting from the washing stage contains iron II chlorides in an amount of 175.4 g/dm$^3$ Fe$_2$O$_3$ and 21 g/dm$^3$ of free HCl.

To obtain yellow iron oxide pigments, the seeds are prepared in the first synthesis stage, and in the second stage, the pigments are synthesized.

740 liters of the mother liquor were poured into the iron oxide pigments synthesis reactor, the temperature of the solution being 50° C. With constant circulation provided by a membrane pump, the solution was neutralized with milk of lime slurry containing 200 g/dm$^3$ of CaO. To obtain the seeds, 10% of the total iron was neutralized. For neutralization to pH 3.6, 106 liters of Ca(OH)$_2$ slurry were consumed. After partial neutralization, the air supply was turned on at a rate of 300 l/min; the solution was kept at a temperature of 30° C. for 6 hours.

After the synthesis of seeds the solution was heated and 358 liters of calcium hydroxide were added. The synthesis was carried out for 30 hours at a temperature of 75-80° C. The pH was adjusted every 30 minutes with milk of lime slurry. The entire synthesis process required 514 liters of calcium hydroxide slurry. At the degree of iron oxidation being 90% the synthesis process was stopped.

After cooling to 60° C., the slurry was filtered in a candle filter. Filtration yielded 284.6 kg of yellow pigment cake (FeOOH) with a moisture content of 50% and 851 liters of filtrate. The filtrate contained 2.0 g/dm$^3$ of iron as Fe$_2$O$_3$, and 360 g/dm$^3$ of calcium chloride CaCl$_2$. The volume of the filtrate, taking into account the filtrate remaining in the cake, was 960 liters. Thus, the yield of iron oxide pigments reached 98. 52%.

The FeOOH cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of yellow iron oxide pigment was dried at a temperature of 120° C. Drying resulted in 143.0 kg of yellow iron oxide pigment with a moisture content of 1.5%.

7. Processing of the Mother Liquor Containing Calcium Chloride

After the extraction of iron, the mother liquor in an amount of 395.5 l containing 142.4 kg of CaCl$_2$ was evaporated and sent to the stage of titanium-containing feedstock digestion.

Extraction of calcium carbonate is carried out from solutions resulting from the filtration of black iron oxide pigment in the stage of iron precipitation from iron chloride solutions.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 455.5 liters of filtrate with a CaCl$_2$ concentration of 360 g/dm$^3$ were fed into the foam scrubber. The process was carried out for 1.5 hours at a temperature of 50° C. During this time, 68.2 Nm$^3$ of ammonia and 34.1 Nm$^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 211 kg of sludge with a moisture content of 30% and 406 liters of filtrate (the total filtrate volume being 455 l). The NH$_4$Cl concentration was 347 g/dm$^3$. The filtrate was fed to the stage of hydrogen chloride regeneration from ammonium chloride solution.

The sludge was washed in a filter with 400 liters of purified water with a temperature of 40° C., repulped in purified water with a temperature of 40° C. to obtain the concentration of 300 g/dm$^3$, filtered and washed again in a filter with 600 liters of purified water with a temperature of 40° C. Then it was dried at a temperature of 120° C. to obtain 148.5 kg of calcium carbonate with a moisture content of 0.5%. Calcium carbonate primary particle sizes were in the range of 0.5-2.5 μm.

8. Regeneration of Hydrogen Chloride from Ammonium Chloride Solution

The resulting calcium chloride solution in the amount of 406 liters with an NH$_4$Cl concentration of 347 g/dm$^3$ was poured into a reactor connected to a hydrochloric acid vapor recovery system. Then, with continuous stirring, 276.4 kg of 95% sulfuric acid were poured into the solution. The reaction mass was brought to the boil and kept for 5 hours. During this time, the capture system collected 96.1 kg of HCl. The volume of the solution in the reactor was 300 l, the concentration of ammonium hydrogen sulfate was 1009 g/dm$^3$, the concentration of free sulfuric acid was 15 g/dm$^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 61.1 Nm$^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 357.3 kg of ammonium sulfate with a moisture content of 0.1%.

Example 14

1. Digestion of Ilmenite Concentrate

Digestion of ilmenite concentrate was carried out similarly to Example 13.

2. Processing of the Solid Residue after Ilmenite Concentrate Digestion

Processing of the solid residue after ilmenite concentrate digestion was carried out similarly to Example 13.

3. Hydrolysis of Titanium Oxychloride

Hydrolysis of titanium oxychloride was carried out similarly to Example 13.

4. Washing Titanium Oxides/Hydroxides Precipitate from Impurities

Washing titanium oxides/hydroxides precipitate from impurities was carried out similarly to Example 13.

5. Calcination of Titanium Oxides/Hydroxides Precipitate

Calcination of titanium oxides/hydroxides precipitate was carried out similarly to Example 13.

6. Precipitation of Iron Hydroxides to Obtain Color Pigments

The mother liquor resulting from the washing stage contains iron II chlorides in an amount of 175.4 g/dm$^3$ Fe$_2$O$_3$ and 21 g/dm$^3$ of free HCl.

To obtain yellow iron oxide pigments, the seeds are prepared in the first synthesis stage, and in the second stage the pigments are synthesized.

To prepare the seeds 740 liters of the mother liquor were poured into the iron oxide pigments synthesis reactor, the temperature of the solution being 30° C. With constant circulation provided by a membrane pump, the solution was neutralized with milk of lime slurry containing 200 g/dm$^3$ of CaO. For neutralization to pH 3.6, 186 liters of Ca(OH)$_2$ slurry were consumed. After partial neutralization, the air supply was turned on at a rate of 300 l/min; the solution was kept at a temperature of 30° C. for 6 hours.

After the synthesis of seeds the solution was heated and 300 liters of calcium hydroxide were added. The synthesis was carried out for 30 hours at a temperature of 75-80° C. The pH was adjusted every 30 minutes with milk of lime slurry. The entire synthesis process required 514 liters of calcium hydroxide slurry. At the degree of iron oxidation being 90% the synthesis process was stopped.

After cooling to 60° C., the slurry was filtered in a candle filter. Filtration yielded 284.6 kg of yellow pigment cake (FeOOH) with a moisture content of 50% and 851 liters of filtrate. The filtrate contained 2.0 g/dm$^3$ of iron as Fe$_2$O$_3$, and 360 g/dm$^3$ of calcium chloride CaCl$_2$). The volume of the filtrate, taking into account the filtrate remaining in the cake, was 960 liters. Thus, the yield of iron oxide pigments reached 98. 52%.

The FeOOH cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of yellow iron oxide pigment was dried at a temperature of 120° C. Drying resulted in 143.0 kg of yellow iron oxide pigment with a bright light tint and a moisture content of 0.5%.

7. Processing of the Mother Liquor Containing Calcium Chloride

Processing of the mother liquor containing calcium chloride was carried out similarly to Example 13.

8. Regeneration of Hydrogen Chloride from Ammonium Chloride Solution

Regeneration of hydrogen chloride from ammonium chloride solution was carried out similarly to Example 13.

9. Obtaining Ammonium Sulfate and Ammonium Sulfate Crystallization

Ammonium sulfate was obtained and crystallized similarly to Example 13.

Example 15

1. Digestion of Ilmenite Concentrate

Digestion of ilmenite concentrate was carried out similarly to Example 14.

2. Processing of the Solid Residue after Ilmenite Concentrate Digestion

Processing of the solid residue after ilmenite concentrate digestion was carried out similarly to Example 14.

3. Hydrolysis of Titanium Oxychloride

Hydrolysis of titanium oxychloride was carried out similarly to Example 14.

4. Washing Titanium Oxides/Hydroxides Precipitate from Impurities

Washing titanium oxides/hydroxides precipitate from impurities was carried out similarly to Example 14.

5. Calcination of Titanium Oxides/Hydroxides Precipitate

Calcination of titanium oxides/hydroxides precipitate was carried out similarly to Example 14.

6. Precipitation of Iron Hydroxides to Obtain Color Pigments

The mother liquor resulting from the washing stage contains iron II chlorides in an amount of 175.4 g/dm$^3$ Fe$_2$O$_3$ and 21 g/dm$^3$ of free HCl.

To obtain yellow iron oxide pigments, the seeds are prepared in the first synthesis stage, and in the second stage, the pigments are synthesized.

To prepare the seeds 740 liters of the mother liquor were poured into the iron oxide pigments synthesis reactor, the temperature of the solution being 30° C. With constant circulation provided by a membrane pump, the solution was neutralized with milk of lime slurry containing 200 g/dm$^3$ of CaO. For neutralization to pH 3.6, 186 liters of Ca(OH)$_2$ slurry were consumed. After partial neutralization, the air supply was turned on at a rate of 300 l/min; the solution was kept at a temperature of 30° C. for 6 hours.

After the synthesis of seeds the solution was heated and 300 liters of calcium hydroxide were added. The synthesis was carried out for 30 hours at a temperature of 75-80° C. The pH was adjusted every 30 minutes with milk of lime slurry. The entire synthesis process required 514 liters of calcium hydroxide slurry. At the degree of iron oxidation being 90% the synthesis process was stopped.

After cooling to 60° C., the slurry was filtered in a candle filter. Filtration yielded 284.6 kg of yellow pigment cake (FeOOH) with a moisture content of 50% and 851 liters of filtrate. The filtrate contained 2.0 g/dm$^3$ of iron as Fe$_2$O$_3$, and 360 g/dm$^3$ of calcium chloride CaCl$_2$. The volume of the filtrate, taking into account the filtrate remaining in the cake, was 960 liters. Thus, the yield of iron oxide pigments reached 98.52%.

The FeOOH cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of yellow iron oxide pigment was dried at a temperature of 120° C. Drying resulted in 143.0 kg of yellow iron oxide pigment with a bright light tint and a moisture content of 0.5%.

To obtain red iron oxide piment, the yellow pigment was calcined in an electric rotary tube furnace at a hot end temperature of 600° C. Fresh air was supplied to the furnace during calcination. Calcination yielded 127.9 kg of red iron oxide pigment with a bright red mass tone and pink tint.

After cooling the pigment to room temperature, the red iron oxide pigment was milled in a centrifugal mill.

7. Processing of the Mother Liquor Containing Calcium Chloride

Processing of the mother liquor containing calcium chloride was carried out similarly to Example 14.

8. Regeneration of Hydrogen Chloride from Ammonium Chloride Solution

Regeneration of hydrogen chloride from ammonium chloride solution was carried out similarly to Example 14.

9. Obtaining Ammonium Sulfate and Ammonium Sulfate Crystallization

Ammonium sulfate was obtained and crystallized similarly to Example 14.

Example 16

1. Digestion of Ilmenite Concentrate

Digestion of ilmenite concentrate was carried out similarly to Example 15.

2. Processing of the Solid Residue after Ilmenite Concentrate Digestion

Processing of the solid residue after ilmenite concentrate digestion was carried out similarly to Example 15.

3. Hydrolysis of Titanium Oxychloride

Hydrolysis of titanium oxychloride was carried out similarly to Example 15.

4. Washing Titanium Oxides/Hydroxides Precipitate from Impurities

Washing titanium oxides/hydroxides precipitate from impurities was carried out similarly to Example 15.

5. Calcination of Titanium Oxides/Hydroxides Precipitate

Calcination of titanium oxides/hydroxides precipitate was carried out similarly to Example 15.

6. Precipitation of Iron Hydroxides to Obtain Color Pigments

Precipitation of iron hydroxides to obtain color pigments was carried out similarly to Example 15. Except that to obtain red iron oxide pigment, the yellow pigment in an amount of 143.0 kg was calcined in an electric rotary tube furnace at a hot end temperature of 700° C. Fresh air was supplied to the furnace during calcination. Calcination yielded 127.9 kg of red iron oxide pigment with a bright red mass tone and bricky tint.

After cooling the pigment to room temperature, the red iron oxide pigment was milled in a centrifugal mill.

7. Processing of the mother liquor containing calcium chloride

Processing of the mother liquor containing calcium chloride was carried out similarly to Example 15.

8. Regeneration of Hydrogen Chloride from Ammonium Chloride Solution

Regeneration of hydrogen chloride from ammonium chloride solution was carried out similarly to Example 15.

9. Obtaining Ammonium Sulfate and Ammonium Sulfate Crystallization

Ammonium sulfate was obtained and crystallized similarly to Example 15.

Example 17

1. Digestion of Ilmenite Concentrate

Digestion of ilmenite concentrate was carried out similarly to Example 16.

2. Processing of the Solid Residue after Ilmenite Concentrate Digestion

Processing of the solid residue after ilmenite concentrate digestion was carried out similarly to Example 16.

3. Hydrolysis of Titanium Oxychloride

Hydrolysis of titanium oxychloride was carried out similarly to Example 16.

4. Washing Titanium Oxides/Hydroxides Precipitate from Impurities

Washing titanium oxides/hydroxides precipitate from impurities was carried out similarly to Example 16.

5. Calcination of Titanium Oxides/Hydroxides Precipitate

Calcination of titanium oxides/hydroxides precipitate was carried out similarly to Example 16.

6. Precipitation of Iron Hydroxides to Obtain Color Pigments

Precipitation of iron hydroxides to obtain color pigments was carried out similarly to Example 16.

7. Processing of the Mother Liquor Containing Calcium Chloride

After the extraction of iron, the mother liquor in an amount of 395.5 l containing 142.4 kg of $CaCl_2$ was evaporated and sent to the stage of titanium-containing feedstock digestion.

Extraction of calcium carbonate is carried out from solutions resulting from the filtration of black iron oxide pigment in the stage of iron precipitation from iron chloride solutions.

To obtain calcium carbonate particles with a narrow size distribution, 2% calcium carbonate seeds are used.

To prepare the seeds, 6.3 liters of a solution containing 2.84 kg of ammonium carbonate were poured into 7.4 liters of a solution containing 3.29 kg of calcium chloride. The preparation of seeds was carried out at a solution temperature of 20° C.; vigorous stirring was provided during mixing. After mixing, the intensity of stirring was reduced and the seeds were allowed to age for 2 hours.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia, carbon dioxide and seeds solution were simultaneously fed. 455.5 liters of filtrate with a $CaCl_2$ concentration of 360 g/dm$^3$ were fed into the foam scrubber. The process was carried out for 1.5 hours at a temperature of 50° C. During this time, 68.2 Nm$^3$ of ammonia and 34.1 Nm$^3$ of carbon dioxide passed through the foam scrubber. Ammonia and carbon dioxide were used in excess of 3%.

After carrying out the absorption of gases, the pH of the slurry was adjusted to 7.2 and the slurry was sent for filtration.

The filtration yielded 214.9 kg of sludge with a moisture content of 30% and 420 liters of filtrate (the total filtrate volume being 469 l). The $NH_4Cl$ concentration was 343 g/dm$^3$. The filtrate was fed to the stage of hydrogen chloride regeneration from ammonium chloride solution.

The sludge was washed in a filter with 400 liters of purified water with a temperature of 40° C., repulped in purified water with a temperature of 40° C. to obtain the concentration of 300 g/dm$^3$, filtered and washed again in a filter with 600 liters of purified water with a temperature of 40° C. Then it was dried at a temperature of 120° C. to obtain 151.5 kg of calcium carbonate with a moisture content of 0.5%. Calcium carbonate primary particle sizes were in the range of 0.2-0.5 μm.

8. Regeneration of Hydrogen Chloride from Ammonium Chloride Solution

The resulting calcium chloride solution in the amount of 420 liters with an $NH_4Cl$ concentration of 343 g/dm$^3$ was poured into a reactor connected to a hydrochloric acid vapor recovery system. Then, with continuous stirring, 282.5 kg of 95% sulfuric acid were poured into the solution. The reaction mass was brought to the boil and kept for 5 hours. During this time, the capture system collected 98.3 kg of HCl. The volume of the solution in the reactor was 300 l, the concentration of ammonium hydrogen sulfate was 1032 g/dm$^3$, the concentration of free sulfuric acid was 15 g/dm$^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 62.4 Nm$^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 361.8 kg of ammonium sulfate with a moisture content of 0.1%.

Example 18

1. Digestion of Ilmenite Concentrate

Digestion of ilmenite concentrate was carried out similarly to Example 17, except that hydrochloric acid was used:
 i. obtained from ammonium chloride solutions in hydrogen chloride regeneration stage;
 ii. fresh acid introduced into the process externally.

2. Processing of the Solid Residue after Ilmenite Concentrate Digestion

Processing of the solid residue after ilmenite concentrate digestion was carried out similarly to Example 17.

3. Hydrolysis of Titanium Oxychloride

Hydrolysis of titanium oxychloride was carried out similarly to Example 17.

4. Washing Titanium Oxides/Hydroxides Precipitate from Impurities

Washing titanium oxides/hydroxides precipitate from impurities was carried out similarly to Example 1.

5. Calcination of Titanium Oxides/Hydroxides Precipitate

Calcination of titanium oxides/hydroxides precipitate was carried out similarly to Example 17.

6. Precipitation of Iron Hydroxides to Obtain Color Pigments

Precipitation of iron hydroxides to obtain color pigments was carried out similarly to Example 17.

7. Processing of the Mother Liquor Containing Calcium Chloride

Processing of the mother liquor containing calcium chloride was carried out similarly to Example 17.

8. Regeneration of Hydrogen Chloride from Ammonium Chloride Solution

Regeneration of hydrogen chloride from ammonium chloride solution was excluded.

9. Obtaining Ammonium Sulfate and Ammonium Sulfate Crystallization

Obtaining ammonium sulfate was excluded.

10. Obtaining Crystalline Ammonium Chloride 420 liters of a solution with an ammonium chloride concentration of 343 g/dm$^3$ coming from the stage of processing of the mother liquor containing calcium chloride was poured into a crystallizer equipped with a heating jacket and connected to a vacuum line. The solution was brought to the boil and boiled at a vacuum of 0.6 atm until water was completely removed. Crystallization process yielded 144.2 kg of ammonium chloride with a moisture content of 0.1%.

Example 19

1. Digestion of Ilmenite Concentrate

Digestion of ilmenite concentrate was carried out similarly to Example 16.

2. Processing of the Solid Residue after Ilmenite Concentrate Digestion

Processing of the solid residue after ilmenite concentrate digestion was carried out similarly to Example 16.

3. Hydrolysis of Titanium Oxychloride

Hydrolysis of the filtered solution of titanium oxychloride $TiOCl_2$ coming from the stage of ilmenite concentrate digestion was carried out in a reactor equipped with a heating jacket, direct steam inlet and a high-speed stirrer. Heating was provided by circulating oil through the jacket and boiling—by direct steam. Stirring was carried out using a turbine stirrer at 200 rpm. Seeds were used for the hydrolysis. A system of coolers and scrubbers was used to capture the vapors. The collected hydrochloric acid was sent to the ilmenite concentrate digestion stage.

The reactor was filled with 1161.6 liters of the filtered reduced solution at a temperature of 30° C., and heating started. The solution was heated at a rate of 0.5° C. per minute with constant stirring. Upon reaching 70° C., rutile seeds were introduced into the solution in an amount of 2%. The seeds slurry in an amount of 65.5 liters with a concentration of 40 g/dm$^3$ was added within 10 minutes, and direct steam was fed. The solution was brought to the boil and kept at a temperature of 108° C. for 10 hours. All the evaporated hydrochloric acid was collected and sent to the ilmenite digestion stage.

To prepare the seeds, 6.23 kg of $TiCl_4$ were dissolved in 11.25 liters of water, the temperature being maintained at 35° C. The scrubber which trapped hydrochloric acid vapor neutralized 390 g of hydrochloric acid while dissolving titanium tetrachloride. After that, with stirring, the solution was neutralized with portions of a sodium hydroxide solution with a concentration of 300 g/dm$^3$. Sodium hydroxide in an amount of 15 liters was added for neutralization, the reaction mass was heated to 80° C. and kept for 1 hour. Then it was cooled to 50° C., and neutralized to pH 9.3. After settling the slurry, the liquid was decanted and the slurry was diluted to 65.5 liters with stirring.

The titanium dioxide slurry resulting from hydrolysis was cooled to 60° C. and sent for filtration. As a result, 222.9 kg of titanium dioxide precipitate and 800 liters of mother liquor were obtained. The cake contained 60% of $TiO_2$. The mother liquor contained 113.6 g/dm$^3$ of Fe (162.2 g/dm$^3$ of $Fe_2O_3$).

4. Washing Titanium Oxides/Hydroxides Precipitate from Impurities

Washing titanium oxides/hydroxides precipitate from impurities was carried out similarly to Example 16.

5. Calcination of Titanium Oxides/Hydroxides Precipitate

Calcination of titanium oxides/hydroxides precipitate was carried out similarly to Example 16.

6. Precipitation of Iron Hydroxides to Obtain Color Pigments

The mother liquor resulting from the washing stage contains iron II chlorides in an amount of 162.2 g/dm$^3$ $Fe_2O_3$ and 14 g/dm$^3$ of free HCl.

To obtain yellow iron oxide pigments, the seeds are prepared in the first synthesis stage, and in the second stage, the pigments are synthesized.

To prepare the seeds 800 liters of the mother liquor were poured into the iron oxide pigments synthesis reactor, the temperature of the solution being 30° C. With constant circulation provided by a membrane pump, the solution was neutralized with milk of lime slurry containing 200 g/dm$^3$ of CaO. For neutralization to pH 3.6, 186 liters of $Ca(OH)_2$ slurry were consumed. After partial neutralization, the air supply was turned on at a rate of 300 l/min; the solution was kept at a temperature of 30° C. for 6 hours.

After the synthesis of seeds the solution was heated and 300 liters of calcium hydroxide were added. The synthesis was carried out for 30 hours at a temperature of 75-80° C. The pH was adjusted every 30 minutes with milk of lime slurry. The entire synthesis process required 514 liters of calcium hydroxide slurry. At the degree of iron oxidation being 90% the synthesis process was stopped.

After cooling to 60° C., the slurry was filtered in a candle filter. Filtration yielded 284.6 kg of yellow pigment cake (FeOOH) with a moisture content of 50% and 900 liters of filtrate. The filtrate contained 1.9 g/dm$^3$ of iron as $Fe_2O_3$, and 340 g/dm$^3$ of calcium chloride $CaCl_2$). The volume of the filtrate, taking into account the filtrate remaining in the cake, was 1009 liters. Thus, the yield of iron oxide pigments reached 98.52%.

The FeOOH cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of yellow iron oxide pigment was dried at a temperature of 120° C. Drying resulted in 143.0 kg of yellow iron oxide pigment with a bright light tint and a moisture content of 1.5%.

To obtain red iron oxide piment, the yellow pigment was calcined in an electric rotary tube furnace at a hot end temperature of 700° C. Fresh air was supplied to the furnace during calcination. Calcination yielded 127.9 kg of red iron oxide pigment with a bright red mass tone and a bricky tint. After cooling the pigment to room temperature, the red iron oxide pigment was milled in a centrifugal mill.

7. Processing of the Mother Liquor Containing Calcium Chloride

After the extraction of iron, the mother liquor in an amount of 418.8 l containing 142.4 kg of $CaCl_2$ was evaporated and sent to the stage of titanium-containing feedstock digestion.

Extraction of calcium carbonate is carried out from solutions resulting from the filtration of black iron oxide pigment in the stage of iron precipitation from iron chloride solutions.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 481.2 liters of filtrate with a $CaCl_2$ concentration of 340 g/dm$^3$ were fed into the foam scrubber. The process was carried out for 1.5 hours at a temperature of 50° C. During this time, 68.2 Nm$^3$ of ammonia and 34.1 Nm$^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 211 kg of sludge with a moisture content of 30% and 456 liters of filtrate (the total filtrate volume being 505 l). The $NH_4Cl$ concentration was 313 g/dm$^3$. The filtrate was fed to the stage of hydrogen chloride regeneration from ammonium chloride solution.

The sludge was washed in a filter with 400 liters of purified water with a temperature of 40° C., repulped in purified water with a temperature of 40° C. to obtain the concentration of 300 g/dm$^3$, filtered and washed again in a filter with 600 liters of purified water with a temperature of 40° C. Then it was dried at a temperature of 120° C. to obtain 148.5 kg of calcium carbonate with a moisture content of 0.5%. Calcium carbonate primary particle sizes were in the range of 0.5-2.5 µm.

8. Regeneration of hydrogen chloride from ammonium chloride solution

The resulting calcium chloride solution in the amount of 456 liters with an $NH_4Cl$ concentration of 313 g/dm$^3$ was poured into a reactor connected to a hydrochloric acid vapor recovery system. Then, with continuous stirring, 279.9 kg of 95% sulfuric acid were poured into the solution. The reaction mass was brought to the boil and kept for 5 hours. During this time, the capture system collected 97.3 kg of HCl. The volume of the solution in the reactor was 300 l, the concentration of ammonium hydrogen sulfate was 1022 g/dm$^3$, the concentration of free sulfuric acid was 15 g/dm$^3$.

9. Obtaining Ammonium Sulfate and Ammonium Sulfate Crystallization

The solution obtained in the stage of hydrogen chloride regeneration was poured into the ammonium sulfate synthesis reactor, the volume of the solution being 300 liters. Then, ammonia in an amount of 61.8 Nm$^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 358.4 kg of ammonium sulfate with a moisture content of 0.1%.

Example 20

1. Digestion of Ilmenite Concentrate

Milled ilmenite concentrate (with $TiO_2$ content of 58.0 wt %; FeO—16.5%, $Fe_2O_3$—19.7%, $P_2O_5$—0.07%) with a particle size of 0.5-10 μm, hydrochloric acid with a concentration of at least 30% HCl and ammonium chloride mother liquor from the stage of obtaining precipitated calcium carbonate were used for digestion.

Hydrochloric acid is the acid:
  i. returned from the stage of titanium oxychloride hydrolysis;
  ii. obtained from ammonium chloride solutions in hydrogen chloride regeneration stage.

The digestion was carried out in two stages in a countercurrent system. The first digestion stage used hydrochloric acid, the unreacted solid part (sludge) from the second digestion stage and ammonium chloride mother liquor from the stage of obtaining precipitated calcium carbonate, and the second digestion stage used the solution from the first stage containing titanium oxychloride and iron chlorides and mechanically activated ilmenite concentrate. The first digestion stage is combined with the reduction stage.

Heating was carried out through the water jacket of the digestion reactor; stirring was performed with an overhead stirrer, stirring speed: 200 rpm.

To reduce ferric iron to the ferrous state, a basket with metallic iron was dipped into the digestion reactor in the second digestion stage.

After the first digestion stage the sludge was separated from the mother liquor using a candle filter and sent to the stage of processing the solid residue after ilmenite concentrate digestion, and the filtrate was sent to the second stage of ilmenite digestion. After the second digestion stage, the sludge was separated from the mother liquor in a candle filter and sent to the first digestion stage, and the filtrate was sent to the stage of reduction of ferric iron to its ferrous state.

For one digestion cycle, 238 kg of milled ilmenite concentrate and 1202 liters of hydrochloric acid with an HCl content of 30% and 380 liters of ammonium chloride with a concentration of 33% were used. The digestion was carried out at a temperature of 60° C. The stage to digest the milled ilmenite concentrate lasted 6 hours, and the stage to digest the unreacted solid part (sludge) lasted 8 hours.

The reduction was carried out until a mass concentration of trivalent titanium ($Ti_2O_3$) reached 3 $g/dm^3$. After reduction, the concentration of ferrous iron ($Fe^{2+}$) was 73 $g/dm^3$.

And the last filtration stage in a candle filter yielded 1363.6 liters of mother liquor, while 8.4 liters of mother liquor remained in the sludge, the total volume of mother liquor was 1372 liters. The $TiO_2$ concentration was 95.5 $g/dm^3$, and the titanium yield was 94.9%. The total iron concentration was 73 $g/dm^3$.

The reduction of ferric iron to the ferrous state was carried out in the second digestion stage.

2. Processing of the solid residue after ilmenite concentrate digestion

The filtration yielded 22 kg of sludge. The sludge was repulped using an overhead stirrer in 100 liters of filtered water, filtered and washed in a candle filter to reach neutral pH of the filtrate. The washed sludge was dried at 120° C. and calcined at 900° C. Calcination provided 11.0 kg of the product consisting of: $TiO_2$—63.64%, $Fe_2O_3$—0.82%, $SiO_2$—35.27%.

The product after calcination was treated with organic substances in an amount of 0.7% and milled in a centrifugal mill. The dispersibility of the product after milling was tested using a high speed impeller mill according to ISO 8780-3; the particle size was 23 μm. This product has a beige tint and can replace up to 20% of titanium dioxide pigments in color paint systems.

3. Hydrolysis of titanium oxychloride

Hydrolysis of the filtered solution of titanium oxychloride $TiOCl_2$ coming from the stage of ilmenite concentrate digestion was carried out in a reactor equipped with a heating jacket and a high-speed stirrer. The reactor was filled with 1363.6 liters of the filtered reduced solution at a temperature of 30° C., and heating started. Heating was carried out by circulating oil through the jacket. The solution was heated at a rate of 0.5° C. per minute with constant stirring. Stirring was carried out using a turbine stirrer at 200 rpm. No seeds were used for the hydrolysis. Upon reaching 80° C., the process of hydrolysis began. The heating rate being the same, the solution was brought to the boil and boiling continued for 10 hours.

A system of coolers and scrubbers was used to capture the vapors. All the evaporated hydrochloric acid was collected and sent to the ilmenite concentrate digestion stage.

The titanium dioxide slurry resulting from hydrolysis was cooled to 60° C. and sent for filtration. As a result, 218.5 kg of titanium dioxide precipitate and 885 liters of mother liquor were obtained. The cake contained 60% of $TiO_2$. The mother liquor contained 103.9 $g/dm^3$ of Fe (148.4 $g/dm^3$ of $Fe_2O_3$).

4. Washing Titanium Oxides/Hydroxides Precipitate from Impurities

The titanium oxides/hydroxides cake obtained in the filter was washed with 1000 liters of purified water with an HCl content of 2%, water temperature being 60° C., and then the cake was washed with 300 liters of purified water with the same temperature. The content of trivalent titanium before filtration was adjusted to reach the concentration of 1.2 $g/dm^3$ ($Ti_2O_3$). At the end of the wash, pH of the filtrate was neutral. Washing resulted in the cake of titanium oxides/hydroxides with the following impurity content: 0.03% Fe and 0.0016% Cr.

5. Calcination of Titanium Oxides/Hydroxides Precipitate

The washed cake was not subjected to salt treatment.

The resulting cake was calcined in a tube furnace at a hot end temperature of 960° C. Calcination yielded 131.0 kg of titanium dioxide with a particle size of 15-25 μm.

6. Precipitation of Iron Hydroxides to Obtain Color Pigments

The mother liquor resulting from the washing stage contains iron II chlorides in an amount of 148.4 $g/dm^3$ $Fe_2O_3$ and 18.5 $g/dm^3$ of free HCl.

885 liters of the mother liquor were poured into the iron oxide pigments synthesis reactor, the temperature of the solution being 40° C. With constant circulation provided by a membrane pump, the solution was neutralized with milk of lime slurry containing 200 $g/dm^3$ of CaO. 345 liters of $Ca(OH)_2$ slurry were consumed to neutralize the solution to pH 4.2. The solution temperature after neutralization was 60° C. The neutralization process lasted 1 hour. After neutralization to pH 4.2, the reactor was heated and air was supplied at a rate of 300 l/min. Heating of the reaction mixture to 90° C. lasted 1.5 hours. At this temperature the oxidation lasted 21 hours, while the pH was adjusted every 30 minutes with milk of lime slurry; the entire synthesis process required 515 liters of slurry. At the degree of iron oxidation being 70% the synthesis process was stopped.

After cooling to 60° C., the slurry was filtered in a candle filter. Filtration yielded 249.2 kg of black pigment cake ($Fe_3O_4$) with a moisture content of 50% and 1107 liters of filtrate. The filtrate contained 2.0 g/dm$^3$ of iron as Fe$_2$O$_3$, 170.1 g/dm$^3$ of calcium chloride CaCl$_2$ and 104.8 g/dm$^3$ of ammonium chloride. The volume of the filtrate, taking into account the filtrate remaining in the cake, was 1200 liters. Thus, the yield of iron oxide pigments reached 98.17%.

The Fe$_3$O$_4$ cake was repulped in purified water with a temperature of 60° C. to obtain a concentration of 300 g/dm$^3$, and stirred for 2 hours, then filtered in a candle filter and washed with 1 m$^3$ of pure water with a temperature of 40° C.

Next, the resulting cake of black iron oxide pigment was dried at a temperature of 80° C. Drying resulted in 126.5 kg of black iron oxide pigment with a neutral tint and a moisture content of 1.5%.

The entire volume of the mother liquor undergoes further processing.

7. Processing of the Mother Liquor Containing Calcium Chloride

Extraction of calcium carbonate is carried out from solutions resulting from the filtration of black iron oxide pigment in the stage of iron precipitation from iron chloride solutions.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtrate resulting from black iron oxide pigments filtration was fed into a foam scrubber, into where gaseous ammonia and carbon dioxide were simultaneously fed. 1107 liters of filtrate with a CaCl$_2$ concentration of 170.1 g/dm$^3$ and a NH$_4$Cl concentration of 104.8 g/dm$^3$ were fed into the foam scrubber. The process was carried out for 1.5 hours at a temperature of 50° C. During this time, 78.3 Nm$^3$ of ammonia and 39.1 Nm$^3$ of carbon dioxide passed through the foam scrubber. Ammonia and carbon dioxide were used in excess of 3%. After carrying out the absorption of gases, the pH of the slurry was adjusted to 7.2 and the slurry was sent for filtration.

The filtration yielded 220.5 kg of sludge with a moisture content of 30% and 1027 liters of filtrate (the total filtrate volume being 1067 l). The NH$_4$Cl concentration was 246.6 g/dm$^3$. The filtrate was fed to the stage of hydrogen chloride regeneration from ammonium chloride solution.

The sludge was washed in a filter with 350 liters of purified water with a temperature of 40° C., repulped in purified water with a temperature of 40° C. to obtain the concentration of 300 g/dm$^3$, filtered and washed again in a filter with 600 liters of purified water with a temperature of 40° C. Then it was dried at a temperature of 120° C. to obtain 170.5 kg of calcium carbonate with a moisture content of 0.5%. Calcium carbonate primary particle sizes were in the range of 0.5-2.5 μm.

8. Regeneration of Hydrogen Chloride from Ammonium Chloride Solution 1027 liters of a solution with an NH$_4$Cl concentration of 346.6 g/dm$^3$ were obtained from the stage of processing of the mother liquor from the calcium chloride solution.

523.7 liters of the solution were evaporated to 380 l and sent to the stage of ilmenite concentrate digestion.

The remaining solution in the amount of 503.3 liters was poured into a reactor connected to a hydrochloric acid vapor recovery system. Then, with continuous stirring, 342.6 kg of 95% sulfuric acid were poured into the solution. The reaction mass was brought to the boil and kept for 5 hours. During this time, the capture system collected 119.0 kg of HCl. The volume of the solution in the reactor was 400 l, the concentration of ammonium hydrogen sulfate was 937 g/dm$^3$, the concentration of free sulfuric acid was 15 g/dm$^3$.

9. Obtaining ammonium sulfate and ammonium sulfate crystallization

The solution obtained in the stage of hydrogen chloride regeneration was poured into the ammonium sulfate synthesis reactor, the volume of the solution being 400 liters. Then, ammonia in an amount of 75.8 Nm$^3$ was sent through the solution.

This amount of ammonia was sufficient to neutralize free sulfuric acid and obtain ammonium sulfate from hydrogen sulfate. The resulting solution was stirred in a sealed reactor for 3 hours, after which it was sent to the crystallization stage. Crystallization of the resulting solution provided 438.8 kg of ammonium sulfate with a moisture content of 0.1%.

Example 21

1. Digestion of Ilmenite Concentrate

Digestion of ilmenite concentrate was carried out similarly to Example 18.

2. Processing of the Solid Residue after Ilmenite Concentrate Digestion

Processing of the solid residue after ilmenite concentrate digestion was carried out similarly to Example 18.

3. Hydrolysis of Titanium Oxychloride

Hydrolysis of titanium oxychloride was carried out similarly to Example 18.

4. Washing Titanium Oxides/Hydroxides Precipitate from Impurities

Washing titanium oxides/hydroxides precipitate from impurities was carried out similarly to Example 1.

5. Calcination of Titanium Oxides/Hydroxides Precipitate

Calcination of titanium oxides/hydroxides precipitate was carried out similarly to Example 18.

6. Precipitation of Iron Hydroxides to Obtain Color Pigments

Precipitation of iron hydroxides to obtain color pigments was carried out similarly to Example 18.

7. Processing of the Mother Liquor Containing Calcium Chloride

Extraction of calcium carbonate is carried out from solutions resulting from the filtration of black iron oxide pigment in the stage of iron precipitation from iron chloride solutions.

An ammonium carbonate solution was prepared in a separate reactor. To achieve that, a 25% ammonia solution in an amount of 228 liters was poured into a sealed reactor and saturated with carbon dioxide for 7 hours. The process was carried out at a temperature of 20° C. Ammonia water was used in excess of 3% of the calcium chloride present in the solution.

The filtrate resulting from black iron oxide pigments filtration was purified from iron compounds residues. To achieve that, an oxidizing agent in the form of dry lime chloride was introduced into the solution while stirring, after which the pH was adjusted to 12 using dry hydrated lime. The resulting solution was allowed to stand for 2 hours, after which it was filtered. The filtered solution was fed into the reactor with a prepared ammonium carbonate solution while constant stirring. 455.5 liters of the filtrate with a CaCl$_2$ concentration of 360 g/dm$^3$ were fed to the reactor. The reactor was heated to 55° C. and kept with constant stirring for 4 hours, after which the pH of the slurry was adjusted to 7.0 and the slurry was sent for filtration.

The filtration yielded 192 kg of sludge with a moisture content of 30% and 610 liters of filtrate (the total filtrate volume being 656 l). The NH$_4$Cl concentration was 241.0 g/dm$^3$. The filtrate was fed to the stage of hydrogen chloride regeneration from ammonium chloride solution.

The sludge was washed in a filter with 400 liters of purified water with a temperature of 40° C., repulped in purified water with a temperature of 40° C. to obtain the concentration of 300 g/dm$^3$, filtered and washed again in a filter with 600 liters of purified water with a temperature of 40° C. Then it was dried at a temperature of 120° C. to obtain 148.4 kg of calcium carbonate with a moisture content of 0.5%. Calcium carbonate primary particle sizes were in the range of 0.5-2.5 μm.

8. Regeneration of Hydrogen Chloride from Ammonium Chloride Solution.

Regeneration of hydrogen chloride from ammonium chloride solution was excluded.

9. Obtaining Ammonium Sulfate and Ammonium Sulfate Crystallization

Obtaining ammonium sulfate was excluded

10. Obtaining Crystalline Ammonium Chloride 610 liters of a solution with an ammonium chloride concentration of 241 g/dm$^3$ coming from the stage of processing of the mother liquor containing calcium chloride was poured into a crystallizer equipped with a heating jacket and connected to a vacuum line. The solution was brought to the boil and boiled at a vacuum of 0.6 atm until water was completely removed. Crystallization process yielded 147.2 kg of ammonium chloride with a moisture content of 0.1%.

Although the invention has been disclosed using example embodiments, it should be understood that a person skilled in the art may make many other modifications and embodiments without departing from the scope of the present invention. In particular, various changes and improvements to the components and/or the overall flow sheet can be made within the scope of the present invention. Along with the changes and improvements to the components and/or overall flow sheet, other uses of the invention should also be obvious to those skilled in the art.

The invention claimed is:

1. A method for integrated processing of titanium-containing feedstock to obtain high value-added products based on titanium, iron, calcium and nitrogen, which comprises the following stages:
   a) digesting ilmenite concentrate, namely, decomposing a milled ilmenite concentrate with hydrochloric acid in two or more stages in a countercurrent system using a reducing agent, to obtain a solid residue and a solution of titanium oxychloride, which is sent to Stage c);
   b) processing the solid residue obtained in Stage a), which comprises:
   neutralization of the solid residue with ammonia water containing 3-25% NH$_4$OH to produce a neutralization precipitate and a mother liquor,
   filtration of the mother liquor, washing the neutralization precipitate, drying the neutralization precipitate at a temperature of 100-200° C., and calcining the neutralization precipitate for 1-8 hours at a temperature of 300-1050° C.,
   obtaining the neutralization precipitate with a titanium dioxide content of more than 50% and the mother liquor, which is sent to Stage i);
   c) hydrolysis of titanium oxychloride {TiOCl$_2$} from Stage a) to obtain a precipitate of titanium oxides/hydroxides with a specified particle size distribution, wherein the precipitate of titanium oxides/hydroxides remains suspended in the solution of titanium oxychloride to form a slurry of titanium oxides/hydroxides, wherein HCl vapor released during hydrolysis is captured and returned to Stage a) in the form of an aqueous solution of hydrogen chloride;
   d) washing the precipitate of titanium oxides/hydroxides during which the slurry of titanium oxides/hydroxides obtained in Stage c) is filtered to separate the precipitate of titanium oxides/hydroxides as a cake of titanium oxides/hydroxides, which is washed with purified water, then the cake of titanium oxides/hydroxides is sent to calcination stage e), and the mother liquor is sent to iron hydroxides precipitation stage f);
   e) calcination of the cake of titanium oxides/hydroxides at a temperature of 250-1000° C. for 0.5-10.0 hours to produce titanium dioxide, followed by cooling and milling of the resulting titanium dioxide;
   f) part of the mother liquor from Stage d) containing iron chlorides and free hydrochloric acid is mixed with milk of lime slurry with Ca(OH)$_2$ content in the range between 5% and 35%, thereby neutralizing the hydrochloric acid and iron chlorides and forming a precipitate of iron hydroxide, the precipitate of iron hydroxide is oxidized with ambient oxygen for 5-40 hours, the slurry is cooled and filtered, the precipitate of iron hydroxide is washed and dried at a temperature of 30-80° C., after which a resulting black iron oxide pigment is obtained, which is subjected to milling, while at the same time an oxidizing agent is introduced into the mother liquor, which is then neutralized to a pH=7-12 with Ca(OH)$_2$ to form a resulting mother liquor slurry, wherein the resulting mother liquor slurry is filtered to separate the precipitated iron hydroxide from the mother liquor to result in an iron hydroxide cake, then the iron hydroxide cake is dissolved using a hydrochloric acid solution, thus obtaining a solution of iron chloride FeCl$_3$, with a pH in the range of 0.5-2.0, after which FeCl$_3$ is reduced to FeCl$_2$ using iron and the resulting solution of FeCl$_2$ chloride is sent for mixing with solutions coming from Stage d), and the mother liquor is sent to Stage i) for processing;
   g) part of the mother liquor from Stage d) containing iron chlorides and free hydrochloric acid is mixed with milk of lime slurry with Ca(OH)$_2$ content in the range between 5% and 35%, thereby neutralizing the hydrochloric acid and iron chlorides and forming a precipitate of iron hydroxide, the precipitate of iron hydroxide is oxidized with ambient oxygen for 5-40 hours, the slurry is cooled and filtered, the precipitate is washed and calcined at a temperature of 350 to 1000° C. for 1-10 hours, after which a resulting red iron oxide pigment is obtained, the red iron oxide pigment resulting from calcination is cooled and subjected to milling, while at the same time an oxidizing agent is introduced into the mother liquor and which is then neutralized to a pH=7-12 with Ca(OH)$_2$ to form a resulting mother liquor slurry, wherein the mother liquor slurry is filtered to separate the precipitated iron hydroxide from the mother liquor to result in an iron hydroxide cake, then the iron hydroxide cake is dissolved using hydrochloric acid solution, thus obtaining a solution of iron chloride FeCl$_3$, with a pH in the range of 0.5-2.0, after which FeCl$_3$ is reduced to FeCl$_2$ using iron and the resulting solution of FeCl$_2$ is sent for mixing with solutions supplied from Stage d), and the mother liquor is sent to Stage i) for processing;

h) precipitation of iron hydroxides to obtain yellow iron oxide pigment, during which, for the production of nuclei, part of the mother liquor from Stage d) containing iron chlorides and free hydrochloric acid is mixed with milk of lime slurry having $Ca(OH)_2$ content in the range between 5% and 35%, hydrochloric acid and iron chloride are neutralized and a resulting slurry is held for 0.1-2 hours with continuous circulation provided, then iron hydroxide is oxidized with ambient oxygen for 5-40 hours, followed by the addition of the rest of the mother liquor from Stage d), free hydrochloric acid, and iron chloride are neutralized and iron hydroxide is oxidized with ambient oxygen for 5-40 hours, the slurry is cooled and filtered, the iron hydroxide is washed and dried at a temperature of 30-80° C., after which the resulting yellow iron oxide pigment is subjected to milling, while at the same time an oxidizing agent is introduced into the mother liquor from the stage of precipitate washing and the solution is neutralized to a pH=7-12 with $Ca(OH)_2$ and the resulting slurry is filtered to separate the precipitated iron hydroxide from the mother liquor to result in an iron hydroxide cake, then the iron hydroxide cake is dissolved using hydrochloric acid solution, thus obtaining a solution of iron chloride $FeCl_3$, with a pH in the range of 0.5-2.0, after which $FeCl_3$ is reduced to $FeCl_2$ using iron and the resulting solution of iron (II) chloride is sent for mixing with solutions supplied from Stage d), and the mother liquor is sent to Stage i) for processing;

i) processing mother liquor containing calcium chloride, during which the mother liquors from Stages f), g), h) are used, calcium carbonate is precipitated using ammonia or ammonium compounds and carbon oxide or carbonates, the calcium carbonate precipitate is washed, filtered and dried at a temperature of 100-200° C., while the resulting mother liquor is sent to Stage j);

j) regeneration of hydrogen chloride from ammonium chloride solution, during which the mother liquor from Stage i) is evaporated to a concentration of $NH_4Cl \leq 773$ $g/dm^3$, then, with thorough stirring, 95-100% sulfuric acid is fed according to a ratio of $NH_4Cl$ to $H_2SO_4$ of 1-1.75-2.05 to produce a reaction mass, then the reaction mass is heated to a temperature of 100-220° C. at an absolute pressure in the range of 0.15-1 bar, wherein hydrochloric acid released as a result of the reaction, having an HCl content of 10-35%, is condensed and returned to Stage a) of titanium-containing feedstock digestion, and the reaction mass containing ammonium hydrogen sulfate $NH_4HSO_4$ is sent to Stage k);

k) obtaining ammonium sulfate and ammonium sulfate crystals by crystallization, during which the reaction mass obtained in Stage j) containing ammonium hydrogen sulfate is dissolved with water until crystals of ammonium hydrogen sulfate are completely dissolved, and simultaneously heating the dissolved mixture, the resulting solution of ammonium hydrogen sulfate having an $NH_4HSO_4$ content of 45-70% is mixed with a stream of ammonia gas, then the resulting ammonium sulfate solution is evaporated at an absolute pressure of 0.05-1 bar and crystallized, and the resulting slurry containing ammonium sulfate crystals with a solid $(NH_4)_2SO_4$ content in the range between 5 and 50%, wherein the resulting slurry is further processed to separate the mother liquor using filtration or centrifugation, and wherein the separated ammonium sulfate crystals are washed and dried to remove free moisture at a temperature of 50-150° C., while the resulting mother liquor is returned to any one of stages a-k.

2. The method according to claim 1, wherein the average particle size of the milled ilmenite concentrate of Stage a) is between 0.05 and 45 μm.

3. The method according to claim 1, wherein, in at least one of digestions steps of Stage a), a portion of the mother liquor from Stages f), g), or h) is additionally used, the mother liquor being obtained before the introduction of an oxidizing agent and containing calcium chloride.

4. The method according to claim 1, wherein, in one of the digestions stages of Stage a), the mother liquor containing ammonium chloride and recovered from Stage i) is additionally used.

5. The method according to claim 1, wherein Stage a) uses metallic iron as a reducing agent to an extent such that the presence of $Ti^{3+}$ ions is in an amount of 1.1-3 $g/dm^3$ in the solution.

6. The method according to claim 1, wherein, in Stage b), the solid precipitate is washed with dilute filtrates containing $NH_4Cl$: first, with more concentrated filtrates containing more than 10% but less than 20% $NH_4Cl$, then with less concentrated filtrates containing more than 5% but less than 10% $NH_4Cl$, then with even less concentrated filtrates containing less than 5% $NH_4Cl$, and at the end, the solid precipitate is washed with demineralized water with a specific conductivity of 10-50 μS/cm to remove $NH_4Cl$ from the solid precipitate to less than 0.05% by weight of the solid precipitate.

7. The method according to claim 1, wherein, in Stage b) following neutralization and washing, a solution of chloride or sulfate of an alkali metal selected from Group 1 of the Periodic Table is added to the solid precipitate in an amount of 0.1-5% by weight of the solid precipitate, and stirred, then the precipitate is dried at a temperature of 100-200° C.

8. The method according to claim 7, wherein the dried precipitate is additionally calcined for 1-8 hours at a temperature of 300-1050° C. and milled.

9. The method according to claim 1, wherein Stage c) uses a solution of titanium oxychloride ($TiOCl_2$) with a $TiO_2$ concentration of 50-400 $g/dm^3$ and a temperature of 10-60° C.

10. The method according to claim 9, wherein a precipitate of titanium oxides/hydroxides with a particle size of 0.2 to 50 μm is obtained.

11. The method according to claim 1, wherein prior to Stage c), titanium nuclei are prepared.

12. The method according to claim 11, wherein a solution of titanium oxychloride ($TiOCl_2$) with a $TiO_2$ concentration of 50-400 $g/dm^3$ and a temperature of 20-30° C. is used for the preparation of titanium nuclei.

13. The method according to claim 12, wherein titanium nuclei are added to the titanium oxychloride solution during heating when it reaches a temperature of 30-95 C in an amount of 1.5-5% of the nuclei expressed as $TiO_2$ by the amount of $TiO_2$ contained in the titanium oxychloride solution.

14. The method according to claim 13, wherein a precipitate of titanium oxides/hydroxides with a particle size of 100-350 nm is obtained.

15. The method according to claim 13, wherein a precipitate of titanium oxides/hydroxides with a particle size of 350-1500 nm is obtained.

16. The method according to claim 10, wherein the obtained titanium oxides/hydroxides are used as nuclei for the hydrolysis of titanium oxychloride solution.

17. The method according to claim 16, wherein titanium nuclei in an amount of 3-100% by weight of $TiO_2$ in the titanium oxychloride solution are added to titanium oxychloride solution with a $TiO_2$ concentration of 50-400 g/dm$^3$ and a temperature of 10-60° C.

18. The method according to claim 17, wherein a precipitate of titanium oxides/hydroxides with a particle size of 50-250 μm is obtained.

19. The method according to claim 1, wherein Stage d) further comprises a salt treatment stage, during which the cake of titanium oxides/hydroxides is repulped in demineralized water or in the mother liquor to reach a $TiO_2$ concentration of 200-500 g/dm$^3$, upon which a solution of a compound of a metal or a mixture of compounds of metals from Group 1 of the Periodic Table is added to the slurry, wherein the compounds of metals comprise one or more of halides, sulfates, hydroxides, phosphates, carbonates, LiCl, NaCl, KCl, $Li_2SO_4$, $Na_2SO_4$, $K_2SO_4$, LiOH, NaOH, KOH, $Li_3PO_4$, $Na_3PO_4$, $K_3PO_4$, $Li_2CO_3$, $Na_2CO_3$, and $K_2CO_3$.

20. The method according to claim 1, wherein Stage d) further comprises a reduction stage, during which the cake of titanium oxides/hydroxides is repulped in water, a solution of hydrochloric acid is added to the slurry bringing the pH to less than 2, the reaction mass is heated up to 50-90° C., then a reducing agent is introduced into the resulting slurry and the reduction is carried out to reach a $Ti^{3+}$ content equal to or more than 0.3 g/dm$^3$.

21. The method according to claim 20, wherein the reducing agent is selected from metals of Groups 1, 2, 4, 12, and/or 13 of the Periodic Table.

22. The method according to claim 20, wherein the reducing agent comprises one or more of 4-methylaminophenol sulfate, benzene-1,4-diol, 2,4-diaminophenol dihydrochloride, and hydroxymethanesulfonates.

23. The method according to claim 20, wherein following the reduction stage, the titanium oxides/hydroxides slurry is cooled down to 20-70° C. and subjected to re-filtration.

24. The method according to claim 19, wherein the salt treatment stage follows re-filtration of the titanium oxides/hydroxides slurry.

25. The method according to claim 1, wherein Stage e) produces titanium dioxide with particle sizes in the range of 0.2-50 μm.

26. The method according to claim 1, wherein Stage e) produces titanium dioxide with particle sizes in the range of 50-250 μm.

27. The method according to claim 1, wherein Stage e) produces titanium dioxide with particle sizes in the range of 100-350 nm.

28. The method according to claim 1, wherein Stage e) produces titanium dioxide with particle sizes in the range of 350-1500 nm.

29. The method according to claim 1, wherein, in Stage f), hydrochloric acid and iron chloride are neutralized to a pH of 2.5-7.0, and the neutralization time is 0.5-5 hours.

30. The method according to claim 1, wherein in Stage f), following the precipitate drying stage, the resulting pigment is surface treated with organic additives in an amount of 0.1 to 3% by weight of the pigment.

31. The method according to claim 30, wherein the organic additives comprise one or more of trimethylopropane, trimethylolethane, pentaerythritol, and triethanolamine.

32. The method according to claim 30, wherein the organic additives comprise one or more of polydimethylsiloxanes, stearic acid, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, and phosphonic acid.

33. The method according to claim 1, wherein, in Stage g), hydrochloric acid and iron chloride are neutralized to a pH of 2.5-7.0, while the neutralization time is 0.5-5 hours.

34. The method according to claim 1, wherein in Stage g), following the precipitate drying stage, the resulting pigment is surface treated with organic additives in an amount of 0.1 to 3% by weight of the pigment.

35. The method according to claim 34, wherein the organic additives comprise polyatomic alcohols.

36. The method according to claim 35, wherein the organic additives comprise one or more of polydimethylsiloxanes, stearic acid, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, and phosphonic acids.

37. The method according to claim 1, wherein, in Stage h), to obtain nuclei, the iron chloride is neutralized until 5-35%, of iron hydroxide is precipitated, and the neutralization time is 0.1-2 hours.

38. The method according to claim 1, wherein, in Stage h), following the addition of iron chloride solution to the slurry of iron hydroxide nuclei, free hydrochloric acid is added to neutralize the solution to result in a pH of 2.5-6.0.

39. The method according to claim 1, wherein in Stage h), following the precipitate drying stage, the resulting pigment is surface treated with organic additives in an amount of 0.1 to 3% by weight of the pigment.

40. The method according to claim 38, wherein the organic additives comprise one or more of polyatomic alcohols.

41. The method according to claim 40, wherein the organic additives comprise one or more of polydimethylsiloxanes, stearic acid, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, and phosphonic acids.

42. The method according to claim 1, wherein, in Stage i), the mother liquor is mixed with a gas stream containing $CO_2$ and gaseous ammonia to precipitate calcium carbonate.

43. The method according to claim 1, wherein, in Stage i), an ammonium carbonate solution is used to precipitate calcium carbonate from the mother liquor.

44. The method according to claim 1, wherein Stage i) further comprises a stage of precipitated calcium carbonate nuclei preparation.

45. The method according to claim 1, wherein it further comprises Stage 1) of ammonium chloride crystallization, during which the mother liquor from Stage i) is evaporated at an absolute pressure of 0.05-1 bar and crystallized, and the resulting slurry, containing ammonium chloride crystals with a solid $NH_4Cl$ content in the range between 5 and 50%, is processed to separate the mother liquor using filtration or centrifugation, the obtained ammonium chloride is dried, and the mother liquor, following the separation of ammonium chloride crystals, is mixed with new portions of the mother liquor and concentrated ammonium chloride filtrates coming from the stage i) of processing of the mother liquor containing calcium chloride and the resulting mixture is sent for evaporation to obtain ammonium obtain ammonium chloride crystals.

* * * * *